(12) United States Patent
Asami

(10) Patent No.: US 9,405,102 B2
(45) Date of Patent: Aug. 2, 2016

(54) IMAGING LENS AND IMAGING APPARATUS

(71) Applicant: FUJIFILM Corporation, Tokyo (JP)

(72) Inventor: Taro Asami, Saitama-ken (JP)

(73) Assignee: FUJIFILM Corporation, Tokyo (JP)

( * ) Notice: Subject to any disclaimer, the term of this patent is extended or adjusted under 35 U.S.C. 154(b) by 35 days.

(21) Appl. No.: 14/601,544

(22) Filed: Jan. 21, 2015

(65) Prior Publication Data

US 2015/0131168 A1    May 14, 2015

Related U.S. Application Data

(63) Continuation of application No. PCT/JP2013/004085, filed on Jul. 2, 2013.

(30) Foreign Application Priority Data

Jul. 23, 2012    (JP) .................................. 2012-162664

(51) Int. Cl.
| | |
|---|---|
| *G02B 9/62* | (2006.01) |
| *G02B 13/18* | (2006.01) |
| *G02B 13/00* | (2006.01) |
| *G02B 13/04* | (2006.01) |
| *G03B 3/00* | (2006.01) |

(52) U.S. Cl.
CPC .............. *G02B 13/0045* (2013.01); *G02B 9/62* (2013.01); *G02B 13/04* (2013.01); *G02B 13/18* (2013.01); *G03B 3/00* (2013.01)

(58) Field of Classification Search
CPC ............................. G02B 9/62; G02B 13/0045

USPC .................................. 359/713, 752, 756, 761
See application file for complete search history.

(56) References Cited

U.S. PATENT DOCUMENTS

| | | | |
|---|---|---|---|
| 5,260,833 | A | 11/1993 | Ito et al. |
| 5,363,243 | A | 11/1994 | Takayuki et al. |
| 5,424,870 | A | 6/1995 | Hashimura et al. |
| 5,455,714 | A | 10/1995 | Kohno |
| 5,808,811 | A | 9/1998 | Iyama |
| 8,040,618 | B2 | 10/2011 | Kitahara |
| 8,054,562 | B2 | 11/2011 | Asami |

FOREIGN PATENT DOCUMENTS

| | | |
|---|---|---|
| JP | 04-78810 | 3/1992 |
| JP | 05-88085 | 4/1993 |
| JP | 05-113539 | 5/1993 |
| JP | 06-82697 | 3/1994 |
| JP | 09-133863 | 5/1997 |
| JP | 10-104519 | 4/1998 |
| JP | 2009-216858 | 9/2009 |

(Continued)

OTHER PUBLICATIONS

International Search Report, PCT/JP2013/004085, Nov. 19, 2013.

*Primary Examiner* — William Choi
(74) *Attorney, Agent, or Firm* — Young & Thompson

(57) ABSTRACT

An imaging lens consists essentially of six lenses in the following order from the object side: a negative first lens; a positive second lens; a negative third lens; a positive fourth lens; a positive fifth lens; and a negative sixth lens. Conditional expression (1) is satisfied, wherein f is the focal length of the entire system, and f5 is the focal length of the fifth lens:

$2.38 < f5/f$    (1).

20 Claims, 17 Drawing Sheets

(56) References Cited

FOREIGN PATENT DOCUMENTS

| JP | 2009216858 A | * | 9/2009 |
| JP | 2010-072622 | | 4/2010 |
| JP | 2010-107531 | | 5/2010 |

* cited by examiner

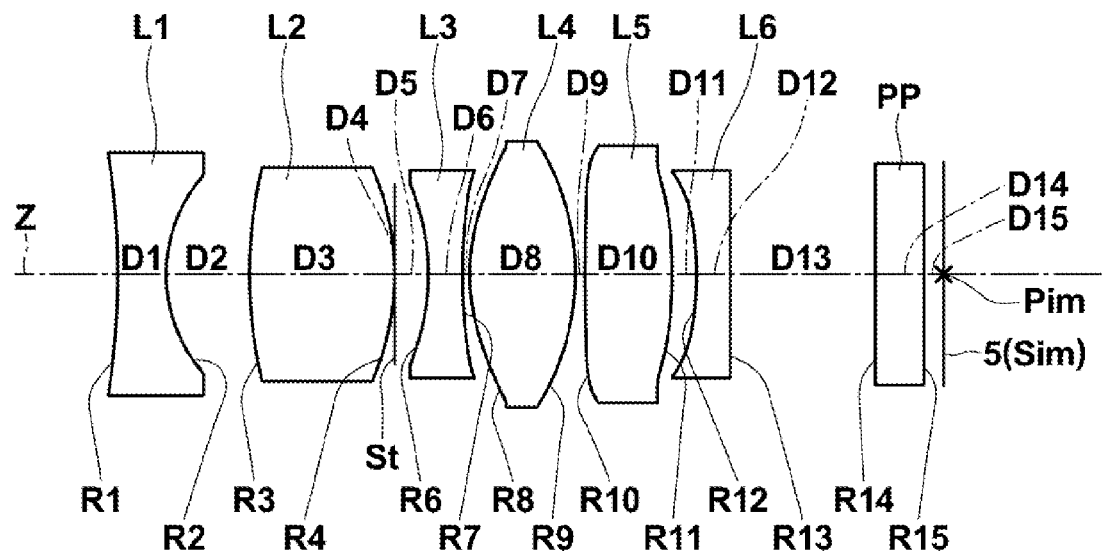
FIG.3 EXAMPLE 1
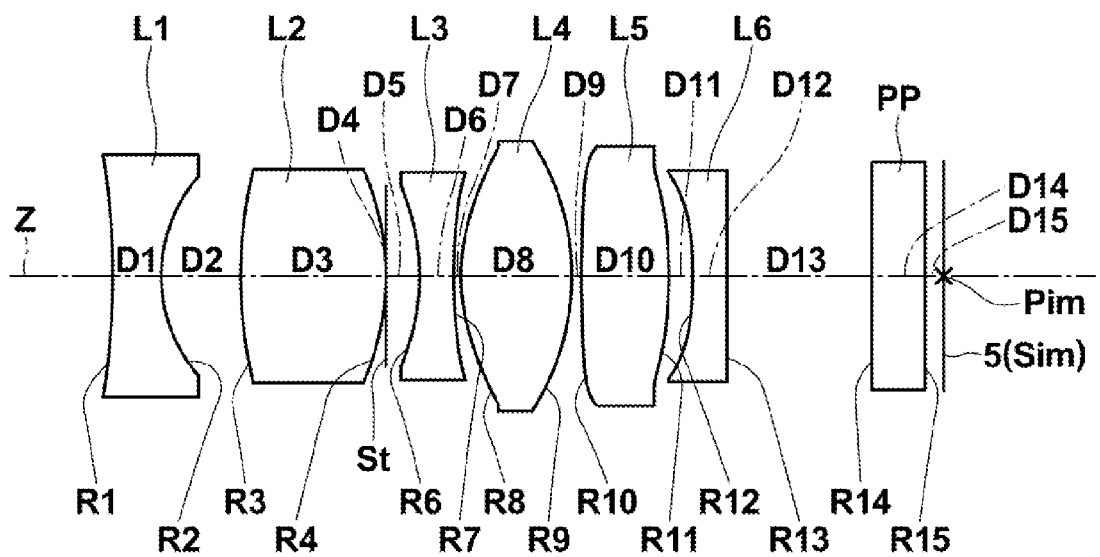
FIG.4 EXAMPLE 2

EXAMPLE 3

EXAMPLE 4

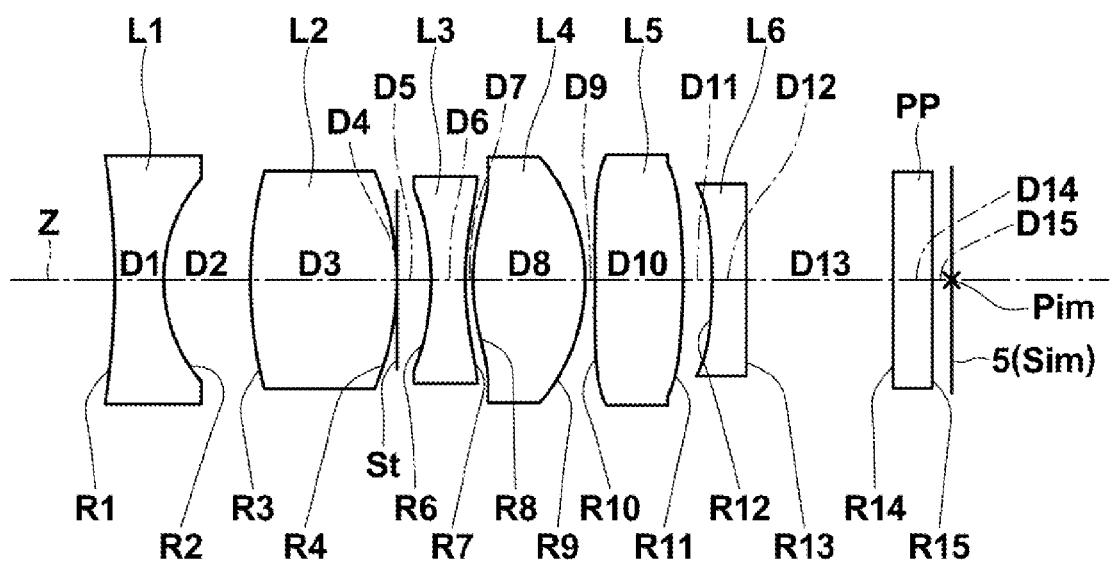
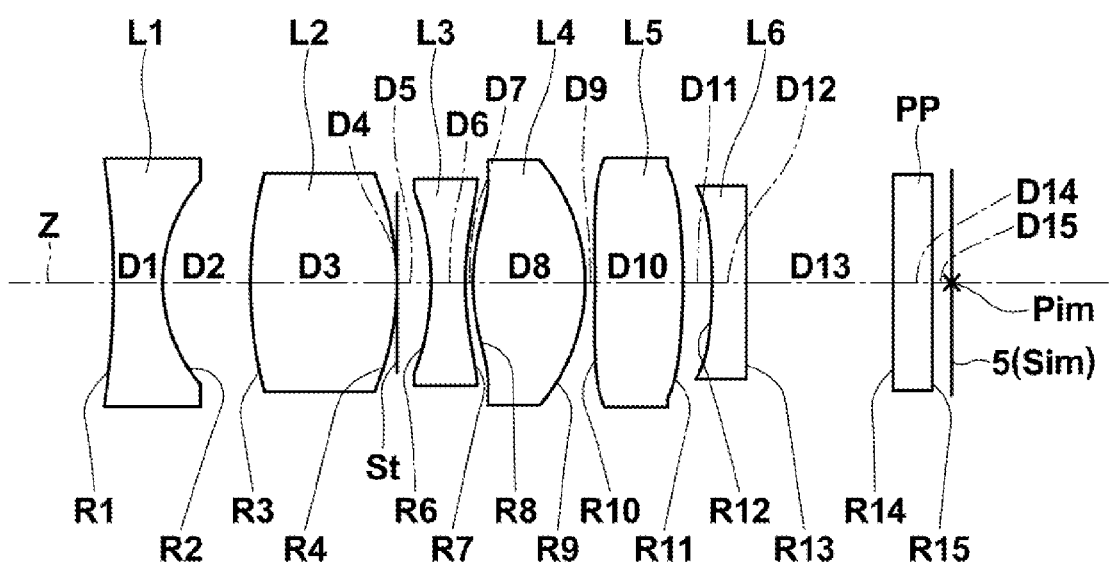

EXAMPLE 11

EXAMPLE 12

EXAMPLE 13

EXAMPLE 14

EXAMPLE 15

EXAMPLE 1

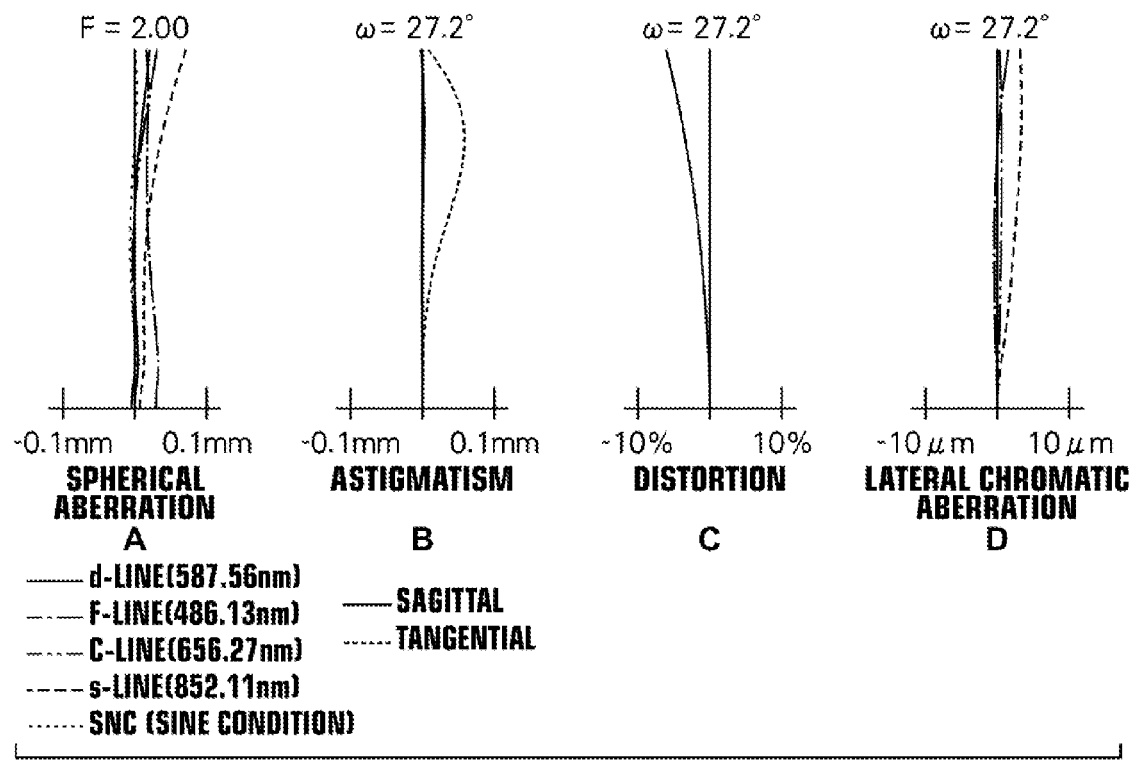
FIG.19 EXAMPLE 2
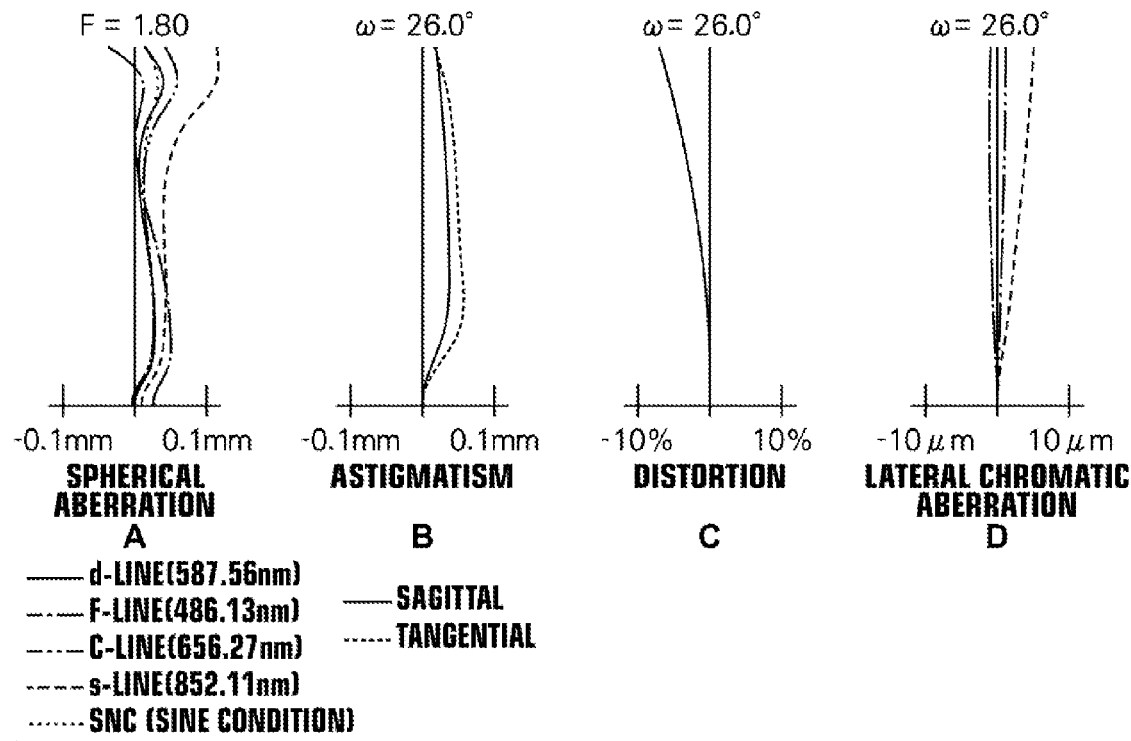
FIG.20 EXAMPLE 3

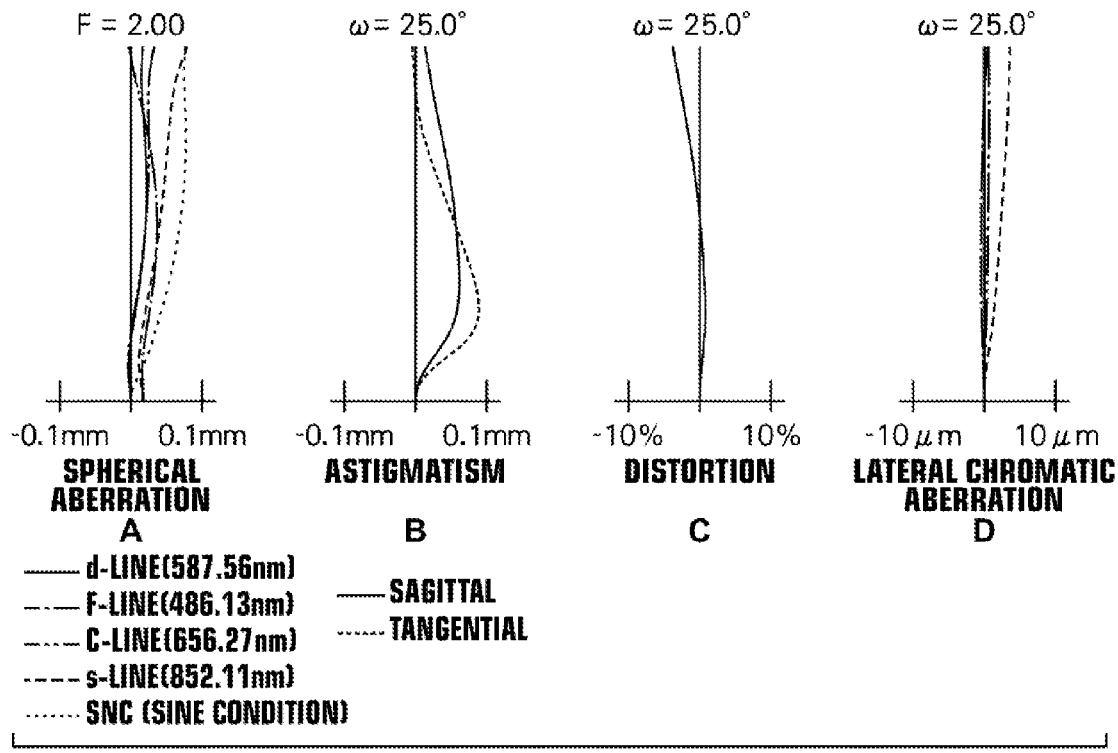
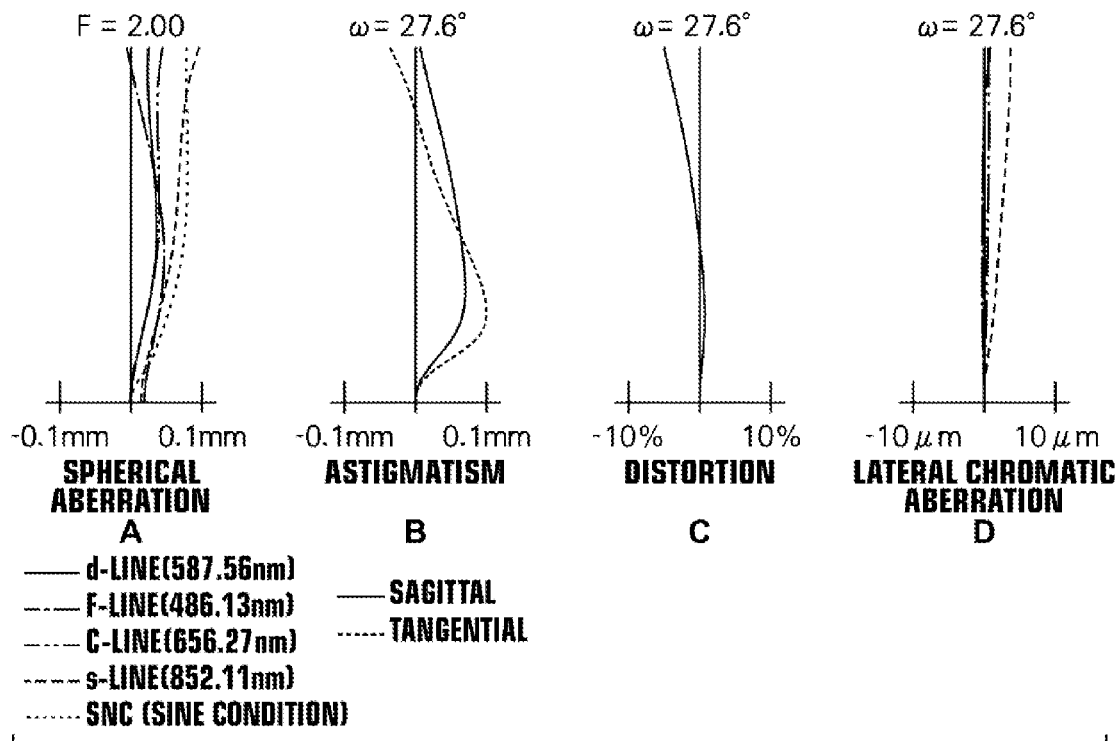

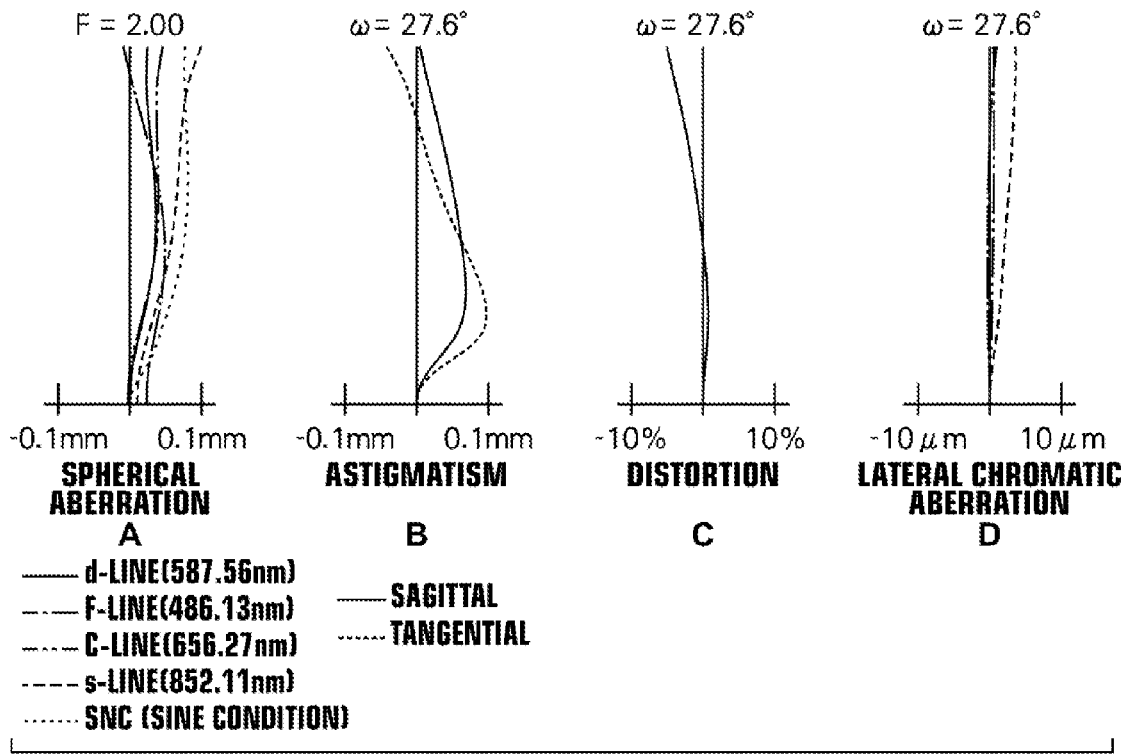
FIG.23 — EXAMPLE 6
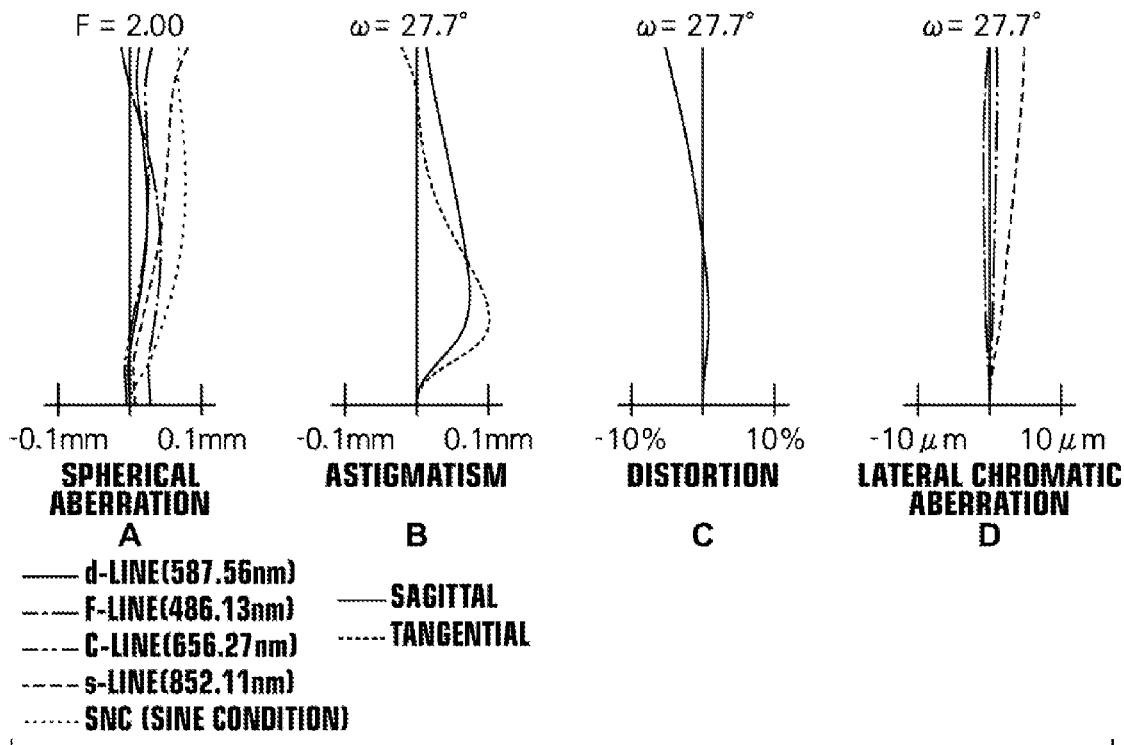
FIG.24 — EXAMPLE 7

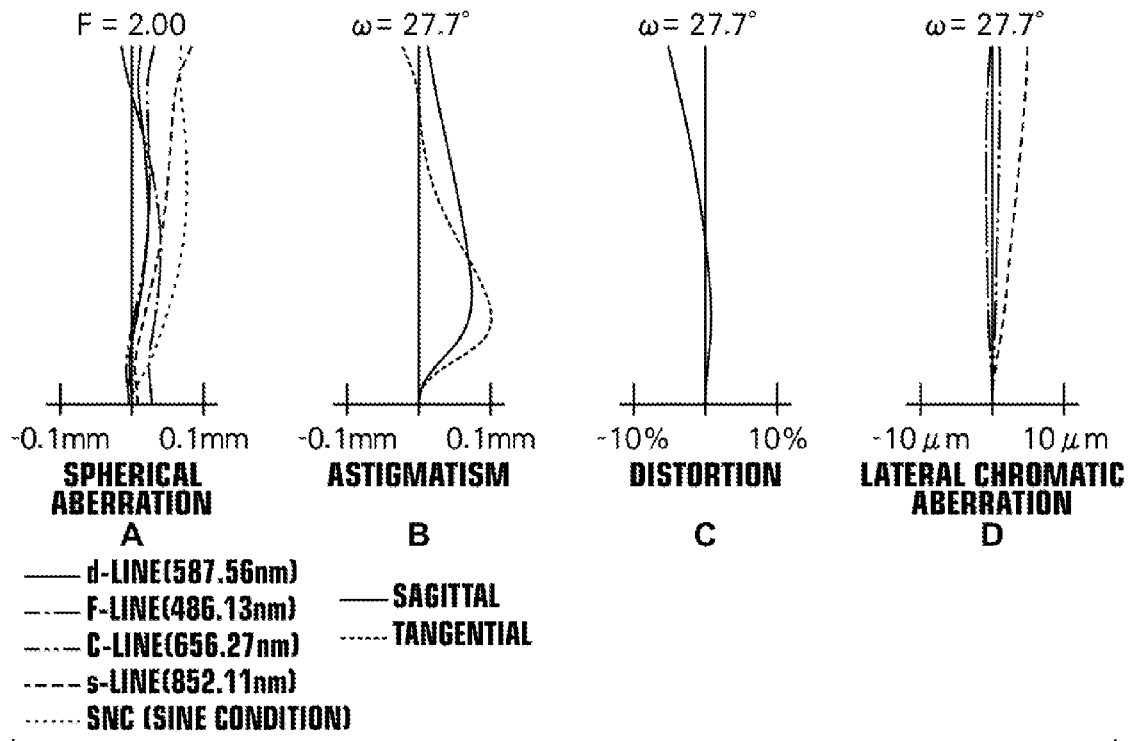
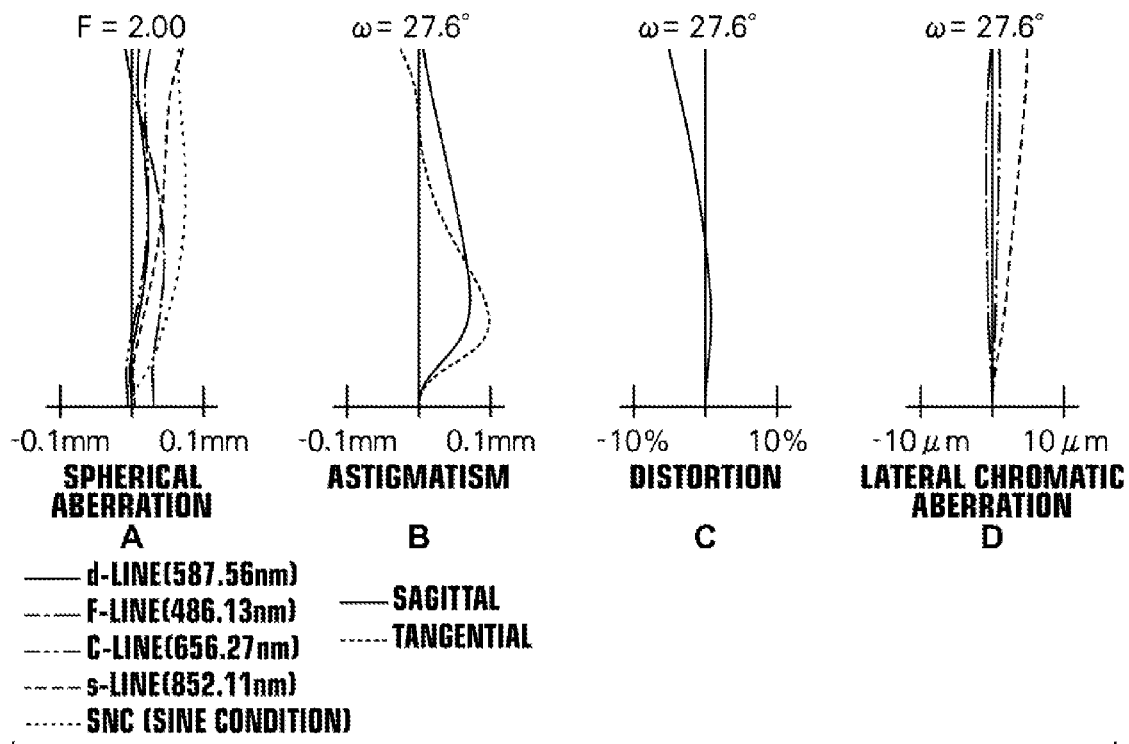

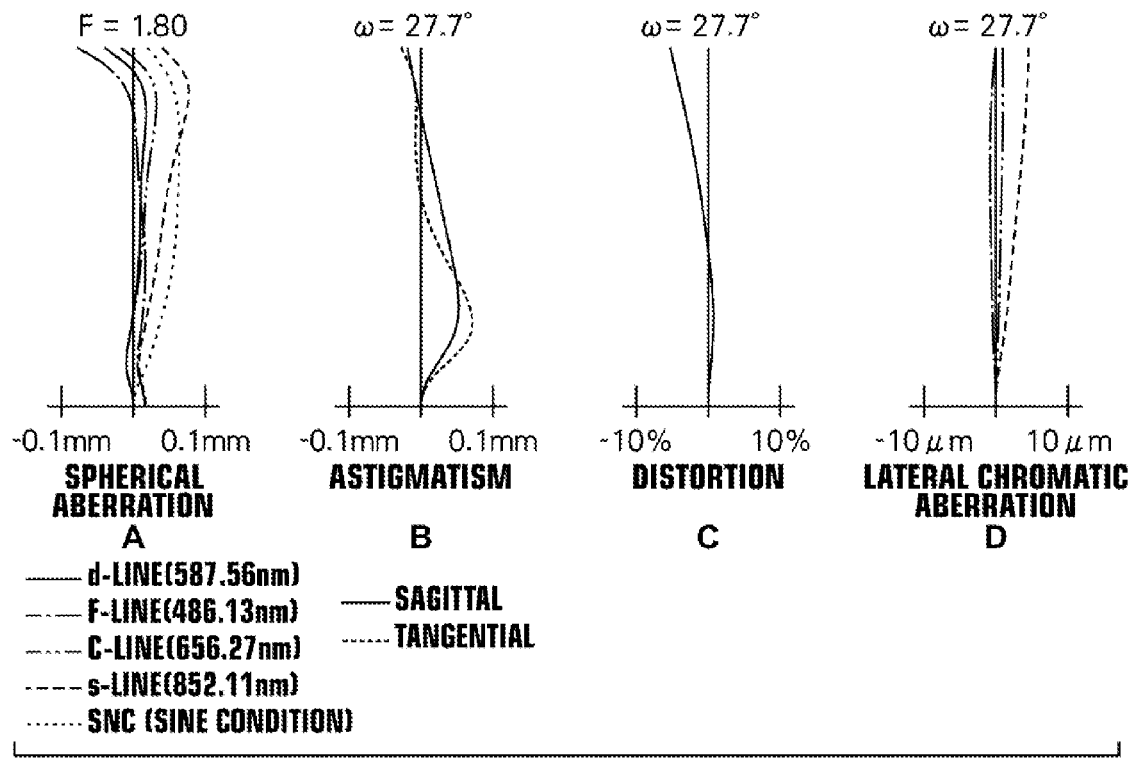
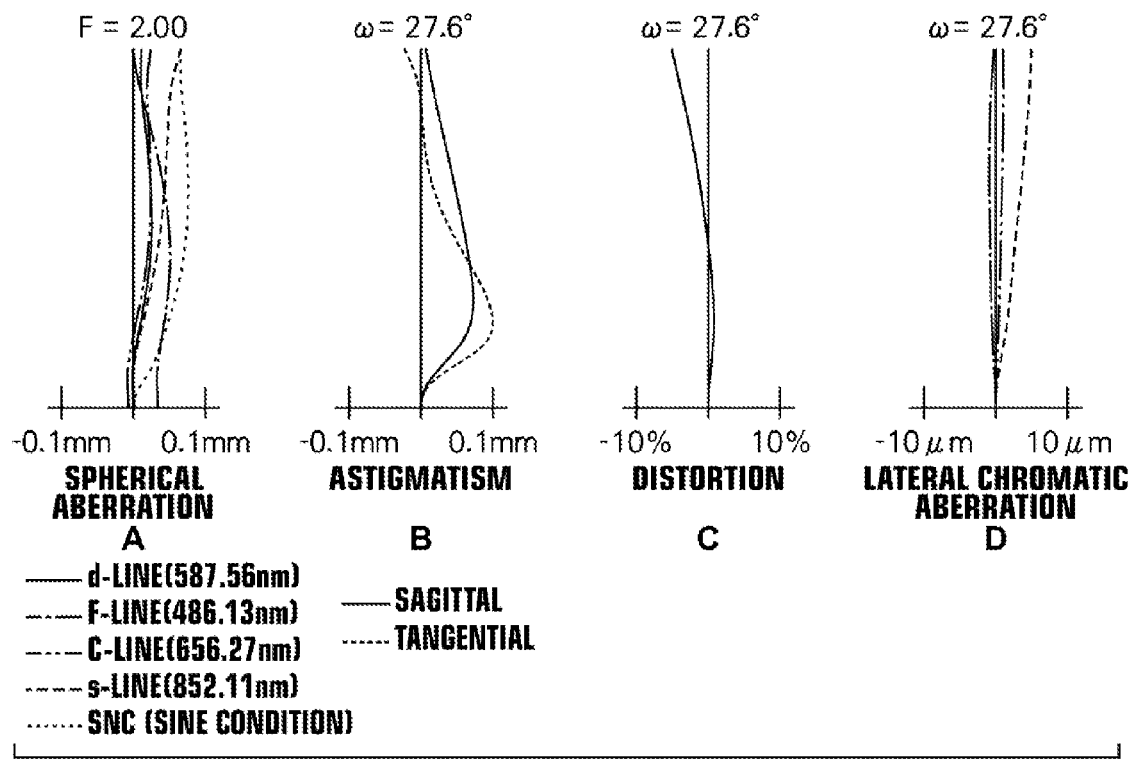

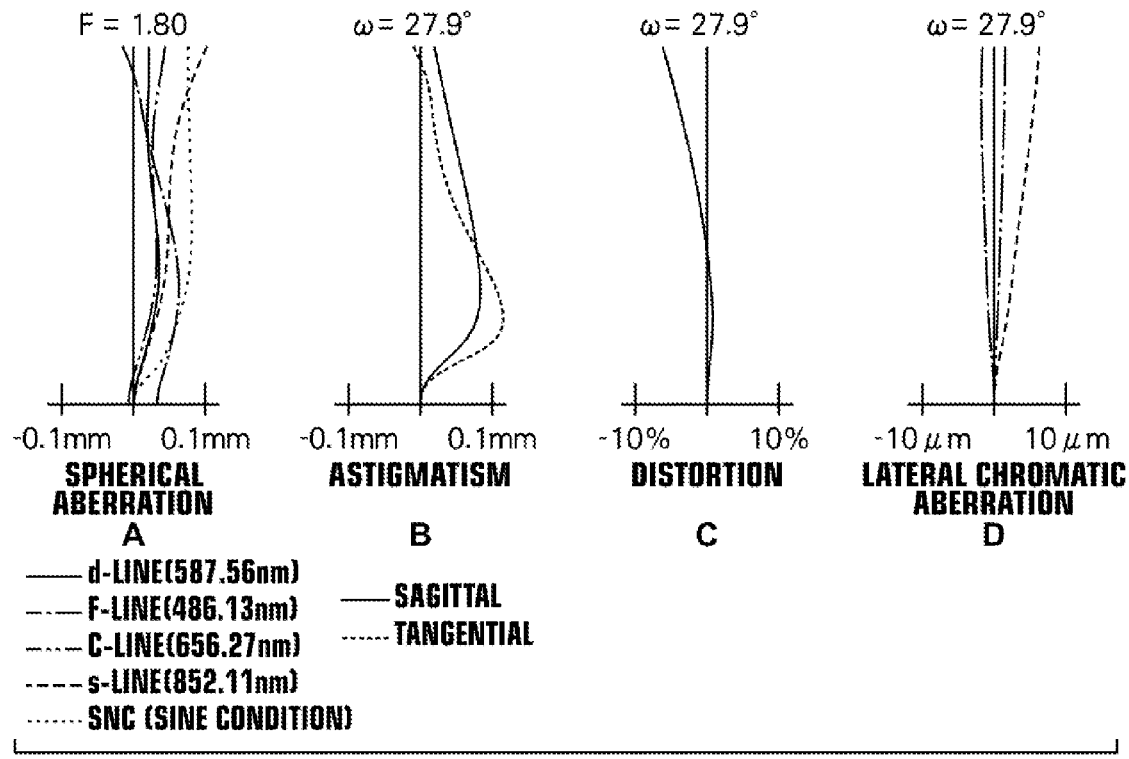
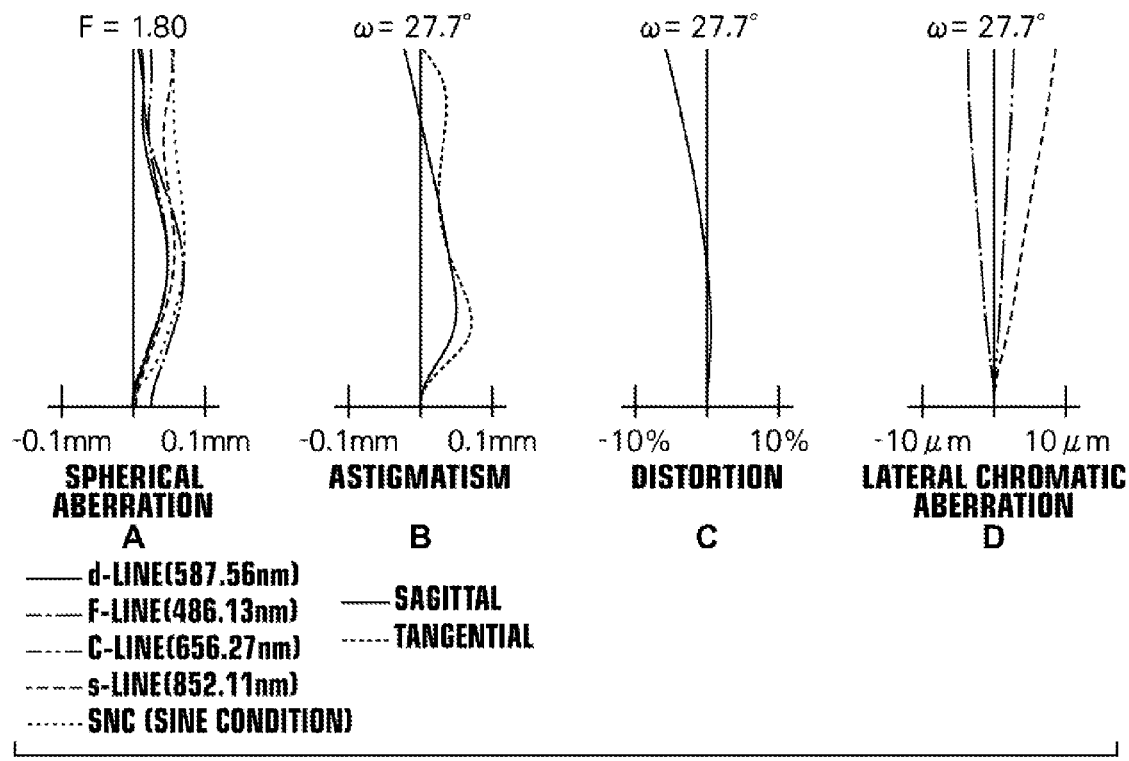

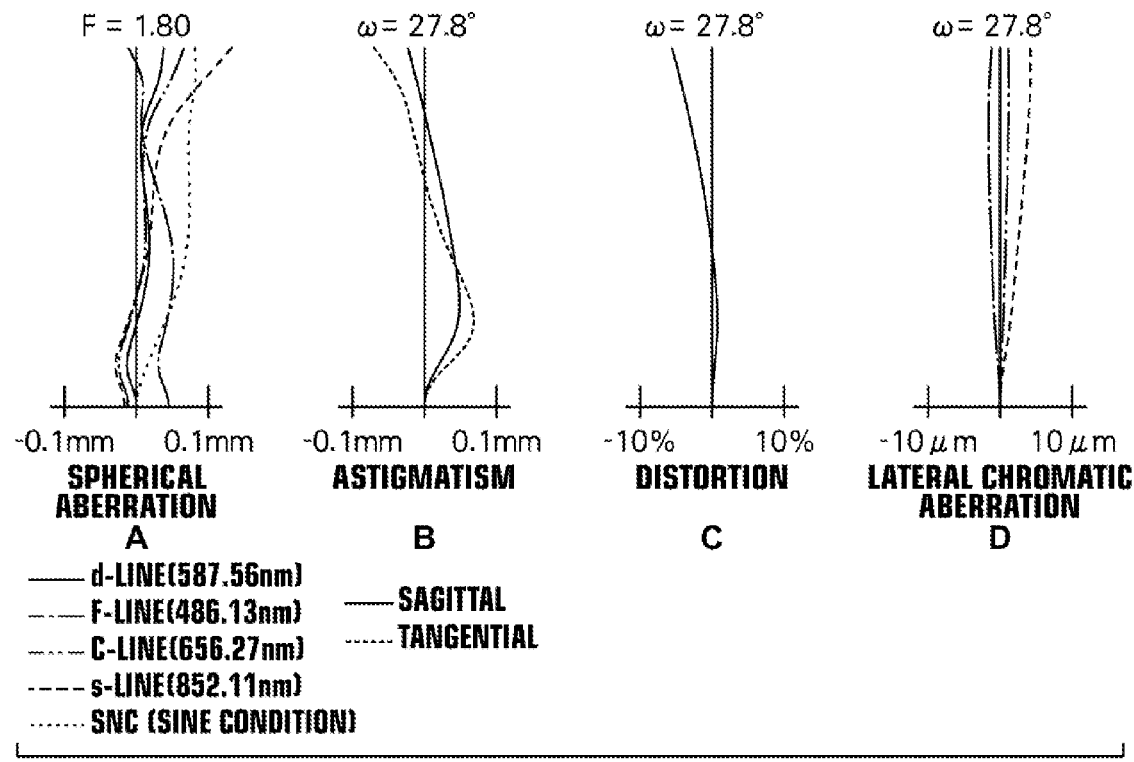
FIG.31 EXAMPLE 14
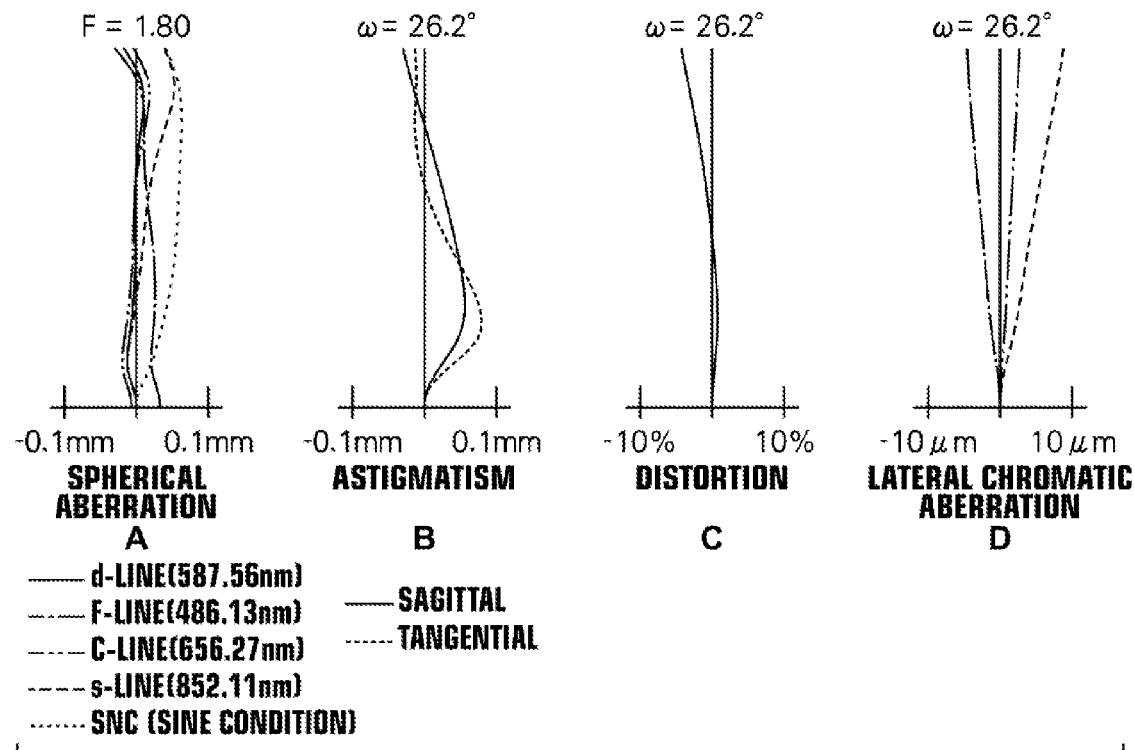
FIG.32 EXAMPLE 15

IMAGING LENS AND IMAGING APPARATUS

CROSS-REFERENCE TO RELATED APPLICATIONS

This application is a Continuation of PCT International Application No. PCT/JP2013/004085 filed on Jul. 2, 2013, which claims priority under 35 U.S.C. §119(a) to Japanese Patent Application No. 2012-162664 filed on Jul. 23, 2012. Each of the above applications is hereby expressly incorporated by reference, in its entirety, into the present application.

BACKGROUND OF THE INVENTION

1. Field of the Invention

The present invention relates to an imaging lens and an imaging apparatus, and more particularly to an imaging lens suitable for use in a vehicle mounted camera, a portable terminal camera, and a surveillance camera that utilize an image sensor, such as CCD's (Charge Coupled Device), CMOS's (Complementary Metal Oxide Semiconductor), and the like as well as to an imaging apparatus equipped with this imaging lens.

2. Description of the Related Art

In recent years, image sensors such as CCD's, CMOS's, and the like have achieved significant miniaturization and increased numbers of pixels. Accompanying these developments, as the bodies of imaging devices equipped with these image sensors also have achieved miniaturization, there is demand for imaging lenses to be mounted therein to be miniaturized in addition to having favorable optical performance. Meanwhile, there is demand for imaging lenses to be applied for use in a vehicle mounted camera, a surveillance camera, and the like to be miniaturized, be capable of being configured at low cost, and to have wider angles of view and higher performance. Japanese Unexamined Patent Publication Nos. 2009-216858, 2010-107531 and 2010-072622 propose imaging lenses of a six-lens configuration, in which a negative lens, a positive lens, a negative lens, a positive lens, a positive lens, and a negative lens are arranged in this order from the object side, as imaging lenses to be mounted on vehicle mounted cameras.

SUMMARY OF THE INVENTION

Requirements for imaging lenses to be mounted on vehicle mounted cameras, surveillance cameras, and the like are becoming rigorous year to year in such a manner that back focus is required to be secured in addition to achieving further miniaturization, lower costs, wider angles of view and higher performance.

The present invention has been developed in view of the foregoing circumstances. The object of the present invention is to provide an imaging lens which is capable of achieving miniaturization, low costs, a wider angle of view and high performance, and securing of back focus as well as an imaging apparatus equipped with this imaging lens.

A first imaging lens of the present invention consists essentially of a first lens having a negative power, a second lens having a positive power, a third lens having a negative power, a fourth lens having a positive power, a fifth lens having a positive power, and a sixth lens having a negative power in this order from the object side, and
the imaging lens satisfies conditional formula (1) below:

$$2.38 < f5/f \qquad (1),$$ where f: the focal length of the entire system, and
f5: the focal length of the fifth lens.

A second lens of the present invention consists essentially of a first lens having a negative power, a second lens having a positive power, a third lens having a negative power, a fourth lens having a positive power, a fifth lens having a positive power, and a sixth lens having a negative power in this order from the object side, in which an aperture stop is disposed more toward the object side than the image-side surface of the fourth lens, and
the imaging lens satisfies conditional formula (2) below:

$$-4.1 < R1/f < 0.0 \qquad (2),$$ where f: the focal length of the entire system, and
R1: the radius of curvature of the object-side surface of the first lens.

A third imaging lens of the present invention consists essentially of a first lens having a negative power, a second lens having a positive power, a third lens having a negative power, a fourth lens having a positive power, a fifth lens having a positive power, and a sixth lens having a negative power in this order from the object side, in which an aperture stop is disposed more toward the object side than the image-side surface of the fourth lens, and
the imaging lens satisfies conditional formula (3) below:

$$0 < f4/f5 < 0.45 \qquad (3),$$ where f4: the focal length of the fourth lens, and
f5: the focal length of the fifth lens.

The imaging lens of the present invention consists essentially of six lenses. However, lenses substantially without any refractive power; optical elements other than lenses such stops, cover glasses and the like; lens flanges; lens barrels; image sensors; and mechanical components such as image stabilization mechanisms may be included in addition to the six lenses.

Further, in the present invention, surface shapes of lenses, such as a convex surface, a concave surface, a planar surface, biconcave, meniscus, biconvex, plano-convex, plano-concave, and the like; and signs of the refractive powers of lenses, such as positive and negative, should be considered in a paraxial region if aspheric surfaces are included therein, unless otherwise noted. Moreover, in the present invention, the sign of the radius of curvature is positive in the case that a surface shape is convex on the object side, and negative in the case that the surface shape is convex on the image side. The expression "the center of the lens surface has a positive power" intends to mean that a value of a paraxial radius of curvature is such that the lens surface forms a convex surface. Further, the expression "the center of the lens surface has a negative power" intends to mean that a value of a paraxial radius of curvature is such that the lens surface forms a concave surface.

Note that in the first imaging lens through the third imaging lens of the present invention, the materials of the third lens, the fourth lens, the fifth lens, and the sixth lens may be plastic.

Further, in the first imaging lens through the third imaging lens of the present invention, an aperture stop may be provided between the object-side surface of the second lens and the image-side surface of the fourth lens.

Further, in the first imaging lens through the third imaging lens of the present invention, the object-side surface of the fourth lens is an aspherical surface, both of the center and the edge of the effective diameter have a positive power, and the positive power at the edge of the effective diameter is weaker than that of the center.

The expression "having a positive power at the edge of the effective diameter" means having a convex shape at the edge of the effective diameter. The expression "having a negative power at the edge of the effective diameter" means having a concave shape at the edge of the effective diameter.

The expression "a shape in which a power at the edge of the effective diameter is weaker than that of the center" means "a shape in which a power at the edge of the effective diameter is weaker than that of the center" both in cases where the power is positive and where the power is negative.

In the first imaging lens through the third imaging lens of the present invention above, it is preferable for conditional formulas (4) through (12) to be satisfied. Note that preferably, the imaging lens may have a configuration, in which any one of conditional formulas (4) through (12) below is satisfied, or may have a configuration in which an arbitrary combination of two or more of the conditional formulas are satisfied.

$$f56/f < -6.4 \tag{4}$$

$$f34/f56 < 0.0 \tag{5}$$

$$0.0 < f34/f \tag{6}$$

$$2.0 < f3456/f \tag{7}$$

$$0.9 < vd2/vd3 \tag{8}$$

$$-2.5 < f3/f < -0.5 \tag{9}$$

$$-3.0 < f3/f4 < -0.2 \tag{10}$$

$$0.2 < f12/f < 5.0 \tag{11}$$

$$(Nd1+Nd2+Nd3+Nd4+Nd5+Nd6)/6 < 1.70 \tag{12}$$

where f: the focal length of the entire system,
f3: the focal length of the third lens,
f4: the focal length of the fourth lens,
f12: the combined focal length of the first lens and the second lens,
f34: the combined focal length of the third lens and the fourth lens,
f56: the combined focal length of the fifth lens and the sixth lens,
f3456: the combined focal length of the third lens, the fourth lens, the fifth lens and the
sixth lens,
Nd1 through Nd6: the refractive indices of the materials of the first lens through the sixth lens with respect to the d-line,
vd2: the Abbe number of the material of the second lens with respect to the d-line, and
vd3: the Abbe number of the material of the third lens with respect to the d-line.

The imaging apparatus of the present invention is mounted with at least any one of the first imaging lens through the third imaging lens of the present invention described above.

According to the first imaging lens of the present invention, a power arrangement, and the like in the entire system are suitably set in a lens system constituted by the minimum number of lenses, i.e., six lenses, and conditional formula (1) is satisfied. This realizes an imaging lens which is capable of achieving miniaturization, low cost, and a wider angle of view, and which has having high optical performance by which back focus can be secured, various aberrations can be favorably corrected and fine images can be obtained through the peripheral portions of the imaging area.

According to the second imaging lens of the present invention, a power arrangement, an arrangement of an apertuere stop, and the like in the entire system are suitably set in a lens system constituted by the minimum number of lenses, i.e., six lenses and conditional formula (2) is satisfied. This realizes an imaging lens which is capable of achieving miniaturization, low cost, and a wider angle of view, and which has high optical performance, by which back focus can be secured, various aberrations can be favorably corrected, and fine images can be obtained through the peripheral portions of the imaging area.

According to the third imaging lens of the present invention, a power arrangement, an arrangement of an aperture stop, and the like in the entire system are suitably set in a lens system constituted by the minimum number of lenses, i.e., six lenses, and conditional formula (3) is satisfied. This realizes an imaging lens which is capable of securing back focus while achieving miniaturization, low cost, and a wider angle of view; and having high optical performance by which various aberrations can be favorably corrected and fine images can be obtained through the peripheral portions of the imaging area.

According to the imaging apparatus of the present invention, the imaging apparatus is provided with the imaging lens of the present invention. This enables the imaging apparatus to be configured in a small size and at low cost, to perform photography at a wide angle of view, and to obtain favorable images having high resolution.

BRIEF DESCRIPTION OF THE DRAWINGS

FIG. 3 is a cross-sectional view illustrating the lens configuration of an imaging lens of Example 1 of the present invention.

FIG. 4 is a cross-sectional view illustrating the lens configuration of an imaging lens of Example 2 of the present invention.

FIG. 9 is a cross-sectional view illustrating the lens configuration of an imaging lens of Example 7 of the present invention.

FIG. 10 is a cross-sectional view illustrating the lens configuration of an imaging lens of Example 8 of the present invention.

Figure 18:
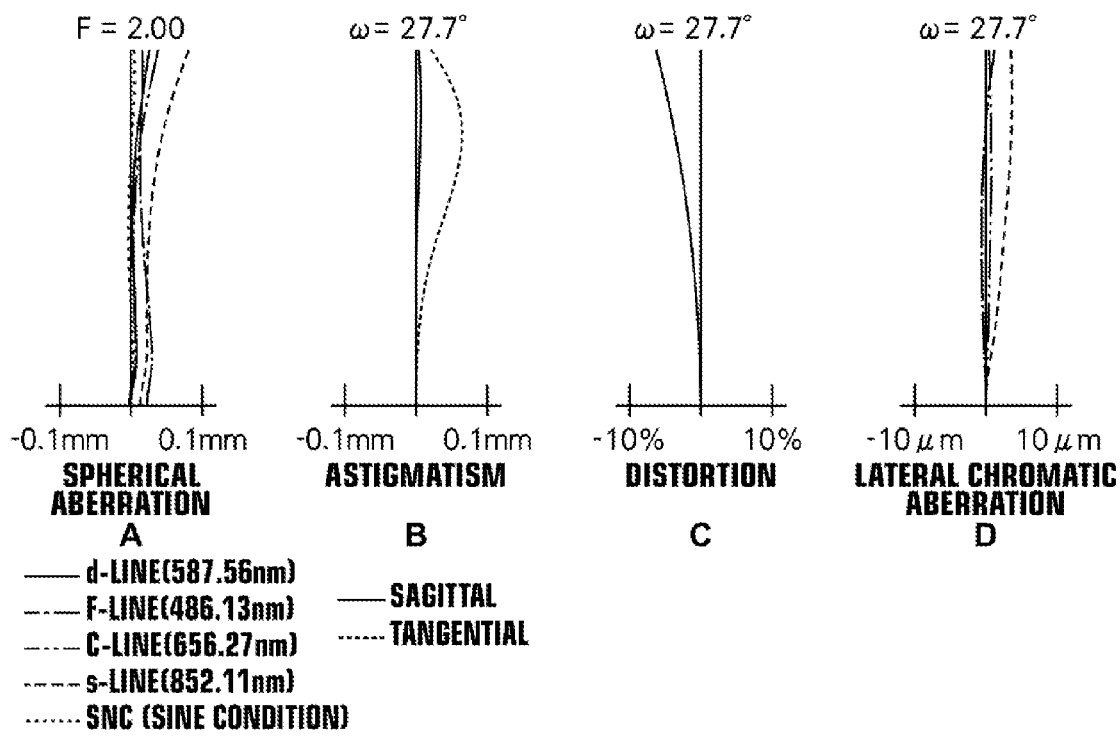

A through D of FIG. 18 respectively illustrate aberration diagrams of the imaging lens of Example 1 of the present invention.

A through D of FIG. 19 respectively illustrate aberration diagrams of the imaging lens of Example 2 of the present invention.

A through D of FIG. 20 respectively illustrate aberration diagrams of the imaging lens of Example 3 of the present invention.

A through D of FIG. 21 respectively illustrate aberration diagrams of the imaging lens of Example 4 of the present invention.

A through D of FIG. 22 respectively illustrate aberration diagrams of the imaging lens of Example 5 of the present invention.

A through D of FIG. 23 respectively illustrate aberration diagrams of the imaging lens of Example 6 of the present invention.

A through D of FIG. 24 respectively illustrate aberration diagrams of the imaging lens of Example 7 of the present invention.

A through D of FIG. 25 respectively illustrate aberration diagrams of the imaging lens of Example 8 of the present invention.

A through D of FIG. 26 respectively illustrate aberration diagrams of the imaging lens of Example 9 of the present invention.

A through D of FIG. 27 respectively illustrate aberration diagrams of the imaging lens of Example 10 of the present invention.

A through D of FIG. 28 respectively illustrate aberration diagrams of the imaging lens of Example 11 of the present invention.

A through D of FIG. 29 respectively illustrate aberration diagrams of the imaging lens of Example 12 of the present invention.

A through D of FIG. 30 respectively illustrate aberration diagrams of the imaging lens of Example 13 of the present invention.

A through D of FIG. 31 respectively illustrate aberration diagrams of the imaging lens of Example 14 of the present invention.

A through D of FIG. 32 respectively illustrate aberration diagrams of the imaging lens of Example 15 of the present invention.

Figure 33:
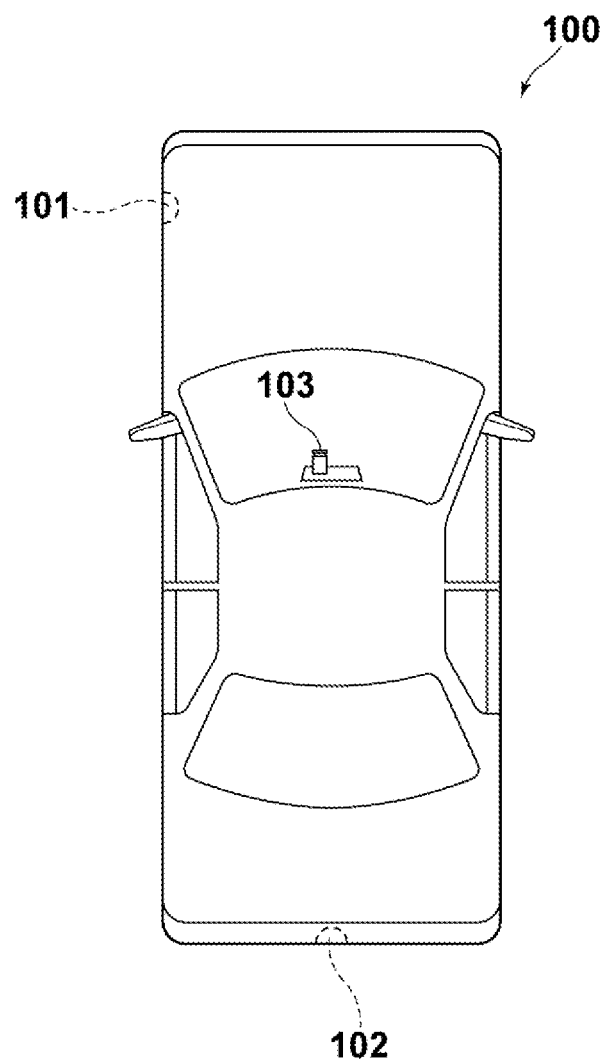

FIG. 33 is a view for explaining an arrangement of a vehicle mounted imaging apparatus according to the embodiment of the present invention.

DESCRIPTION OF THE PREFERRED EMBODIMENTS

Hereinafter, embodiments of the present invention will be described in detail with reference to the accompanying drawings.

[Embodiment of the Imaging Lens]

Figure 1:
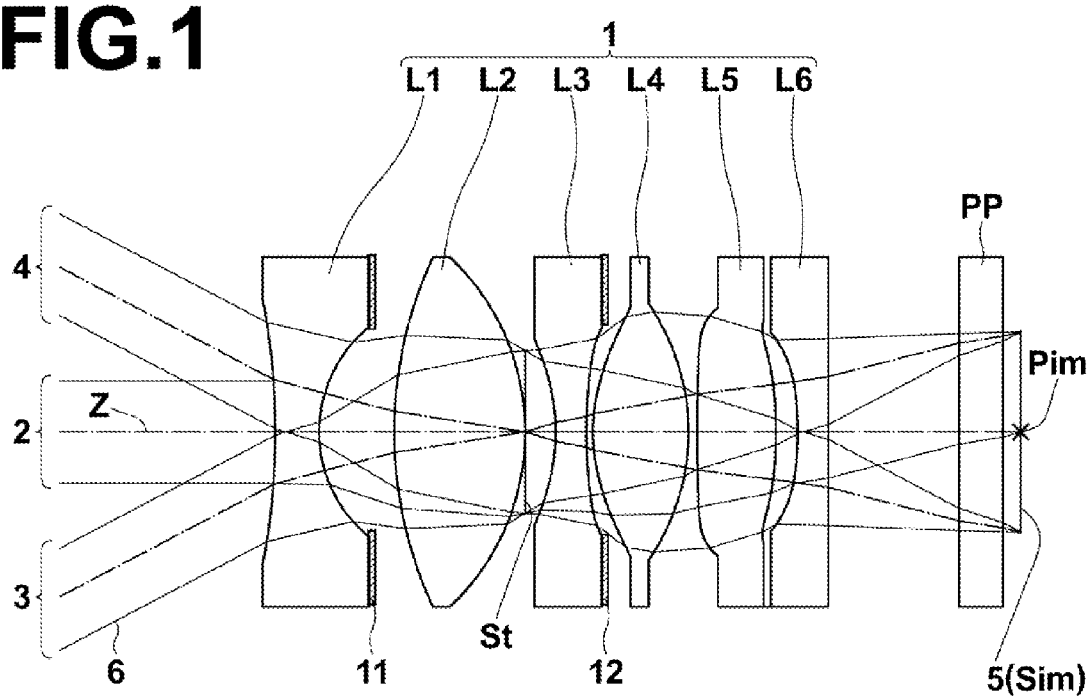
FIG. 1 is a view illustrating a lens configuration and optical paths of an imaging lens of one embodiment of the present invention.

First, the imaging lens according to the embodiment of the present invention will be described referring to FIG. 1. FIG. 1 is a view illustrating a lens configuration and optical paths of an imaging lens 1 according to the embodiment of the present invention. Note that the imaging lens 1 shown in FIG. 1 corresponds to an imaging lens according to Example 1 of the present invention to be described later.

In FIG. 1, the left side of the figure is the object side, and the right side thereof is the image side. In addition, FIG. 1 also shows axial rays 2 from an object point at an infinite distance and off-axis rays 3, 4 at a full angle of view $2\omega$. Further, FIG. 1 shows an image sensor 5 disposed on the imaging plane Sim which includes an image point Pim of the imaging lens 1, taking the case of applying the imaging lens 1 to an imaging apparatus into consideration. The image sensor 5 converts an optical image formed by the imaging lens 1 into an electric signal. A CCD image sensor, a CMOS image sensor, or the like may be employed as the image sensor, for example.

When the imaging lens 1 is applied to the imaging apparatus, it is preferable for a cover glass, a low-pass filter, an infrared cut filter, or the like to be provided according to the configurations of a camera on which the lens is mounted. FIG. 1 illustrates an example in which a plane parallel optical member PP that presumes such components is provided between the most-image-side lens and the image sensor 5 (the imaging plane Sim).

First, the configuration of the first embodiment of the present invention will be described. The imaging lens according to the first embodiment of the present invention includes a first lens L1 having a negative power, a second lens L2 having a positive power, a third lens L3 having a negative power, a fourth lens L4 having a positive power, a fifth lens L5 having a positive power, and a sixth lens L6 having a negative power in this order from the object side. In the example shown in FIG. 1, an aperture stop St is disposed between the second lens L2 and the third lens L3. Note that the aperture stop St shown in FIG. 1 does not necessarily represent the size or shape thereof, but represents the position thereof on the optical axis Z.

Further, the imaging lens of the first embodiment is configured to satisfy conditional formula (1) below:

$$2.38 < f5/f \quad (1),\text{ where}$$

f: the focal length of the entire system, and
f5: the focal length of the fifth lens L5.

Satisfying the lower limit defined by conditional formula (1) enables the power of the fifth lens L5 to be suppressed, and facilitates securing back focus and correcting field curvature and comatic aberration. Securing a sufficient amount of back focus facilitates disposing various types of filters, a cover glass, or the like between the lens system and the image sensor as well as facilitating setting the exit pupil position far from the imaging plane. Thereby, suppressing the angles at which the peripheral rays enter the image sensor will be facilitated, resulting in facilitating suppression of shading.

Constituting the imaging lens of the first embodiment by the minimum number of lenses, i.e., six lenses enables low cost and reduction in the total length in the direction of the optical axis to be achieved. Further, an imaging lens which has high optical performance, by which back focus can be secured, various aberrations can be favorably corrected and fine images can be obtained through the peripheral portions of the imaging area, can be realized.

Next, the configuration of the second embodiment of the present invention will be described. The imaging lens according to the second embodiment of the present invention includes a first lens L1 having a negative power, a second lens L2 having a positive power, a third lens L3 having a negative power, a fourth lens L4 having a positive power, a fifth lens L5 having a positive power, and a sixth lens L6 having a negative power in this order from the object side. Further, in an example shown in FIG. 1, an aperture stop St is disposed more toward the object side than the image-side surface of the fourth lens L4, more particularly between the second lens L2 and the third lens L3.

Further, the imaging lens of the second embodiment is configured to satisfy conditional formula (2) below:

$$-4.1<R1/f<0.0 \quad (2),$$ where f: the focal length of the entire system, and
R1: the radius of curvature of the object-side surface of the first lens L1.

Satisfying the upper limit defined by conditional formula (2) enables the object-side surface of the first lens L1 to be made a concave surface, and facilitates increasing the power of the first lens L1, securing back focus, and reducing the size of the lens system in the radial direction. Satisfying the lower limit defined by conditional formula (2) facilitates preventing the radius of curvature of the object-side surface of the first lens L1 from excessively decreasing, and facilitates suppressing distortion and preventing the total length from becoming too long.

Constituting the imaging lens of the second embodiment by the minimum number of lenses, i.e., six lenses enables low cost and reduction in the total length in the direction of the optical axis to be achieved. In addition, as the aperture stop St is disposed more toward the object side than the image-side surface of the fourth lens L4, reducing the diameter of each lens will be facilitated. Further, an imaging lens that has high optical performance, by which back focus can be secured, various aberrations can be favorably corrected and fine images can be obtained through the peripheral portions of the imaging area, can be realized.

Next, the configuration of the third embodiment of the present invention will be described. The imaging lens according to the third embodiment of the present invention includes a first lens L1 having a negative power, a second lens L2 having a positive power, a third lens L3 having a negative power, a fourth lens L4 having a positive power, a fifth lens L5 having a positive power, and a sixth lens L6 having a negative power in this order from the object. Further, in the example shown in FIG. 1, an aperture stop St is disposed more toward the object side than the image-side surface of the fourth lens L4, more particularly between the second lens L2 and the third lens L3.

Further, the imaging lens of the third embodiment is configured to satisfy conditional formula (3) below:

$$0<f4/f5<0.45 \quad (3),$$ where f4: the focal length of the fourth lens L4, and
f5: the focal length of the fifth lens L5.

Satisfying the upper limit defined by conditional formula (3) facilitates causing the power of the fourth lens L4 to be greater than that of the fifth lens L5. Increasing the power of the fourth lens L4 facilitates correcting chromatic aberration between the third lens L3 and the fourth lens L4 and enables the power of the fifth lens L5 to be suppressed. Further, securing back focus will be facilitated, and correcting field curvature and comatic aberration will be facilitated as well. Setting the value of the lower limit defined by conditional formula (3) to be 0 will cause the power of the fourth lens L4 to become too strong or the power of the fifth lens L5 to become too weak, resulting in correction of spherical aberration becoming difficult. Satisfying the lower limit defined by conditional formula (3) facilitates suppressing the power of the fourth lens L4 or preventing the power of the fifth lens L5 from becoming too weak, resulting in correction of spherical aberration being facilitated.

Constituting the imaging lens of the third embodiment by the minimum number of lenses, i.e., six lenses enables low cost and reduction in the total length in the direction of the optical axis to be achieved. In addition, as the aperture stop St is disposed more toward the object side than the image-side surface of the fourth lens L4, reducing the diameter of each lens will be facilitated. Further, an imaging lens that has high optical performance, by which back focus can be secured, various aberrations can be favorably corrected and fine images can be obtained through the peripheral portions of the imaging area, can be realized.

Next, preferable configurations of the imaging lenses according to the first through third embodiments above of the present invention and the advantageous effects thereof will be described. Note that preferably, the imaging lens may have any one of the configurations below, or may have an arbitrary combination of two or more of the configurations.

It is preferable for conditional formula (4) below to be satisfied:

$$f56/f<-6.4 \quad (4),$$ where f: the focal length of the entire system, and
f56: the combined focal length of the fifth lens L5 and the sixth lens L6.

Satisfying the upper limit defined by conditional formula (4) facilitates preventing the combined power of the fifth lens L5 and the sixth lens L6, which is negative, from becoming too strong. Thereby, correcting field curvature will be facilitated and suppressing the angles at which the rays enter the image sensor will be facilitated as well. Further, as suppressing the combined power of the fifth lens L5 and the sixth lens L6 becomes easy, suppressing focus shift caused by changes in temperature will be facilitated in the case that the fifth lens L5 and the sixth lens L6 are made of plastics.

It is preferable for conditional formula (5) below to be satisfied:

$$f34/f56<0.0 \quad (5),$$ where f34: the combined focal length of the third lens L3 and the fourth lens L4, and
f56: the combined focal length of the fifth lens L5 and the sixth lens L6.

Satisfying the upper limit defined by conditional formula (5) makes the value of conditional formula (5) negative. Therefore, one of f34 and f56 can be made positive and the other can be made negative. Accordingly, focus shift caused by changes in temperature can be easily suppressed by the positive and negative powers cancelling each other out when the temperature changes.

It is preferable for both conditional formula (5) and conditional formula (6) below to be satisfied:

$$0.0<f34/f \quad (6).$$

Satisfying conditional formula (6) enables the value of f34 to be made positive. Satisfying the upper limit defined by conditional formula (5) and conditional formula (6) at the same time enables the values of f34 and f56 to be positive and negative in respective and enables focus shift due to changes in the temperature to be suppressed.

It is preferable for the materials of the third lens L3, the fourth lens L4, the fifth lens L5 and the sixth lens L6 to be plastic. This enables the lens to be configured at low cost.

It is preferable for conditional formula (7) below to be satisfied:

$$2.0<f3456/f \quad (7),$$ where f3456: the combined focal length of the third lens L3, the fourth lens L4, the fifth lens L5 and the sixth lens L6.

Satisfying the lower limit defined by conditional formula (7) facilitates preventing the combined power of the third lens L3 through the sixth lens L6 from becoming too strong as a positive power and facilitates securing back focus.

Further, it is preferable for the materials of the third lens L3, the fourth lens L4, the fifth lens L15 and the sixth lens L6 to be plastic and for conditional formula (7) above to be satisfied. This facilitates preventing the combined focal length of the plastic lenses from becoming too strong as a positive power and facilitates suppressing focus shift.

It is preferable for conditional formula (8) below to be satisfied:

$$0.9 < vd2/vd3 \quad (8),\text{ where}$$

vd2: the Abbe number of the material of the second lens L2 with respect to the d-line, and
vd3: the Abbe number of the material of the third lens L3 with respect to the d-line.

Decreasing the Abbe number of the third lens L3 will be advantageous from the viewpoint of correcting longitudinal chromatic aberration. Satisfying the lower limit defined by conditional formula (8) facilitates balancing the ratios of the Abbe number of of the materials of the second lens L2 and the third lens L3 and facilitates correcting chromatic aberration.

It is preferable for conditional formula (9) to be satisfied:

$$-2.5 < f3/f < -0.5 \quad (9),\text{ where}$$

f: the focal length of the entire system, and
f3: the focal length of the third lens L3.

Satisfying the lower limit defined by conditional formula (9) facilitates increasing the power of the third lens L3, thereby facilitating reducing longitudinal chromatic aberration. Satisfying the upper limit defined by conditional formula (9) facilitates suppressing the error sensitivity of the third lens L3, thereby facilitating manufacturing a lens which is resistant to axial displacement and the like.

It is preferable for the aperture stop St to be provided more toward the object side than the image-side surface of the fourth lens L4. Disposing the aperture stop St more toward the object side than the fourth lens L4 facilitates reducing the diameters of the lenses. It is preferable for the aperture stop St to be disposed between the first lens L1 and the second lens L2. This facilitates miniaturization of the first lens L1. For example, when the imaging lens is used as a vehicle mounted camera, there is demand for a lens surface which is exposed outside to be made small so as to improve the appearance of the car. Disposing the aperture stop St between the first lens L1 and the second lens L2 enables the lens which is exposed outside to be reduced in the size and facilitates improving the appearance of the car.

It is preferable for the aperture stop St to be disposed between the second lens L2 and the third lens L3 or between the third lens L3 and the fourth lens L4. This improves balance of the diameters of the lenses at the front and back of the aperture stop St and facilitates suppressing the maximum diameters of the lenses, resulting in facilitating miniaturization of the lens. Further, disposing the aperture stop St between the second lens L2 and the third lens L3 facilitates suppressing the angles at which the rays enter the image sensor while keeping a good balance of the diameters of the lenses at the front and back of the aperture stop St, resulting in facilitating suppressing the occurrence of shading.

It is preferable for conditional formula (10) below to be satisfied:

$$-3.0 < f3/f4 < -0.2 \quad (10),\text{ where}$$

f3: the focal length of the third lens L3, and
f4: the focal length of the fourth lens L4.

Satisfying the upper and lower limits defined by conditional formula (10) can make good power balance between the third lens L3 and the fourth lens L4, thereby facilitating correction of chromatic aberration. Satisfying the upper limit defined by conditional formula (10) can prevents the power of the third lens L3 from becoming too strong, resulting in correction of field curvature being facilitated, or can prevents the power of the fourth lens L4 from becoming too weak, resulting in correction of spherical aberration and field curvature being facilitated. Satisfying the lower limit defined by conditional formula (10) can prevent the power of the third lens L3 from becoming too weak, resulting in correction of longitudinal chromatic aberration being facilitated, or can prevent the power of the fourth lens L4 from becoming too strong, resulting in correction of spherical aberration and securing of back focus being facilitated.

It is preferable for conditional formula (11) below to be satisfied:

$$0.2 < f12/f < 5.0 \quad (11),\text{ where}$$

f: the focal length of the entire system, and
f12: the combined focal length of the first lens L1 and the second lens L2.

Satisfying the upper limit defined by conditional formula (11) facilitates increasing the combined power of the first lens L1 and the second lens L2, resulting in facilitating correction of spherical aberration and field curvature. Satisfying the lower limit defined by conditional formula (11) facilitates preventing the combined power of the first lens L1 and the second lens L2 from becoming too strong as a positive power, resulting in correction of field curvature being facilitated.

It is preferable for three or less of the refractive indices among the refractive indices Nd1 through Nd6 of the materials of the first lens L1 through the sixth lens L6 with respect to the d-line to exceed 1.8. A refractive index exceeding 1.8 will increase the cost for the material of the lens. Therefore, it is preferable for the number of the refractive indices which exceed 1.8 to be three or less, even more preferably two or less and still more preferably one or less.

It is preferable for conditional formula (12) below to be satisfied:

$$(Nd1+Nd2+Nd3+Nd4+Nd5+Nd6)/6 < 1.70 \quad (12),\text{ where}$$

Nd1 through Nd6: the refractive indices of the materials of the first lens L1 through the sixth lens L6 with respect to the d-line.

Satisfying the upper limit defined by conditional formula (12) facilitates suppressing the refractive index of each lens, resulting in reduction of the cost for the material being facilitated.

It is preferable for the number of the refractive indices which exceed 1.8 among the refractive indices Nd1 through Nd6 of the materials of the first lens L1 through the sixth lens L6 with respect to the d-line to be three or less, and for conditional formula (12) to be satisfied. This facilitates suppressing the refractive index of each lens, thereby facilitating the reduction in the cost for the material.

It is preferable for conditional formula (13) below to be satisfied:

$$2.0 < L/f < 7.0 \quad (13),\text{ where}$$

L: the distance from the object-side surface of the first lens L1 to the imaging plane (back focus corresponds to the air converted length), and
f: the focal length of the entire system.

Setting the value of L/f to exceed the upper limit defined by conditional formula (13) will increase the total length of the lens, resulting in miniaturization becoming difficult. Setting the value of L/f to fall below the lower limit defined by conditional formula (13) will make it difficult to widen the angle of view or will make the total length too short, thereby each lens becoming thin. As the result, manufacturing the lens will be difficult or the cost will increase.

It is preferable for conditional formula (14) below to be satisfied:

$$0.3<Bf/f<1.5 \qquad (14),$$ where

Bf: the distance from the image-side surface of the sixth lens L6 to the imaging plane (the air converted length), and
f: the focal length of the entire system.

Setting the value of Bf/f to exceed the upper limit defined by conditional formula (14) will increase the amount of back focus, resulting in the size of the lens system being increased. Setting the value of Bf/f to fall below the lower limit defined by conditional formula (14) will make back focus too short, resulting in making it difficult to dispose various types of filters, a cover glass, or the like between the lens system and the image sensor.

Note that regarding the distance L from the object-side surface of the first lens L1 to the imaging plane along the optical axis and the distance Bf from the image-side surface of the most-image-side lens (the sixth lens L6) to the imaging plane along the optical axis, an air converted length will be applied for the distance between the most-image-side lens and the imaging plane (in the case that a cover glass or various types of filters are disposed therebetween, the length corresponding thereto will be calculated in terms of an air converted length).

It is preferable for conditional formula (15) below to be satisfied:

$$45.0<(vd2+vd4+vd5)/3 \qquad (15),$$ where vd2: the Abbe number of the material of the second lens L2 with respect to the d-line,
vd4: the Abbe number of the material of the fourth lens L4 with respect to the d-line, and
vd5: the Abbe number of the material of the fifth lens L5 with respect to the d-line.

Satisfying the lower limit defined by conditional formula (15) facilitates increasing the Abbe number of each lens, thereby facilitating correction of longitudinal chromatic aberration and lateral chromatic aberration.

Note that it is preferable for the conditional formulas below, in which upper limits are added to the conditional formulas above or the lower or upper limits are changed in the conditional formulas above to be further satisfied so as to improve the above advantageous effects. In addition, preferably, the conditional formulas to be described below, each of which is configured by combining a changed value of the lower limit and a changed value of the upper limit, may be satisfied. Preferred modifications of conditional formulas will be described below as an example, but the modifications of conditional formulas are not limited to those listed below and the changed values described below may be combined.

It is preferable for conditional formula (1) to be provided with an upper limit, and for the upper limit defined by conditional formula (1) to be 30.0. This facilitates preventing the power of the fifth lens L5 from becoming too weak, thereby facilitating correction of spherical aberration. Further, it is preferable for the upper limit defined by conditional formula (1) to be 20.0, more preferably 17.0, and even more preferably 8.0 in order to further facilitate correction of spherical aberration. It is preferable for the lower limit defined by conditional formula (1) to be 2.5, more preferably 3.0, and even more preferably 3.2. As described above, it is more preferable for conditional formulas (1-1) through (1-3) below to be satisfied, for example:

$$2.5<f5/f<20.0 \qquad (1\text{-}1)$$

$$3.0<f5/f<17.0 \qquad (1\text{-}2)$$

$$3.2<f5/f<17.0 \qquad (1\text{-}3).$$

It is preferable for the upper limit defined by conditional formula (2) to be −1.0. This further facilitates increasing the power of the first lens L1, and facilitates securing back focus and reducing the size of the lens system in the radial direction. Note that it is preferable for the upper limit defined by conditional formula (2) to be −2.0, and more preferably −2.5. Further, it is preferable for the lower limit defined by conditional formula (2) to be −3.9, more preferably −3.8, and even more preferably −3.7. As described above, it is more preferable for conditional formulas (2-1) through (2-3) below to be satisfied, for example:

$$-3.9<R1/f<-1.0 \qquad (2\text{-}1)$$

$$-3.9<R1/f<-2.0 \qquad (2\text{-}2)$$

$$-3.8<R1/f<-2.5 \qquad (2\text{-}3).$$

It is preferable for the upper limit defined by conditional formula (3) to be 0.40, more preferably 0.35, and even more preferably 0.30. Further, it is preferable for the lower limit defined by conditional formula (3) to be 0.02. This facilitates suppressing the power of the fourth lens L4 or preventing the power of the fifth lens L5 from excessively decreasing, resulting in correction of spherical aberration being facilitated. Note that it is more preferable for the lower limit defined by conditional formula (3) to be 0.05. As described above, it is more preferable for conditional formulas (3-1) through (3-3) below to be satisfied, for example:

$$0.02<f4/f5<0.40 \qquad (3\text{-}1)$$

$$0.02<f4/f5<0.35 \qquad (3\text{-}2)$$

$$0.05<f4/f5<0.35 \qquad (3\text{-}3).$$

It is preferable for the upper limit defined by conditional formula (4) to be −7.0, more preferably −7.2, and even more preferably −7.5. It is preferable for conditional formula (4) to be provided with a lower limit and for the lower limit defined by conditional formula (4) to be −100.0. Thereby, correction of field curvature will be facilitated by preventing the combined power of the fifth lens L5 and the sixth lens L6, which is negative, from excessively decreasing. Further, it is preferable for the lower limit defined by conditional formula (4) to be −50.0, more preferably −45.0, and even more preferably −20.0 in order to further facilitate correction of field curvature. As described above, it is more preferable for conditional formulas (4-1) through (4-3) below to be satisfied, for example:

$$f56/f<-7.0 \qquad (4\text{-}1)$$

$$f56/f<-7.2 \qquad (4\text{-}2)$$

$$-50.0<f56/f<-7.2 \qquad (4\text{-}3).$$

It is preferable for the upper limit defined by conditional formula (5) to be −0.02, more preferably −0.04, and even more preferably −0.06. In the case that conditional formula (6) is satisfied, it is preferable for conditional formula (5) to be provided with a lower limit and the lower limit defined by conditional formula (5) to be −1.5. This facilitates increasing the positive power of f34, thereby further facilitating suppressing focus shift and correcting filed curvature. Further, it is preferable for the lower limit defined by conditional formula (5) to be −1.2, more preferably −1.0, even more preferably −0.9, still more preferably −0.7, and even still more preferably −0.6 in order to facilitate suppression of focus shift and correction of field curvature. As described above, it is more preferable for conditional formulas (5-1) through (5-4) below to be satisfied, for example:

$$-1.5 < f34/f56 < 0.0 \tag{5-1}$$

$$-0.9 < f34/f56 < 0.0 \tag{5-2}$$

$$-1.2 < f34/f56 < -0.05 \tag{5-3}$$

$$-0.7 < f34/f56 < -0.02 \tag{5-4}$$

It is preferable for conditional formula (7) to be provided with an upper limit and for the upper limit defined by conditional formula (7) to be 6.0. This enables the combined power of the third lens L3 through the sixth lens L6 to be prevented from excessively decreasing, and facilitates suppressing the angles at which the rays enter the imaging surface and correcting field curvature. It is preferable for the upper limit defined by conditional formula (7) to be 5.0, and more preferably 4.0. It is preferable for the lower limit defined by conditional formula (7) to be 2.5, more preferably 2.7, and even more preferably 2.8. As described above, it is more preferable for conditional formulas (7-1) through (7-3) below to be satisfied, for example:

$$2.5 < f3456/f < 6.0 \tag{7-1}$$

$$2.5 < f3456/f < 5.0 \tag{7-2}$$

$$2.7 < f3456/f < 4.0 \tag{7-3}$$

It is preferable for conditional formula (8) to be provided with an upper limit and for the upper limit defined by conditional formula (8) to be 3.5. This causes the Abbe number of the third lens L3 to excessively decrease or the Abbe number of the second lens L2 to excessively increase, resulting in avoiding high cost becoming easy. Further, decreasing the Abbe number of the third lens L3 will cause the refractive index of the third lens L3 to increase and enable the power of the third lens L3 to be prevented from excessively increasing, resulting in correction of field curvature being facilitated. It is preferable for the upper limit defined by conditional formula (8) to be 3.0, and more preferably 2.5. It is preferable for the lower limit defined by conditional formula (8) to be 1.0, more preferably 1.2, and even more preferably 1.5. As described above, it is more preferable for conditional formulas (8-1) through (8-3) below to be satisfied, for example:

$$1.0 < vd2/vd3 < 3.5 \tag{8-1}$$

$$1.2 < vd2/vd3 < 3.0 \tag{8-2}$$

$$1.5 < vd2/vd3 < 2.5 \tag{8-3}$$

It is preferable for the upper limit defined by conditional formula (9) to be −0.6, more preferably −0.7, and even more preferably −0.8. It is preferable for the lower limit defined by conditional formula (9) to be −2.2, more preferably −2.0, even more preferably −1.8, and still more preferably −1.7. As described above, it is more preferable for conditional formulas (9-1) through (9-3) below to be satisfied, for example:

$$-2.2 < f3/f < -0.6 \tag{9-1}$$

$$-2.0 < f3/f < -0.7 \tag{9-2}$$

$$-1.8 < f3/f < -0.8 \tag{9-3}$$

It is preferable for the upper limit defined by conditional formula (10) to be −0.5, more preferably −0.7, and even more preferably −0.8. It is preferable for the lower limit defined by conditional formula (10) to be −2.5, more preferably −2.0, even more preferably −1.8, and still more preferably −1.7. As described above, it is more preferable for conditional formulas (10-1) through (10-3) below to be satisfied, for example:

$$-2.5 < f3/f4 < -0.5 \tag{10-1}$$

$$-2.0 < f3/f4 < -0.7 \tag{10-2}$$

$$-1.8 < f3/f4 < -0.8 \tag{10-3}$$

It is preferable for the upper limit defined by conditional formula (11) to be 4.0, more preferably 3.0, and even more preferably 2.0. It is preferable for the lower limit defined by conditional formula (11) to be 0.5, more preferably 0.8, and even more preferably 1.0. As described above, it is more preferable for conditional formulas (11-1) through (11-3) below to be satisfied, for example:

$$0.5 < f12/f < 4.0 \tag{11-1}$$

$$0.8 < f12/f < 3.0 \tag{11-2}$$

$$1.0 < f12/f < 2.0 \tag{11-3}$$

It is preferable for the upper limit defined by conditional formula (12) to be 1.68, and more preferably 1.64. It is preferable for conditional formula (12) to be provided with a lower limit and for the lower limit defined by conditional formula (12) to be 1.50. This enables the refractive indices of the materials of the first lens L1 through the sixth lens L6 with respect to the d-line to be prevented from excessively decreasing and facilitates increasing the power of each lens, thereby facilitating miniaturization of the lens system. It is preferable for the lower limit defined by conditional formula (12) to be 1.55, and more preferably 1.57. As described above, it is more preferable for conditional formulas (12-1) through (12-3) below to be satisfied, for example:

$$1.50 < (Nd1+Nd2+Nd3+Nd4+Nd5+Nd6)/6 < 1.70 \tag{12-1}$$

$$1.55 < (Nd1+Nd2+Nd3+Nd4+Nd5+Nd6)/6 < 1.68 \tag{12-2}$$

$$1.57 < (Nd1+Nd2+Nd3+Nd4+Nd5+Nd6)/6 < 1.64 \tag{12-3}$$

It is preferable for the upper limit defined by conditional formula (13) to be 6.0, more preferably 5.0, and even more preferably 4.5. It is preferable for the lower limit defined by conditional formula (13) to be 2.5, more preferably 2.8, and even more preferably 3.0. As described above, it is more preferable for conditional formulas (13-1) through (13-3) below to be satisfied, for example:

$$2.5 < L/f < 6.0 \tag{13-1}$$

$$2.8 < L/f < 5.0 \tag{13-2}$$

$$3.0 < L/f < 4.5 \tag{13-3}$$

It is preferable for the lower limit defined by conditional formula (14) to be 0.5, more preferably 0.6, and even more preferably 0.65. It is preferable for the upper limit defined by conditional formula (14) to be 1.2, more preferably 1.0, and even more preferably 0.9. As described above, it is more preferable for conditional formulas (14-1) through (14-3) below to be satisfied, for example:

$$0.5 < Bf/f < 1.5 \tag{14-1}$$

$$0.6 < Bf/f < 1.2 \tag{14-2}$$

$$0.6 < Bf/f < 1.0 \tag{14-3}$$

It is preferable for conditional formula (15) to be provided with an upper limit and for the upper limit to be 60.0. Thereby, preventing the Abbe numbers of the materials of the second lens L2, the fourth lens L4, and the fifth lens L5 with respect to the d-line from excessively increasing facilitates increase of the refractive indices of the materials and further increasing the power of each lens facilitates reduction of the diameters of the lenses. Further, it will be easy to prevent the cost for the glass materials from increasing due to an excessive increase in the Abbe numbers of the materials. It is preferable for the upper limit defined by conditional formula (15) to be 58.0, and more preferably 56.0. It is preferable for the lower limit defined by conditional formula (15) to be 47.0, more preferably 49.0, even more preferably 50.0, and still more preferably 51.0. As described above, it is more preferable for conditional formulas (15-1) through (15-3) below to be satisfied, for example:

$$47.0 < (\nu d2 + \nu d4 + \nu d5)/3 \quad (15\text{-}1)$$

$$49.0 < (\nu d2 + \nu d4 + \nu d5)/3 < 60.0 \quad (15\text{-}2)$$

$$51.0 < (\nu d2 + \nu d4 + \nu d5)/3 < 58.0 \quad (15\text{-}3).$$

It is preferable for the Abbe number of the material of the first lens L1 with respect to the d-line to be greater than or equal to 40. This enables longitudinal chromatic aberration and lateral chromatic aberration to be corrected favorably. Further, it is more preferable for the Abbe number of the material of the first lens L1 with respect to the d-line to be greater than or equal to 50, and even more preferably greater than or equal to 55.

It is preferable for the Abbe number of the material of the second lens L2 with respect to the d-line to be greater than or equal to 25. This enables longitudinal chromatic aberration to be corrected favorably. Further, it is more preferable for the Abbe number of the material of the second lens L2 with respect to the d-line to be greater than or equal to 35, and even more preferably greater than or equal to 40.

It is preferable for the Abbe number of the material of the third lens L3 with respect to the d-line to be less than or equal to 35. This enables longitudinal chromatic aberration to be corrected favorably. Further, it is more preferable for the Abbe number of the material of the third lens L3 with respect to the d-line to be less than or equal to 30, even more preferably less than or equal to 28, and still more preferably less than or equal to 26.

It is preferable for the Abbe number of the material of the fourth lens L4 with respect to the d-line to be greater than or equal to 40. This enables longitudinal chromatic aberration and lateral chromatic aberration to be corrected favorably. Further, it is more preferable for the Abbe number of the material of the fourth lens L4 with respect to the d-line to be greater than or equal to 50, and even more preferably greater than or equal to 55.

It is preferable for the the Abbe number of the material of the fifth lens L5 with respect to the d-line to be greater than or equal to 40. This enables longitudinal chromatic aberration and lateral chromatic aberration to be corrected favorably. Further, it is more preferable for the Abbe number of the material of the fifth lens L5 with respect to the d-line to be greater than or equal to 50, and even more preferably greater than or equal to 52.

It is preferable for the Abbe number of the material of the sixth lens L6 with respect to the d-line to be less than or equal to 32. This enables lateral chromatic aberration to be corrected favorably. Further, it is more preferable for the Abbe number of the material of the sixth lens L6 with respect to the d-line to be less than or equal to 26, and even more preferably less than or equal to 25.

It is preferable for at least one side surface of the fourth lens L4 to be aspherical. Configuring at least one side surface of the fourth lens L4 to be aspherical facilitates correction of field curvature and spherical aberration, resulting in enabling favorable resolution to be obtained. It is more preferable for both surfaces of the fourth lens L4 to be aspherical.

It is preferable for the object-side surface of the fourth lens L4 to be aspherical. It is preferable for the object-side surface of the fourth lens L4 to have a shape in which both of the center and the edge of the effective diameter have positive powers and the positive power at the edge of the effective diameter is weaker than that of the center. Configuring the fourth lens L4 to have such a shape facilitates correction of spherical aberration and field curvature.

Note that "the effective diameter of a surface" refers to the diameter of a circle constituted by an outermost point in the radial direction (a point farthest from the optical axis) among points where all of the rays contributing to image formation intersect with lens surfaces, and the term "edge of the effective diameter" refers to this outermost point. Note that in systems which have rotation symmetry with respect to the optical axis, a graphic constituted by the above outermost point is a circle. However, in systems which do not have rotation symmetry, the graphic is not a circle. In such a case, the diameter of an equivalent circle may be the effective diameter.

Further, regarding a shape of an aspherical surface, when a certain point on a lens surface i (i is a symbol which represents the corresponding lens surface. For example, when the object-side surface of the fourth lens L4 is represented by 8, the following description with respect to the object-side surface of the fourth lens L4 can be understood with i as 8.) of each lens is designated as Xi and an intersection of the normal line on the point and the optical axis is designated as Pi; the length (|Xi-Pi|) of Xi-Pi is defined as the absolute value |RXi| of the radius of curvature on the point Xi and Pi is defined as the center of curvature at the point Xi. Further, an intersection of the i-th lens surface and the optical axis is designated as Qi. In this case, a power at a point Xi is defined depending on whether a point Pi is on the object side or the image side based on a point Qi as the reference. In the object-side surface, in the case that a point Pi is toward the image side than a point Qi, the power is defined as positive, whereas in the case that the point Pi is toward the object side than the Qi, the power is defined as negative. In the image-side surface, in the case that the point Pi is toward the object side than the point Qi, the power is defined as positive, whereas in the case that the point Pi is toward the image side than the point Qi, the power is defined as negative.

When the power in the center is compared to the power at the point Xi, the absolute value of the radius of curvature in the center (paraxial radius of curvature) is compared to the absolute value |RXi| of the radius of curvature at the point Xi. In the case that |RXi| is smaller than the absolute value of the paraxial radius of curvature, the power at the point Xi is greater than the power in the center. In contrast, in the case that |RXi| is greater than the absolute value of the paraxial radius of curvature, the power at the point Xi is weaker than the power in the center. The same applies to both the case that a surface has the positive power and the case that a surface has the negative power.

Figure 2:
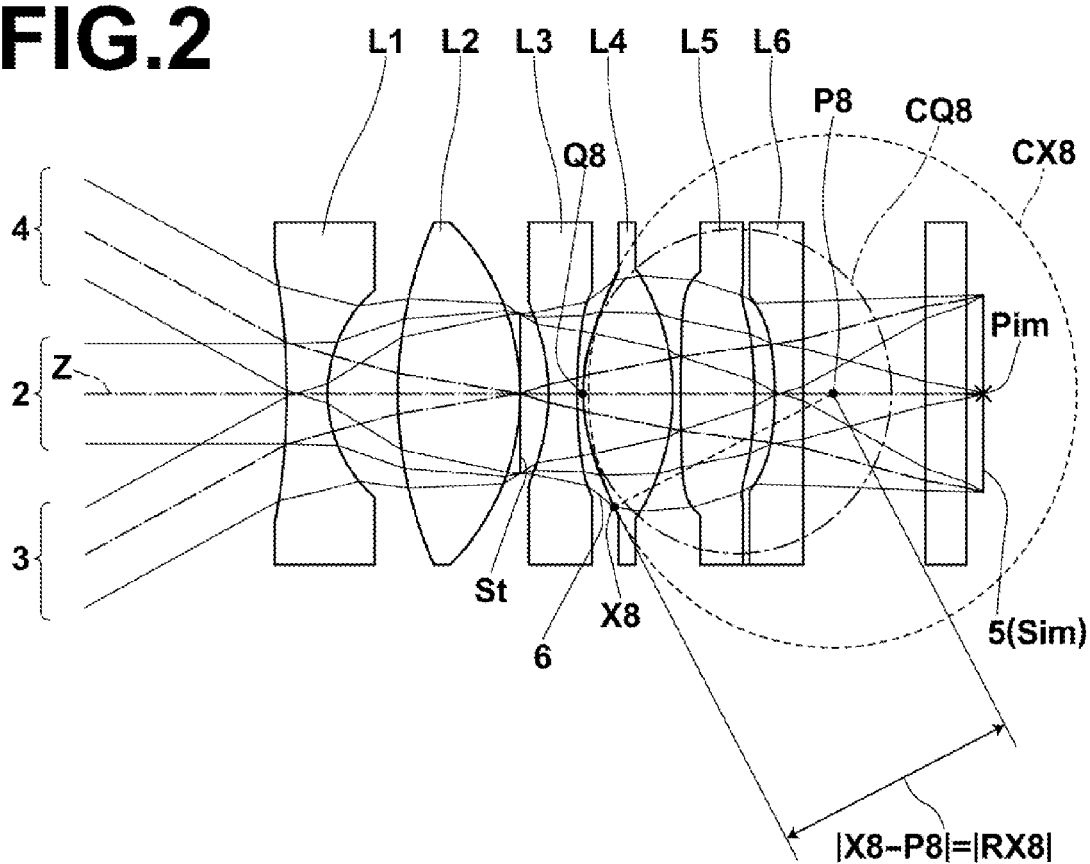
FIG. 2 is a view for explaining a surface shape and the like of the fourth lens.
Figure 5:
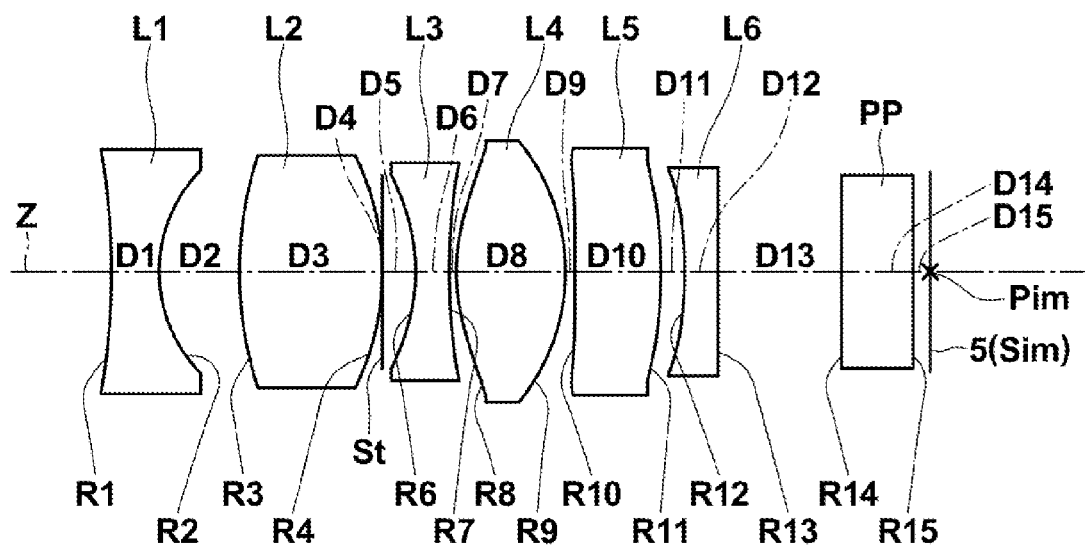
FIG. 5 is a cross-sectional view illustrating the lens configuration of an imaging lens of Example 3 of the present invention.
Figure 6:
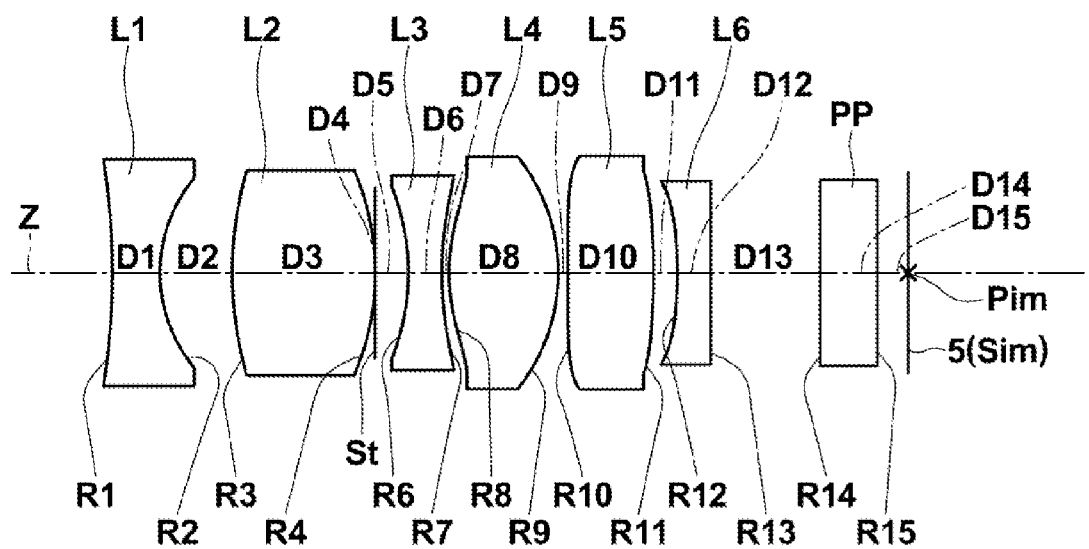
FIG. 6 is a cross-sectional view illustrating the lens configuration of an imaging lens of Example 4 of the present invention.
Figure 7:
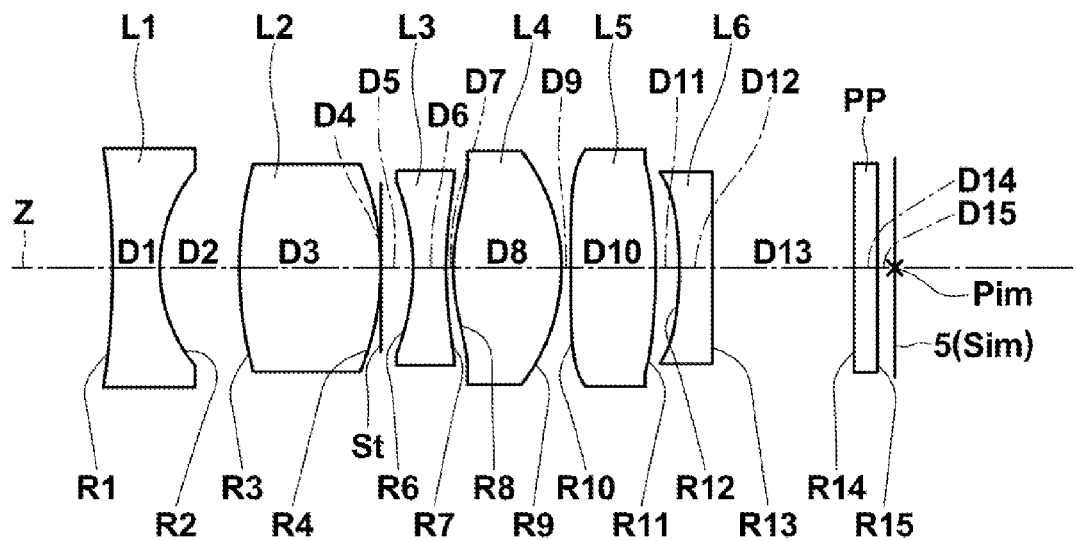
FIG. 7 is a cross-sectional view illustrating the lens configuration of an imaging lens of Example 5 of the present invention.
Figure 8:
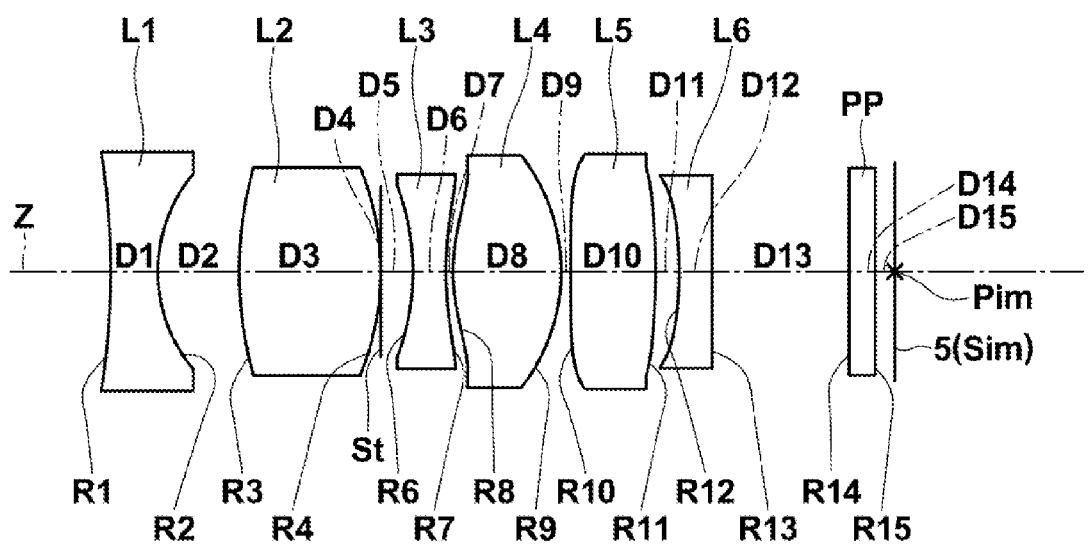
FIG. 8 is a cross-sectional view illustrating the lens configuration of an imaging lens of Example 6 of the present invention.
Figure 11:
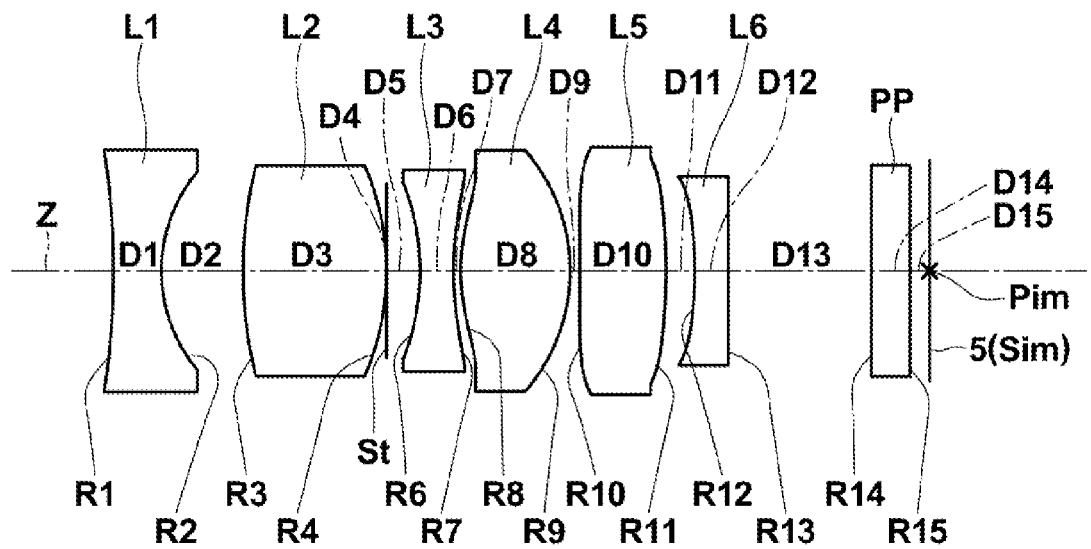
FIG. 11 is a cross-sectional view illustrating the lens configuration of an imaging lens of Example 9 of the present invention.
Figure 12:
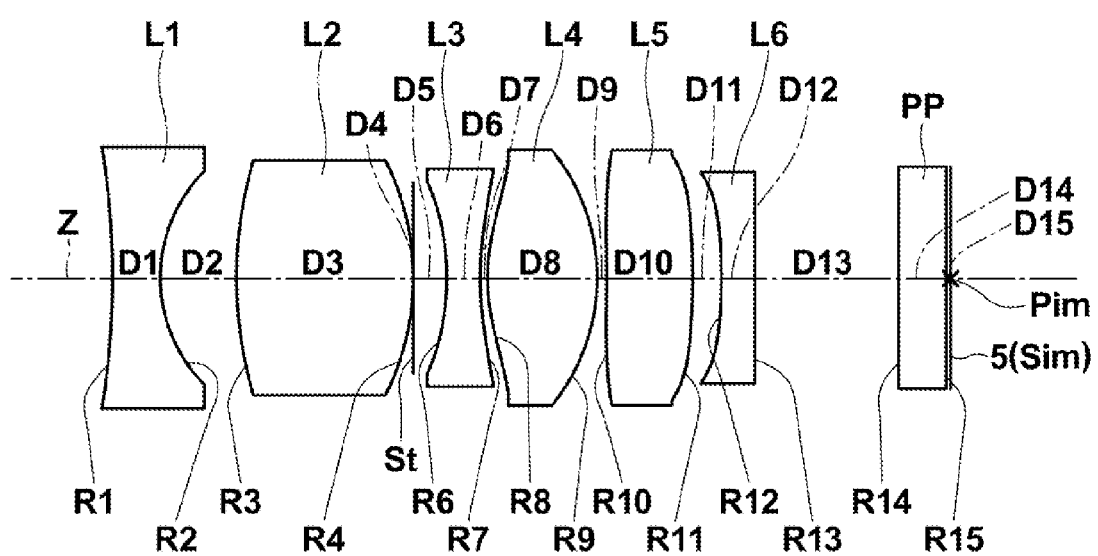
FIG. 12 is a cross-sectional view illustrating the lens configuration of an imaging lens of Example 10 of the present invention.
Figure 13:
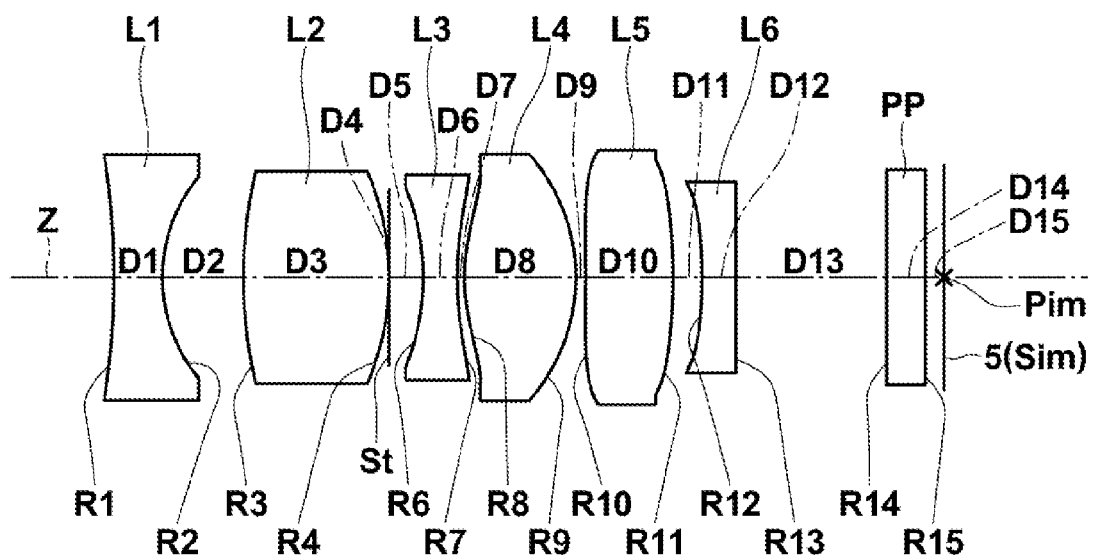
FIG. 13 is a cross-sectional view illustrating the lens configuration of an imaging lens of Example 11 of the present invention.
Figure 14:
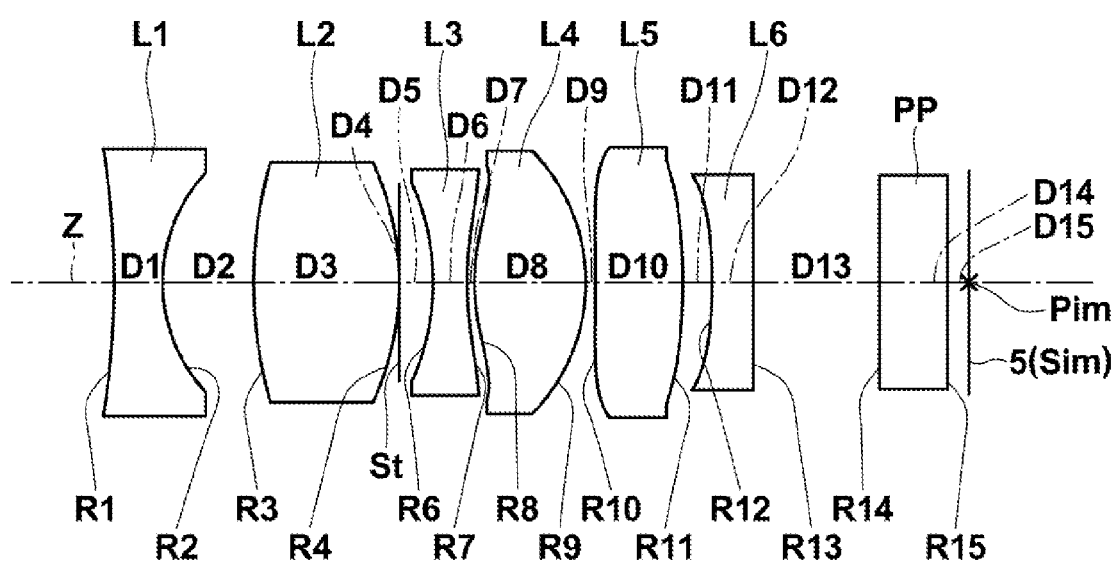
FIG. 14 is a cross-sectional view illustrating the lens configuration of an imaging lens of Example 12 of the present invention.
Figure 15:
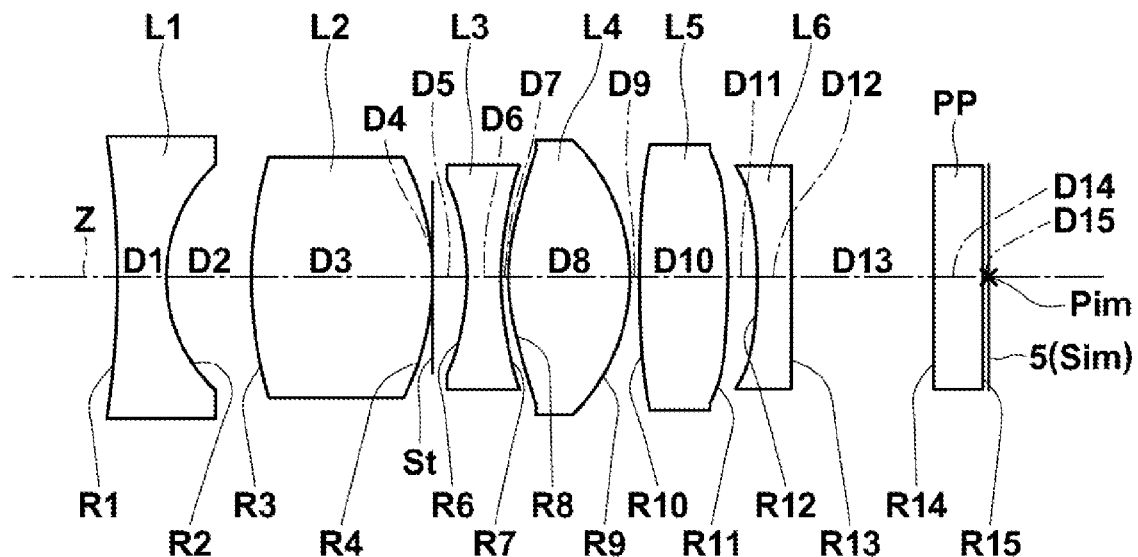
FIG. 15 is a cross-sectional view illustrating the lens configuration of an imaging lens of Example 13 of the present invention.
Figure 16:
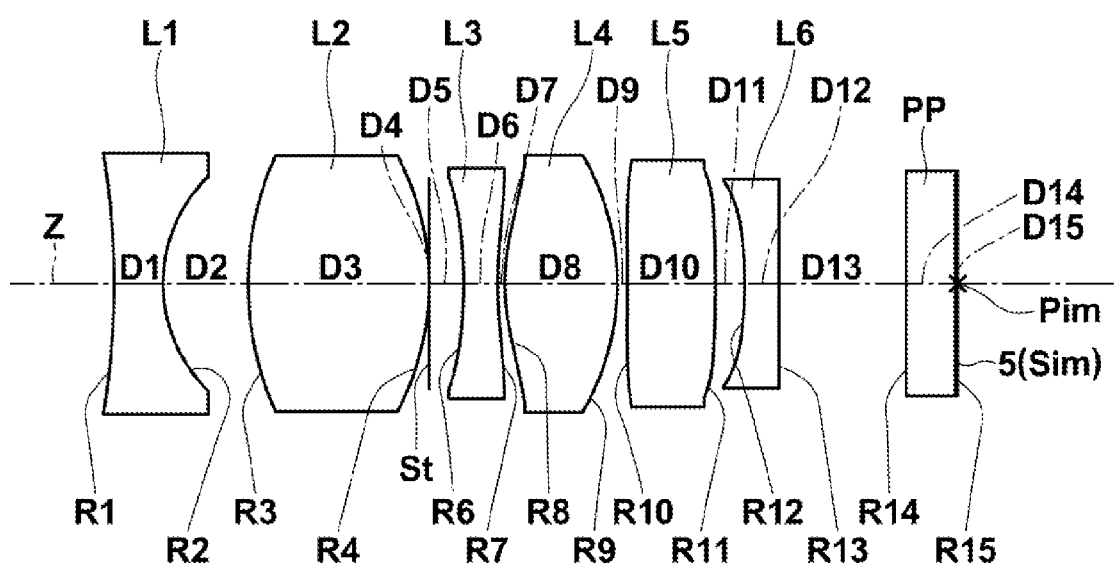
FIG. 16 is a cross-sectional view illustrating the lens configuration of an imaging lens of Example 14 of the present invention.
Figure 17:
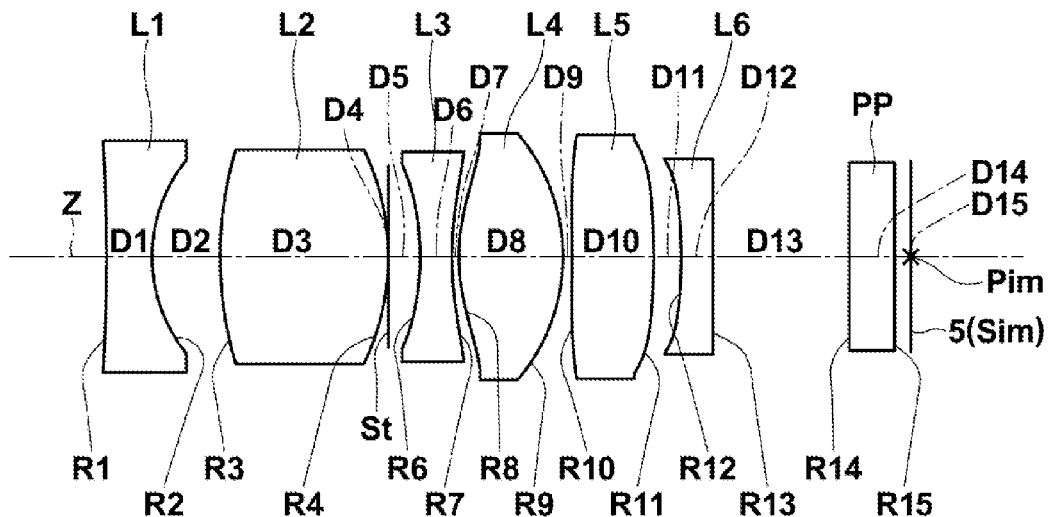
FIG. 17 is a cross-sectional view illustrating the lens configuration of an imaging lens of Example 15 of the present invention.

Here, referring to FIG. 2, the shape of the object-side surface of the fourth lens L4 above will be described. FIG. 2 illustrates an optical path diagram of the imaging lens 1 shown in FIG. 1. In FIG. 2, a point Q8 is the center of the object-side surface of the fourth lens L4 and an intersection of the object-side surface of the fourth lens L4 and the optical axis Z. Further, in FIG. 2, the point X8 on the object-side surface of the fourth lens L4 is at the edge of the effective diameter, and is an intersection of the outermost ray 6, which is included in off-axis rays 3, and the object-side surface of the fourth lens L4. In FIG. 2, although the point X8 is at the edge of the effective diameter, the same applies to other points because the point X8 is an arbitrary point on the object-side surface of the fourth lens L4.

In this case, an intersection of the normal line at a point X8 on the lens surface and the optical axis Z is defined as a point P8 as shown in FIG. 2, a line segment X8-P8 connecting between a point X8 and a point P8 is defined as the radius of curvature RX8 at the point X8, and the length |X8-P8| of the line segment X8-P8 is defined as the absolute value |RX8| of the radius of curvature RX8. That is, |X8-P8| is |RX8|. Further, the radius of curvature at the point Q8, i.e., the radius of curvature in the center of the object-side surface of the fourth lens L4 is designated as R8, and the absolute value thereof is designated as |R8| (not shown in FIG. 2).

The expression "a shape in which both of the center and the edge of the effective diameter have positive powers and the positive power at the edge of the effective diameter is weaker than that of the center" of the the object-side surface of the fourth lens L4 refers to, when a point X8 is the edge of the effective diameter, a convex shape in a paraxial region including a point Q8 and a shape in which a point P8 is more toward the image side than the point Q8 and the absolute value |RX8| of the radius of curvature at a point X8 is greater than the absolute value |R8| of the radius of curvature at the point Q8.

It is preferable for at least one side surface of the fifth lens L5 to be an aspherical surface. Configuring at least one side surface of the fifth lens L5 to be an aspherical surface facilitates correction of field curvature and spherical aberration, thereby enabling favorable resolution to be obtained. It is more preferable for both side surfaces of the fifth lens L5 to be aspherical.

It is preferable for the object-side surface of the fifth lens L5 to be an aspherical surface. It is preferable for the object-side surface of the fifth lens L5 to have a shape in which both of the center and the edge of the effective diameter have positive powers and in which the positive power at the edge of the effective diameter is greater than that of the center. Alternatively, it is preferable for the object-side surface of the fifth lens L5 to have a shape in which the center has a negative power and the edge of the effective diameter has a positive power. Configuring the fifth lens L5 to have such a shape facilitates correction of field curvature.

The above shape of the object-side surface of the fifth lens L5 can be understood as described below in the same manner as in the shape of the object-side surface of the fourth lens L4 which was described by using FIG. 2. In a cross section of the lens, when a point on the object-side surface of the fifth lens L5 is X10 and the intersection of the normal line at the point and the optical axis Z is a point P10; a line segment X10-P10 connecting between the point X10 and the point P10 is the radius of curvature at the point X10, the length |X10-P10| of the line segment connecting between the point X10 and the point P10 is the absolute value |RX10| of the radius of curvature at the point X10. That is, |X10-P10| is |RX10|. Further, the intersection of the object-side surface of the fifth lens L5 and the optical axis Z, i.e., the center of the object-side surface of the fifth lens L5 is a point Q10. The absolute value of the radius of curvature at the point Q10 is |R10|.

The expression "a shape in which both of the center and the edge of the effective diameter have positive powers and in which the positive power at the edge of the effective diameter is greater than that of the center" of the the object-side surface of the fifth lens L5 refers to, when a point X10 is the edge of the effective diameter, a convex shape in the paraxial region including a point Q10 and a shape in which a point P10 is more toward the image side than the point Q10 and the absolute value |RX10| of the radius of curvature at a point X10 is smaller than the absolute value |R10| of the radius of curvature at the point Q10.

The expression "a shape in which the center has a negative power and the edge of the effective diameter has a positive power" of the object-side surface of the fifth lens L5 refers to, when a X10 is the edge of the effective diameter, a concave shape in the paraxial region including a point Q10 and a shape in which a point P10 is more toward the image side than the point Q10.

It is preferable for the image-side surface of the fifth lens L5 to be an aspherical surface. It is preferable for the image-side surface of the fifth lens L5 to have a shape in which both of the center and the edge of the effective diameter have positive powers and the positive power at the edge of the effective diameter is weaker than tha of the center. Configuring the fifth lens L5 to have such a shape facilitates correction of field curvature.

The above shape of the image-side surface of the fifth lens L5 can be understood as described below in the same manner as in the shape of the object-side surface of the fourth lens L4 which was described by using FIG. 2. In a cross section of the lens, when a point on the image-side surface of the fifth lens L5 is X11 and the intersection of the normal line at the point and the optical axis Z is a point P11; a line segment X11-P11 connecting between the point X11 and the point P11 is the radius of curvature at the point X11, the length |X11-P11| of the line segment connecting between the point X11 and the point P11 is the absolute value |RX11| of the radius of curvature at the point X11. That is, |X11-P11| is |RX11|. Further, the intersection of the image-side surface of the fifth lens L5 and the optical axis Z, i.e., the center of the image-side surface of the fifth lens L5 is a point Q11. The absolute value of the radius of curvature at the point Q11 is |R11|.

The expression "a shape in which both of the center and the edge of the effective diameter have positive powers and in which the positive power at the edge of the effective diameter is weaker than that of the center" of the the image-side surface of the fifth lens L5 refers to, when a point X11 is the edge of the effective diameter, a convex shape in the paraxial region including a point Q11 and a shape in which a point P11 is more toward the object side than the point Q11 and the absolute value |RX11| of the radius of curvature at a point X11 is greater than the absolute value |R11| of the radius of curvature at the point Q11.

It is preferable for at least one side surface of the sixth lens L6 to be an aspherical surface. Configuring at least one side surface of the sixth lens L6 to be an aspherical surface facilitates correction of field curvature and spherical aberration, thereby enabling favorable resolution to be obtained. It is more preferable for both side surfaces of the sixth lens L6 to be aspherical.

It is preferable for the object-side surface of the sixth lens L6 to be an aspherical surface. It is preferable for the object-side surface of the sixth lens L6 to have a shape in which both of the center and the edge of the effective diameter have negative powers and the negative power at the edge of the effective diameter is greater than that of the center. Configuring the sixth lens L6 to have such a shape facilitates correction of field curvature.

The above shape of the object-side surface of the sixth lens L6 can be understood as described below in the same manner as in the shape of the object-side surface of the fourth lens L4 which was described by using FIG. 2. In a cross section of the lens, when a point on the object-side surface of the sixth lens L6 is X12 and the intersection of the normal line at the point and the optical axis Z is a point P12; a line segment X12-P12 connecting between the point X12 and the point P12 is the radius of curvature at the point X12, the length |X12-P12| of the line segment connecting between the point X12 and the point P12 is the absolute value |RX12| of the radius of curvature at the point X12. That is, |X12-P12| is |RX12|. Further, the intersection of the object-side surface of the sixth lens L6 and the optical axis Z, i.e., the center of the object-side surface of the sixth lens L6 is a point Q12. The absolute value of the radius of curvature at the point Q12 is |R12|.

The expression "a shape in which both of the center and the edge of the effective diameter have negative powes and in which the negative power at the edge of the effective diameter is greater than that of the center" of the the object-side surface of the sixth lens L6 refers to, when a point X12 is the edge of the effective diameter, a concave shape in the paraxial region including a point Q12 and a shape in which a point P12 is more toward the object side than the point Q12 and the absolute value |RX12| of the radius of curvature at a point X12 is smaller than the absolute value |R12| of the radius of curvature at the point Q12.

It is preferable for at least one side surface of the third lens L3 to be an aspherical surface. Configuring at least one side surface of the third lens L3 to be an aspherical surface facilitates correction of field curvature and spherical aberration, thereby enabling favorable resolution to be obtained. It is more preferable for both side surfaces of the third lens L3 to be aspherical.

It is preferable for the object-side surface of the third lens L3 to be an aspherical surface. It is preferable for the object-side surface of the third lens L3 to have a shape in which both of the center and the edge of the effective diameter have negative powers and the negative power at the edge of the effective diameter is weaker than that of the center. Configuring the object-side surface of the third lens L3 to have such a shape facilitates correction of field curvature.

The above shape of the object-side surface of the third lens L3 can be understood as described below in the same manner as in the shape of the object-side surface of the fourth lens L4 which was described by using FIG. 2. In a cross section of the lens, when a point on the object-side surface of the third lens L3 is X6 and the intersection of the normal line at the point and the optical axis Z is a point P6; a line segment X6-P6 connecting between the point X6 and the point P6 is the radius of curvature at the point X6, the length |X6-P6| of the line segment connecting between the point X6 and the point P6 is the absolute value |RX6| of the radius of curvature at the point X6. That is, |X6-P6| is |RX6|. Further, the intersection of the object-side surface of the third lens L3 and the optical axis Z, i.e., the center of the object-side surface of the third lens L3 is a point Q6. The absolute value of the radius of curvature at the point Q6 is |R6|.

The expression "a shape in which both of the center and the edge of the effective diameter have negative powers and in which the negative power at the edge of the effective diameter is weaker than that of the center" of the the object-side surface of the third lens L3 refers to, when a point X6 is the edge of the effective diameter, a concave shape in the paraxial region including a point Q6 and a shape in which a point P6 is more toward the object side than the point Q6 and the absolute value |RX6| of the radius of curvature at a point X6 is greater than the absolute value |R6| of the radius of curvature at the point Q6.

It is preferable for the image-side surface of the third lens L3 to be an aspherical surface. It is preferable for the image-side surface of the third lens L3 to have a shape in which both of the center and the edge of the effective diameter have negative powers and in which the negative power at the edge of the effective diameter is greater than that of the center. Configuring the third lens L3 to have such a shape facilitates correction of chromatic aberration.

The above shape of the image-side surface of the third lens L3 can be understood as described below in the same manner as in the shape of the object-side surface of the fourth lens L4 which was described by using FIG. 2. In a cross section of the lens, when a point on the image-side surface of the third lens L3 is X7 and the intersection of the normal line at the point and the optical axis Z is a point P7; a line segment X7-P7 connecting between the point X7 and the point P7 is the radius of curvature at the point X7, the length |X7-P7| of the line segment connecting between the point X7 and the point P7 is the absolute value |RX7| of the radius of curvature at the point X7. That is, |X7-P7| is |RX7|. Further, the intersection of the image-side surface of the third lens L3 and the optical axis Z, i.e., the center of the image-side surface of the third lens L3 is a point Q7. The absolute value of the radius of curvature at the point Q7 is |R7|.

The expression "a shape in which both of the center and the edge of the effective diameter have negative powers and in which the negative power at the edge of the effective diameter is greater than that of the center" of the the image-side surface of the third lens L3 refers to, when a point X7 is the edge of the effective diameter, a concave shape in the paraxial region including a point Q7 and a shape in which a point P7 is more toward the image side than the point Q7 and the absolute value |RX7| of the radius of curvature at a point X7 is smaller than the absolute value |R7| of the radius of curvature at the point Q7.

The image-side surface of the third lens L3 may have a shape in which both of the center and the edge of the effective diameter have negative powers and in which the negative power at the edge of the effective diameter is weaker than that of the center. Configuring the third lens L3 to have such a shape facilitates correction of field curvature.

The expression "a shape in which both of the center and the edge of the effective diameter have negative powers and in which the negative power at the edge of the effective diameter is weaker than that of the center" of the the image-side surface of the third lens L3 refers to, when a point X7 is the edge of the effective diameter, a concave shape in the paraxial region including a point Q7 and a shape in which a point P7 is more toward the image side than the point Q7 and the absolute value |RX7| of the radius of curvature at a point X7 is greater than the absolute value |R7| of the radius of curvature at the point Q7.

It is preferable for the first lens L1 to be a biconcave lens. This enables the negative power of the first lens L1 to increase, which is advantageous from the viewpoint of widening the angle of view and which facilitates securing a long back focus.

It is preferable for the second lens L2 to be a biconvex lens. This enables the power of the second lens L2 to increase and the combined powers of the first lens L1 and the second lens L2 to be well balanced even in the case that the power of the first lens L1 is caused to be increased. Thereby, correction of comatic aberration and field curvature will be facilitated.

It is preferable for the third lens L3 to be a biconcave lens. This enables the power of the third lens L3 to increase, thereby facilitating correction of longitudinal chromatic aberration and lateral chromatic aberration.

It is preferable for the fourth lens L4 to be a biconvex lens. This enables the power of the fourth lens L4 to increase, thereby facilitating correction of chromatic aberration between the fourth lens L4 and the third lens L3.

It is preferable for the fifth lens L5 to have a convex surface toward the image side. This facilitates correction of field curvature.

The fifth lens L5 may be a biconvex lens. This facilitates increasing the power of the fifth lens L5, thereby facilitating correction of spherical aberration.

The fifth lens L5 may be a meniscus lens with a convex surface toward the image side. This facilitates correction of field curvature.

It is preferable for the sixth lens L6 to be a lens with a concave surface toward the object side. This facilitates increasing the power of the sixth lens L6, thereby facilitating correction of chromatic aberration between the sixth lens L6 and the fifth lens L5.

It is preferable for the sixth lens L6 to be a meniscus lens with a concave surface toward the object side or to be a plano-concave lens with a concave surface toward the object side. This enables lateral chromatic aberration and field curvature to be corrected favorably. Telecentricity can be improved compared to the case that the sixth lens L6 is a biconcave lens.

It is preferable for the object-side surface of the first lens L1 to have a concave surface toward the object side. This facilitates increasing the power of the first lens L1, which is advantageous from the viewpoint of widening the angle of view, and facilitates reducing the diameter of the first lens L1, which is advantageous from the viewpoint of miniaturization.

It is preferable for the image-side surface of the first lens L1 to be a concave surface. This facilitates increasing the power of the first lens L1, which is advantageous from the viewpoint of widening the angle of view.

It is preferable for the object-side surface of the second lens L2 to be a convex surface. This facilitates increasing the power of the second lens L2, thereby facilitating correction of field curvature.

It is preferable for the image-side surface of the second lens L2 to be a convex surface. This facilitates increasing the power of the second lens L2, thereby facilitating correction of field curvature.

It is preferable for the object-side surface of the third lens L3 to be a concave surface. This facilitates increasing the power of the third lens L3, thereby facilitating correction of longitudinal chromatic aberration.

It is preferable for the image-side surface of the third lens L3 to be a concave surface. This facilitates increasing the power of the third lens L3, thereby facilitating correction of longitudinal chromatic aberration.

It is preferable for the object-side surface of the fourth lens L4 to be a convex surface. This facilitates increasing the power of the fourth lens L4, thereby facilitating correction of longitudinal chromatic aberration.

It is preferable for the image-side surface of the fourth lens L4 to be a convex surface. This facilitates increasing the power of the fourth lens L4, thereby facilitating correction of longitudinal chromatic aberration.

It is preferable for the object-side surface of the fifth lens L5 to be a convex surface. This facilitates correction of spherical aberration.

The object-side surface of the fifth lens L5 may be a concave surface. This facilitates correction of field curvature.

It is preferable for the image-side surface of the fifth lens L5 to be a convex surface. This facilitates correction of spherical aberration and field curvature.

It is preferable for the object-side surface of the sixth lens L6 to be a concave surface. This facilitates correction of field curvature and lateral chromatic aberration.

It is preferable for the image-side surface of the sixth lens L6 to be a planar surface or a convex surface. Configuring the image-side surface of the sixth lens L6 to be a planar surface or a convex surface facilitates correction of field curvature.

The image-side surface of the sixth lens L6 may be a concave surface.

It is preferable for the material of the first lens L1 to be a glass. For example, when the imaging lens is used in severe environments as vehicle mounted cameras, surveillance cameras, and the like, there is demand for the first lens L1 disposed on the most-object side to be made of a material which is resistant to surface deterioration caused by wind and rain, changes in temperature due to direct sunlight, and chemical agents such as oil, a detergent, and the like, i.e., a material which has high water resistance, weather resistance, acid resistance, chemical resistance, and the like. Further, there is demand for the first lens L1 to be made of a material which is hard and not likely to break. Configuring the material to be a glass enables these demands to be satisfied. Alternatively, the material for the first lens L1 may be a transparent ceramic.

Note that a protection means for improving the strength, scratch resistance, and chemical resistance may be provided on the object-side surface of the first lens L1. In such a case, the material of the first lens L1 may be plastic. Such protection means may be a hard coat or a water-repelling coat.

It is preferable for all the lenses to be formed of glass in order to manufacture an optical system which has superior environmental resistance. When the imaging lens is applied for use as a lens for a surveillance camera or a lens for a vehicle mounted camera, there is a possibility for the imaging lens to be used under various conditions such as a wide temperature range from a high temperature to a low temperature, high humidity, and the like. Therefore, it is preferable for all the lenses to be formed of glass in order to manufacture the optical system which is resistant to these conditions.

It is preferable for the material of the second lens L2 to be a glass. Configuring the second lens L2 to be formed of a glass facilitates using the material with high refractive index, thereby facilitating increase in the power of the second lens L2. As the result, correction of field curvature will become easy. Further, when plastics are applied for use in the third lens L3 through the sixth lens L6, employing a glass for the second lens L2 which is a convex lens facilitate suppressing focus shift due to changes in temperature.

It is preferable for the materials of any one or a plurality of arbitrary combinations of the third lens L3 through the sixth lens L6 to be plastic. Configuring the materials to be plastic facilitates reduction in the cost and the weight of the lens system and enables aspherical surface shapes to be manufactured accurately and inexpensively, resulting in correction of spherical aberration and field curvature becoming possible.

It is preferable for the imaging lens to include a plastic lens having a positive power and a plastic lens having a negative power in order to manufacture the lens system which is resistant to changes in temperature. In general, plastic lenses have characteristics which vary significantly due to changes in temperature, which causes focus shift to occur. However, configuring the lens system to include the plastic lens having a positive power and the plastic lens having a negative power causes changes in the power to be cancelled out, thereby enabling deterioration in performance to be minimized.

Accordingly, it is preferable for one of the third lens L3 and the sixth lens L6 and for one of the fourth lens L4 and the fifth lens L5 to be plastic. It is more preferable for all of the third lens L3 through the sixth lens L6 to be plastic lenses from the viewpoint of cost down.

Note that it is preferable for the number of the plastic lenses having positive powers and the number of the plastic lenses having negative powers to agree. This facilitates balancing the positive power with the negative power of the plastic lenses, thereby making it easy to suppress focus shift due to the changes in temperature. Note that if the positive power and the negative power are well balanced, the number of the plastic lenses having positive powers and the number of the negative lenses having negative powers do not have to agree.

All of the four lenses, the third lens L3 through the sixth lens L6 may be plastic lenses, or only a pair of any of the lenses among these lenses may be plastic lenses. Alternatively, other lenses may be plastic lenses instead of the third lens L3 through the sixth lens L6. For example, the second lens L2 may be a plastic lens instead of the fourth lens L4. Further, the first lens L1 may be a plastic lens instead of the sixth lens L6.

Acrylic, a polyolefin-based material, a polycarbonate-based material, an epoxy resin, PET (Polyethylene terephthalate), PES (Poly Ether Sulphone), a polycarbonate, and the like can be employed as the material of the plastic, for example.

It is preferable for the material of the third lens L3 to be a polycarbonate-based material. This enables the Abbe number thereof to be decreased, thereby facilitating correction of longitudinal chromatic aberration and lateral chromatic aberration.

It is preferable for the material of the fourth lens L4 to be a polyolefin-based material. This enables the Abbe number thereof to be increased and facilitates suppressing birefringence of the material, resulting in facilitating obtainment of a favorable resolution.

It is preferable for the material of the fifth lens L5 to be a polyolefin-based material. This enables the Abbe number thereof to be increased and facilitates suppressing birefringence of the material, resulting in facilitating obtainment of a favorable resolution.

It is preferable for the material of the sixth lens L6 to be a polycarbonate-based material. This enables the Abbe number thereof to be decreased, thereby facilitating correction of longitudinal chromatic aberration and lateral chromatic aberration.

It is preferable for the center thickness of the first lens L1 to be greater than or equal to 0.8 mm. This enables a hard lens to be manufactured, thereby enabling a lens, which is resistant to various impacts, to be manufactured.

Note that a filter which cuts blue light from ultraviolet light or an IR (InfraRed) cutting filter which cuts infrared light may be provided between the lens system and the image sensor 5 according to the application of the imaging lens 1. A coating which has the same characteristics as those of the filters above may be applied onto the lens surface. Alternatively, materials which absorb ultraviolet light, blue light, infrared light, and the like may be applied as the materials of any of the lenses.

FIG. 1 shows an example in which an optical member PP that presumes various types of filters and the like is disposed between the lens system and the image sensor 5, but these various types of filters may be disposed between the respective lenses, instead. Alternatively, a coating, which exhibits the same effects as the various types of filters, may be applied onto the lens surfaces of any of the lenses included in the imaging lens.

Note that there is a possibility that the rays which pass the outside of the effective diameters between the respective lenses will become stray light and reach the imaging plane, resulting in turning to ghosts. Accordingly, it is preferable for a light cutting means for shielding the stray light to be provided as necessary. As this light cutting means, an opaque paint may be applied onto portions of the outside of the effective diameters of the lenses, or an opaque plate may be provided therein, for example. Alternatively, opaque plates may be provided as the light cutting means on optical paths of the rays which become stray light. Alternatively, something like a hood for shielding stray light may be disposed more toward the object side than the most-object-side lens. As one example, FIG. 1 shows an example in which light cutting means 11, 12 are provided at the exterior of the effective diameter of the image-side surface of each of the first lens L1 and the third lens L3. Note that the positions in which the light cutting means are provided are not limited to the example shown in FIG. 1, and the light cutting means may be provided on other lenses or between the lenses.

Further, members such as a stop, and the like which shields peripheral rays may be disposed between the respective lenses within a range in which no actual problems for the ratio of the amount of peripheral rays will arise. The peripheral rays are rays which pass through peripheral portions of an entrance pupil in the optical system among the rays emitted from object points outside of the optical axis Z. Disposing the member which shields the peripheral rays in such a manner enables image quality of the peripheral portions of the image formation region to be improved. Further, shielding the light which generates ghosts by the member enables ghosts to be reduced.

Further, it is preferable for the lens system to be constituted only by six lenses which are a first lens L1, a second lens L2, a third lens L3, a fourth lens L4, a fifth lens L5 and the sixth lens L6. Constituting the lens system only by six lenses enables the lens system to be produced at low cost.

The imaging apparatus according to the present embodiment is provided with the imaging lens according to the present embodiment. Accordingly, the imaging apparatus can be configured in a small size and at low cost, have a sufficient wide angle of view, and obtain favorable images with high resolution by using the image sensor.

Note that images captured by the imaging apparatus provided with the imaging lens according to the first embodiment through the third embodiment may be displayed on mobile phones. For example, there is a case that the imaging apparatus provided with the imaging lens of the present embodiment is mounted on a car as a vehicle mounted camera, the vehicle mounted camera captures images behind and around the car, and then the captured images is displayed on a display device. In such a case, in the cars mounted with a car navigation system, the captured images can be displayed on the display device of the car navigation system. However, in the case that the car navigation system is not mounted on the cars, dedicated display devices such as a liquid crystal display, and the like are required to be installed in the cars. However, display devices are expensive. Meanwhile, the recent mobile phones are equipped with display devices having high performance which enables viewing moving pictures and web sites. Using mobile phones as the display devices intended for vehicle mounted cameras makes it unnecessary to load dedicated display devices on cars which are not equipped with a car navigation system. As the result, vehicle mounted cameras can be mounted on cars at low cost.

Here, the images captured by the vehicle mounted camera may be wire-transmitted to a mobile phone via a cable, and the like or may be wirelessly transmitted to a mobile phone via infrared communication, and the like. Further, when the car's gear is set to reverse or a turn signal is activated, the images captured by the vehicle mounted camera may be automatically displayed on the display device of the mobile phone by coordinating the operating condition of the mobile phone with that of the car.

Note that the display device for displaying images captured by the vehicle mounted camera is not limited to a mobile phone, and may be such a portable data terminal as a PDA, and the like, a compact personal computer, or a laptop car navigation system.

Further, a mobile phone equipped with the imaging lens of the present invention may be fixed to a car to be used as a vehicle mounted camera. Recent smart phones have processing capability which is equivalent to those of PC's. Accordingly, the cameras for the mobile phones can be employed in the same manner as vehicle mounted cameras, for example by fixing a mobile phone to a dashboard, and the like in the car, and directing the camera forward. Note that a function for recognizing white lines and road signs and giving a caution may be included as an application for the smart phone. Further, the mobile phone may be a system which executes warnings when dozing and looking-aside are found by directing the camera towards a driver. Further, the mobile phone may be a part of the system that performs a steering wheel operation by coordinating with the car. There is demand for vehicle mounted camera to be resistant to severe environments because cars are left in high temperature environments and low temperature environments. When the imaging lens of the present invention is mounted on mobile phones, the mobile phones will be carried with drivers out of the cars except while driving. Accordingly, the imaging lens can be made less resistant to the environment; thereby a vehicle mounted system can be introduced at low cost.

[Numerical Example of the Imaging Lens]

Next, the Numerical Example of the imaging lens of the present invention will be described. The cross sectional views of the imaging lenses of the Examples 1 through 15 are shown in FIGS. 3 through 17. In FIGS. 3 through 17, the left side is the object side, and the right side is the image side. An aperture stop St, an optical member PP and an image sensor 5 disposed on an imaging plane Sim are also shown in the same manner as in FIG. 1. An aperture stop St of each of the Figures does not necessarily represent the shape or size thereof, but the position thereof on the optical axis Z. In each Example, symbols Ri, Di (i=1, 2, 3, . . . ) of the cross sectional views of the lens respectively correspond to Ri, Di of the lens data to be described below.

Tables 1 through 15 show lens data of the imaging lenses of Examples 1 through 15. In each Table, (A) shows basic lens data, (B) shows various types of data, and (C) shows aspherical surface data.

In basic lens data, the column of Si shows the i-th (i=1, 2, 3, . . . ) surface number, the value of i sequentially increasing from the object-side surface of the constituent element at the most object side, which is designated as 1, toward the image side. The column Ri shows the radii of curvature of the i-th surface, and the column Di shows the distances between i-th surfaces and i+1st surfaces along the optical axis Z. Note that the sign of the radius of curvature is positive in the case that a surface shape has a convex surface toward the object side, and negative in the case that a surface shape has a convex toward the image side. Further, the column Ndj shows the refractive indices of j-th (j=1, 2, 3, . . . ) optical elements with respect to the d-line (wavelength: 587.6 nm), the value of j sequentially increasing from the constituent element at the most object side, which is designated as 1, toward the image side. The column vdj shows the Abbe numbers of j-th optical elements with respect to the d-line (wavelength: 587.6 nm). Note that the basic lens data also shows the aperture stop St and an optical member PP. The column of the surface number of a surface corresponding to the aperture stop St indicates the text (St).

In the basic lens data, the mark "*" is indicated at surface numbers of aspherical surfaces. Numerical values of paraxial radii of curvature (the radii of curvature of the center) are shown as the radii of curvature of aspherical surfaces. The aspherical surface data shows surface numbers of the aspherical surfaces and aspherical surface coefficients with respect to the aspherical surfaces. Note that "E−n"(n: integer) in each of the numerical values of the aspherical surface coefficients means "×10$^{-n}$", and "E+n" therein means "×10$^{n}$". The aspherical surface coefficients are the values of respective coefficients KA, RBm (m=3, 4, 5, . . . 20) in the aspherical surface formula below:

$$Zd = C \cdot h^2 / \{1 + (1 - KA \cdot C^2 \cdot h^2)^{1/2}\} + \Sigma RBm \cdot h^m$$

where,

Zd: the depth of an aspherical surface (the length of a perpendicular line drawn from a point on an aspherical surface with a height h to a plane perpendicular to the optical axis which contacts the peak of the aspherical surface)

h: height (the distance from the optical axis to a lens surface)

C: an inverse number of a paraxial radius of curvature

KA, RBm: aspherical surface coefficients (m=3, 4, 5, . . . 20).

In the various data, L (in Air) is the distance (back focus corresponds to an air converted length) from the object-side surface of the first lens L1 to the imaging plane Sim along the optical axis Z, Bf (in Air) is the distance (which corresponds to back focus, the air converted length) from the image-side surface of the most-image-side lens to the imaging plane Sim along the optical axis Z, f is the focal length of the entire system, f1 is the focal length of the first lens L1, f2 is the focal length of the second lens L2, f3 is the focal length of the third lens L3, f4 is the focal length of the fourth lens L4, f5 is the focal length of the fifth lens L5, f6 is the focal length of the sixth lens L6, f12 is the combined focal length of the first lens L1 and the second lens L2, f34 is the combined focal length of the third lens L3 and the fourth lens L4, f56 is the combined focal length of the fifth lens L5 and the sixth lens L6, f3456 is the combined focal length of the third lens L3, the fourth lens L4, the fifth lens L5 and the sixth lens L6.

Tables 16 and 17 collectively show values respectively corresponding to the conditional formulas (1) through (15) of each Example. Note that conditional formula (1) corresponds to f5/f, conditional formula (2) corresponds to R1/f, conditional formula (3) corresponds to f4/f5, conditional formula (4) corresponds to f56/f, conditional formula (5) corresponds to f34/f56, conditional formula (6) corresponds to f34/f, conditional formula (7) corresponds to f3456/f, conditional formula (8) corresponds to vd2/vd3, conditional formula (9) corresponds to f3/f, conditional formula (10) corresponds to f3/f4, conditional formula (11) corresponds to f12/f, conditional formula (12) corresponds to (Nd1+Nd2+Nd3+Nd4+Nd5+Nd6)/6, conditional formula (13) corresponds to L/f, conditional formula (14) corresponds to Bf/f, and conditional formula (15) corresponds to (vd2+vd4+vd5)/3.

where,

L: the distance (back focus corresponds to the air converted length) from the peak of the object-side surface of the first lens L1 to the imaging plane, Bf: the distance (an air converted length) from the peak of the image-side surface of the sixth lens L6 to the imaging plane, R1: the radius of curvature of the object-side surface of the first lens L1,
f: the focal length of the entire system,
f1: the focal length of the first lens L1,
f3: the focal length of the third lens L3,
f4: the focal length of the fourth lens L4,
f5: the focal length of the fifth lens L5,
f12: the combined focal length of the first lens L1 and the second lens L2,
f34: the combined focal length of the third lens L3 and the fourth lens L4,
f56: the combined focal length of the fifth lens L5 and the sixth lens L6,
f3456: the combined focal length of the third lens L3, the fourth lens L4, the fifth lens L15 and the sixth lens L6,
Nd1 through Nd6: the refractive indices of the materials of the first lens L1 through the sixth lens L6 with respect to the d-line,
vd2: the Abbe number of the material of the second lens L2 with respect to the d-line,
vd3: the Abbe number of the material of the third lens L3 with respect to the d-line,
vd4: the Abbe number of the material of the fourth lens L4 with respect to the d-line, and
vd5: the Abbe number of the material of the fifth lens L5 with respect to the d-line.

Regarding the unit of each numerical value, mm is used as the unit of length, but this is only an example and other appropriate units may also be used, as optical systems are usable even when they are proportionally enlarged or miniaturized.

TABLE 1

EXAMPLE 1

(A)

| Si | Ri | Di | Ndj | vdj | GLASS |
|---|---|---|---|---|---|
| 1 | −16.0028 | 1.00005 | 1.5891 | 61.1 | S-BAL35 |
| 2 | 3.1023 | 1.72148 | | | |
| 3 | 9.5114 | 3.00019 | 1.8830 | 40.8 | S-LAH58 |
| 4 | −5.4913 | 0.00002 | | | |
| 5(St) | ∞ | 0.70000 | | | |
| *6 | −4.3687 | 070000 | 1.6336 | 23.6 | |
| *7 | 11.0194 | 0.15000 | | | |
| *8 | 3.7836 | 2.18923 | 1.5339 | 56.0 | |
| 9 | −5.1610 | 0.20000 | | | |
| *10 | 47.8358 | 1.80007 | 1.5339 | 56.0 | |
| *11 | −11.5322 | 0.50036 | | | |
| *12 | −8.8380 | 0.70002 | 1.6336 | 23.6 | |
| 13 | ∞ | 3.00000 | | | |
| 14 | ∞ | 1.00000 | 1.5168 | 64.2 | |
| 15 | ∞ | 0.41173 | | | |
| IMAGING PLANE | | | | | |

(B)

| | |
|---|---|
| L(in Air) | 16.7 |
| Bf(in Air) | 4.1 |
| f | 4.68 |
| f1 | −4.33 |
| f2 | 4.35 |
| f3 | −4.85 |
| f4 | 4.47 |
| f5 | 17.59 |
| f6 | −13.95 |
| f12 | 6.46 |
| f34 | 14.52 |
| f56 | −84.30 |
| f3456 | 16.79 |

(C)

| SURFACE NUMBER | KA | RB3 | RB4 | RB5 | RB6 |
|---|---|---|---|---|---|
| 6 | 0.0000000E+00 | 4.5461595E−03 | −4.6801135E−04 | −5.4733110E−04 | −5.9052316E−05 |
| 7 | 0.0000000E+00 | 1.5793110E−03 | −2.2626274E−03 | −3.2644487E−04 | 4.5376646E−04 |
| 8 | −3.1504000E+00 | −4.9541018E−03 | 3.8630852E−03 | −2.0162564E−04 | −1.4892261E−04 |
| 10 | 0.0000000E+00 | −3.5018449E−04 | 8.4265693E−04 | −2.7405436E−04 | −3.3738862E−04 |
| 11 | 0.0000000E+00 | −7.0343776E−03 | 1.6960230E−03 | −1.8416642E−05 | −1.6412146E−03 |
| 12 | 0.0000000E+00 | −4.5147700E−03 | −3.7940482E−03 | −2.5909004E−03 | −5.9928496E−04 |

| SURFACE NUMBER | RB7 | RB8 | RB9 | RB10 |
|---|---|---|---|---|
| 6 | 8.3853951E−05 | 4.9787435E−05 | −1.5545871E−04 | 3.0333532E−06 |
| 7 | 1.1092399E−04 | −6.0919650E−05 | 7.7273291E−05 | −1.4400348E−05 |
| 8 | −1.7330176E−06 | 3.8453547E−05 | 3.7180158E−07 | −3.8938003E−06 |
| 10 | −2.6082230E−05 | 1.4375497E−04 | | |

TABLE 1-continued

EXAMPLE 1

| | | |
|---|---|---|
| 11 | −5.2906671E−04 | 4.9034938E−04 |
| 12 | 3.5669815E−05 | 8.5319892E−05 |

TABLE 2

EXAMPLE 2

(A)

| Si | Ri | Di | Ndj | vdj | GLASS |
|---|---|---|---|---|---|
| 1 | −16.0233 | 1.00005 | 1.5891 | 61.1 | S-BAL35 |
| 2 | 3.1453 | 1.64365 | | | |
| 3 | 9.5311 | 3.00019 | 1.8830 | 40.8 | S-LAH58 |
| 4 | −5.4755 | 0.00002 | | | |
| 5(St) | ∞ | 0.70000 | | | |
| *6 | −4.2210 | 0.70000 | 1.6336 | 23.6 | |
| *7 | 11.0450 | 0.15000 | | | |
| *8 | 3.7590 | 2.30000 | 1.5339 | 56.0 | |
| 9 | −5.1488 | 0.20000 | | | |
| *10 | 31.8403 | 1.80007 | 1.5339 | 56.0 | |
| *11 | −11.8978 | 0.50036 | | | |
| *12 | −8.5603 | 0.70002 | 1.6336 | 23.6 | |
| 13 | ∞ | 3.00000 | | | |
| 14 | ∞ | 1.10000 | 1.5168 | 64.2 | |
| 15 | ∞ | 0.37981 | | | |
| IMAGING PLANE | | | | | |

(B)

| | |
|---|---|
| L(in Air) | 16.8 |
| Bf(in Air) | 4.1 |
| f | 4.76 |
| f1 | −4.38 |
| f2 | 4.35 |
| f3 | −4.74 |
| f4 | 4.47 |
| f5 | 16.46 |
| f6 | −13.51 |
| f12 | 6.57 |
| f34 | 14.98 |
| f56 | −104.69 |
| f3456 | 16.59 |

(C)

| SURFACE NUMBER | KA | RB3 | RB4 | RB5 | RB6 |
|---|---|---|---|---|---|
| 6 | 0.0000000E+00 | 5.1355246E−03 | −3.5652299E−04 | −5.3536977E−04 | −6.3698863E−05 |
| 7 | 0.0000000E+00 | 1.7082451E−03 | −2.2160942E−03 | −3.2318111E−04 | 4.4896698E−04 |
| 8 | −3.1504000E+00 | −5.0899737E−03 | 3.8242317E−04 | −2.0522243E−04 | −1.4544310E−04 |
| 10 | 0.0000000E+00 | −6.1454567E−04 | 7.7540717E−04 | −2.9340560E−04 | −3.4211634E−04 |
| 11 | 0.0000000E+00 | −7.0108481E−03 | 1.6601079E−03 | −1.7823331E−05 | −1.6380659E−03 |
| 12 | 0.0000000E+00 | −4.1825659E−03 | −3.6552371E−03 | −2.5602851E−03 | −5.9012182E−04 |

| SURFACE NUMBER | RB7 | RB8 | RB9 | RB10 |
|---|---|---|---|---|
| 6 | 7.9993277E−05 | 4.7861831E−05 | −1.4861770E−03 | 3.6095246E−06 |
| 7 | 8.4625108E−05 | −5.2452017E−05 | 7.7273291E−05 | −1.4400348E−05 |
| 8 | 1.7126242E−06 | 4.0645575E−05 | 1.0787694E−06 | −4.2884376E−06 |
| 10 | −3.1663199E−05 | 1.3851698E−04 | | |
| 11 | −5.2956386E−04 | 4.8816991E−04 | | |
| 12 | 4.2203515E−05 | 9.1618032E−05 | | |

TABLE 3

EXAMPLE 3

(A)

| Si | Ri | Di | Ndj | vdj | GLASS |
|---|---|---|---|---|---|
| 1 | −15.0107 | 1.00005 | 1.5891 | 61.1 | S-BAL35 |
| 2 | 3.0422 | 1.68716 | | | |

TABLE 3-continued

EXAMPLE 3

| | | | | | |
|---|---|---|---|---|---|
| 3 | 7.9319 | 3.00019 | 1.8830 | 40.8 | S-LAH58 |
| 4 | −5.4959 | 0.00002 | | | |
| 5(St) | ∞ | 0.70000 | | | |
| *6 | −3.6033 | 0.70000 | 1.6336 | 23.6 | |
| *7 | 13.3327 | 0.15000 | | | |
| *8 | 3.8015 | 2.30004 | 1.5339 | 56.0 | |
| 9 | −4.3179 | 0.20000 | | | |
| *10 | −10000.0000 | 1.80007 | 1.5339 | 56.0 | |
| *11 | −11.8194 | 0.50036 | | | |
| *12 | −9.2974 | 0.70002 | 1.6336 | 23.6 | |
| 13 | ∞ | 2.60000 | | | |
| 14 | ∞ | 1.50000 | 1.5168 | 64.2 | |
| 15 | ∞ | 0.35643 | | | |
| IMAGING PLANE | | | | | |

(B)

| | |
|---|---|
| L(in Air) | 16.7 |
| Bf(in Air) | 3.9 |
| f | 4.63 |
| f1 | −4.21 |
| f2 | 4.11 |
| f3 | −4.41 |
| f4 | 4.20 |
| f5 | 22.16 |
| f6 | −14.67 |
| f12 | 5.87 |
| f34 | 12.62 |
| f56 | −46.53 |
| f3456 | 17.21 |

(C)

| SURFACE NUMBER | KA | RB3 | RB4 | RB5 | RB6 |
|---|---|---|---|---|---|
| 6 | 0.0000000E+00 | 7.7486443E−03 | 1.2716555E−03 | −4.3336430E−04 | −2.1760088E−04 |
| 7 | 0.0000000E+00 | 2.6789274E−03 | −1.0103058E−03 | −5.7293572E−04 | 1.9851144E−04 |
| 8 | −3.1504000E+00 | −6.2026828E−03 | 2.7236052E−03 | −3.0511802E−03 | −1.7179420E−04 |
| 10 | 0.0000000E+00 | −1.1390821E−03 | −1.1756415E−03 | −9.1406236E−04 | −4.8865070E−04 |
| 11 | 0.0000000E+00 | −1.7517292E−03 | 1.3992760E−04 | 4.5056149E−04 | −1.3115059E−03 |
| 12 | 0.0000000E+00 | −2.2858830E−03 | 1.3920545E−03 | −1.9586408E−03 | −7.2439547E−04 |

| SURFACE NUMBER | RB7 | RB8 | RB9 | RB10 |
|---|---|---|---|---|
| 6 | −2.5513301E−05 | −7.5523981E−06 | −2.2859767E−05 | 1.6889624E−05 |
| 7 | −1.4341074E−04 | −1.6766734E−06 | 7.7273291E−05 | −1.4400348E−05 |
| 8 | −3.0608921E−05 | 1.8431415E−05 | −2.0068488E−06 | 1.4573847E−07 |
| 10 | −4.9534555E−05 | 1.5848561E−04 | | |
| 11 | −5.2267657E−04 | 3.9550621E−04 | | |
| 12 | −1.4911200E−05 | 1.5513427E−04 | | |

TABLE 4

EXAMPLE 4

(A)

| Si | Ri | Di | Ndj | νdj | GLASS |
|---|---|---|---|---|---|
| 1 | −15.0307 | 1.00005 | 1.5891 | 61.1 | S-BAL35 |
| 2 | 3.1268 | 1.51747 | | | |
| 3 | 7.7961 | 3.00019 | 1.8830 | 40.8 | S-LAH58 |
| 4 | −5.4769 | 0.00002 | | | |
| 5(St) | ∞ | 0.70000 | | | |
| *6 | −4.2659 | 0.70000 | 1.6336 | 23.6 | |
| *7 | 9.0109 | 0.15000 | | | |
| *8 | 4.0102 | 2.30004 | 1.5339 | 56.0 | |
| 9 | −3.9299 | 0.20000 | | | |
| *10 | −10000.0000 | 1.80007 | 1.5339 | 56.0 | |
| *11 | −16.0005 | 0.50036 | | | |
| *12 | −10.5053 | 0.70002 | 1.6336 | 23.6 | |
| 13 | ∞ | 2.30000 | | | |

TABLE 4-continued

EXAMPLE 4

| | | | | |
|---|---|---|---|---|
| 14 | ∞ | 1.20000 | 1.5168 | 64.2 |
| 15 | ∞ | 0.64647 | | |
| IMAGING PLANE | | | | |

(B)

| | |
|---|---|
| L(in Air) | 16.3 |
| Bf(in Air) | 3.7 |
| f | 4.68 |
| f1 | −4.31 |
| f2 | 4.08 |
| f3 | −4.48 |
| f4 | 4.13 |
| f5 | 30.02 |
| f6 | −16.58 |
| f12 | 6.05 |
| f34 | 11.42 |
| f56 | −38.47 |
| f3456 | 16.19 |

(C)

| SURFACE NUMBER | KA | RB3 | RB4 | RB5 | RB6 |
|---|---|---|---|---|---|
| 6 | 0.0000000E+00 | 7.4926052E−03 | 1.1460193E−03 | −1.8619950E−04 | −6.0312019E−04 |
| 7 | 0.0000000E+00 | 1.1227733E−02 | 6.7701809E−04 | −2.9358140E−03 | 1.7148372E−04 |
| 8 | −3.1504000E+00 | 7.1260395E−03 | −5.0416075E−03 | −2.8899716E−05 | −1.3726197E−04 |
| 10 | 0.0000000E+00 | 1.2950331E−03 | 2.4505233E−03 | 4.5322149E−05 | −2.2864912E−04 |
| 11 | 0.0000000E+00 | −8.8321408E−03 | 9.0509371E−03 | 7.2509657E−04 | −2.0201209E−03 |
| 12 | 0.0000000E+00 | −2.0761457E−02 | 1.3916614E−02 | −4.1334881E−03 | −1.6031457E−03 |

| SURFACE NUMBER | RB7 | RB8 | RB9 | RB10 |
|---|---|---|---|---|
| 6 | −8.7046884E−05 | 1.1334053E−05 | −2.5468386E−06 | 8.7823398E−06 |
| 7 | 6.9277888E−04 | −4.2248530E−04 | 7.7273291E−05 | −1.4400348E−05 |
| 8 | −4.8767895E−05 | 1.6086385E−06 | −1.4210755E−05 | −1.5652353E−05 |
| 10 | −1.3859690E−06 | 1.4225855E−04 | | |
| 11 | −8.2840469E−04 | 3.6787139E−04 | | |
| 12 | −3.0480417E−04 | 6.3900004E−05 | | |

TABLE 5

EXAMPLE 5

(A)

| Si | Ri | Di | Ndj | vdj | GLASS |
|---|---|---|---|---|---|
| 1 | −16.3949 | 1.00005 | 1.5891 | 61.1 | S-BAL35 |
| 2 | 3.2572 | 1.68493 | | | |
| 3 | 8.3055 | 3.00019 | 1.8830 | 40.8 | S-LAH58 |
| 4 | −5.7302 | 0.00002 | | | |
| 5(St) | ∞ | 0.68002 | | | |
| *6 | −4.4415 | 0.70000 | 1.6336 | 23.6 | |
| *7 | 9.1118 | 0.15000 | | | |
| *8 | 3.9439 | 2.30004 | 1.5339 | 56.0 | |
| 9 | −4.0317 | 0.20000 | | | |
| *10 | −10000.0000 | 1.80007 | 1.5339 | 56.0 | |
| *11 | −12.4755 | 0.50037 | | | |
| *12 | −8.8343 | 0.70000 | 1.6336 | 23.6 | |
| 13 | ∞ | 3.00000 | | | |
| 14 | ∞ | 0.50000 | 1.5168 | 64.2 | |
| 15 | ∞ | 0.36647 | | | |
| IMAGING PLANE | | | | | |

(B)

| | |
|---|---|
| L(in Air) | 16.4 |
| Bf(in Air) | 3.7 |
| f | 4.63 |
| f1 | −4.53 |

TABLE 5-continued

EXAMPLE 5

|  |  |
|---|---|
| f2 | 4.27 |
| f3 | −4.62 |
| f4 | 4.15 |
| f5 | 23.39 |
| f6 | −13.94 |
| f12 | 6.24 |
| f34 | 11.11 |
| f56 | −36.43 |
| f3456 | 15.68 |

(C)

| SURFACE NUMBER | KA | RB3 | RB4 | RB5 | RB6 |
|---|---|---|---|---|---|
| 6 | 0.0000000E+00 | 6.1685644E−03 | 3.7629714E−04 | 1.3294315E−04 | −6.6272661E−04 |
| 7 | 0.0000000E+00 | 1.4902890E−03 | 2.0516194E−05 | −2.8366138E−03 | 5.3871721E−04 |
| 8 | −3.1504000E+00 | −2.5747681E−03 | −5.1166286E−03 | 3.9464087E−04 | −1.2102856E−04 |
| 10 | 0.0000000E+00 | −4.1549964E−05 | 4.4397957E−03 | 2.1703092E−04 | −2.2253916E−04 |
| 11 | 0.0000000E+00 | −6.9812796E−03 | 9.6093236E−03 | 1.2503105E−03 | −2.0045277E−03 |
| 12 | 0.0000000E+00 | −1.7871411E−02 | 1.4075293E−02 | −4.6420608E−03 | −1.5497149E−03 |

| SURFACE NUMBER | RB7 | RB8 | RB9 | RB10 |
|---|---|---|---|---|
| 6 | −1.0153078E−04 | 2.5123572E−05 | 1.6046661E−06 | 7.0006730E−06 |
| 7 | 6.1670732E−04 | −4.1231674E−04 | 7.7273291E−05 | −1.4400348E−05 |
| 8 | −4.4050934E−05 | 7.5969523E−06 | −1.1478378E−05 | −1.6073373E−05 |
| 10 | −3.0924771E−05 | 1.2146325E−04 |  |  |
| 11 | −8.5740078E−04 | 3.6539968E−04 |  |  |
| 12 | −2.6000809E−04 | 9.5510122E−05 |  |  |

TABLE 6

EXAMPLE 6

(A)

| Si | Ri | Di | Ndj | νdj | GLASS |
|---|---|---|---|---|---|
| 1 | −16.4518 | 1.00005 | 1.5891 | 61.1 | S-BAL35 |
| 2 | 3.2368 | 1.72555 |  |  |  |
| 3 | 8.1572 | 3.00019 | 1.8830 | 40.8 | S-LAH58 |
| 4 | −5.7689 | 0.00002 |  |  |  |
| 5(St) | ∞ | 0.68002 |  |  |  |
| *6 | −4.8649 | 0.70000 | 1.6336 | 23.6 |  |
| *7 | 7.0313 | 0.15000 |  |  |  |
| *8 | 3.7415 | 2.30004 | 1.5339 | 56.0 |  |
| 9 | −4.0068 | 0.20000 |  |  |  |
| *10 | −10000.0000 | 1.80007 | 1.5339 | 56.0 |  |
| *11 | −13.4756 | 0.50037 |  |  |  |
| *12 | −9.1347 | 0.70000 | 1.6336 | 23.6 |  |
| 13 | ∞ | 2.90000 |  |  |  |
| 14 | ∞ | 0.55000 | 1.5168 | 64.2 |  |
| 15 | ∞ | 0.41914 |  |  |  |
| IMAGING PLANE |  |  |  |  |  |

(B)

|  |  |
|---|---|
| L(in Air) | 16.4 |
| Bf(in Air) | 3.7 |
| f | 4.63 |
| f1 | −4.51 |
| f2 | 4.26 |
| f3 | −4.44 |
| f4 | 4.04 |
| f5 | 25.27 |
| f6 | −14.42 |
| f12 | 6.16 |
| f34 | 11.20 |
| f56 | −35.18 |
| f3456 | 16.16 |

TABLE 6-continued

EXAMPLE 6

(C)

| SURFACE NUMBER | KA | RB3 | RB4 | RB5 | RB6 |
|---|---|---|---|---|---|
| 6 | 0.0000000E+00 | 5.5874231E-03 | -1.0065671E-03 | 1.9671317E-04 | -6.4928315E-04 |
| 7 | 0.0000000E+00 | 1.3188541E-04 | -1.3372053E-03 | -2.9735562E-03 | 5.5422930E-04 |
| 8 | -3.1504000E+00 | -3.2542152E-03 | -4.5873432E-03 | 2.3104910E-04 | -2.3219224E-04 |
| 10 | 0.0000000E+00 | 5.6261784E-04 | 4.2230406E-03 | 2.2290216E-04 | -2.1074218E-04 |
| 11 | 0.0000000E+00 | -4.5301926E-03 | 9.2119493E-03 | 1.1385821E-03 | -2.0813184E-03 |
| 12 | 0.0000000E+00 | -1.6428603E-02 | 1.4388018E-02 | -5.0293255E-03 | -1.5891795E-03 |

| SURFACE NUMBER | RB7 | RB8 | RB9 | RB10 |
|---|---|---|---|---|
| 6 | -9.2704708E-05 | 3.3852922E-05 | 3.4408043E-06 | 5.7233182E-06 |
| 7 | 5.4786705E-04 | -3.7836793E-04 | 7.7273291E-05 | -1.4400348E-05 |
| 8 | -6.7353535E-05 | 8.4539828E-06 | -9.3218888E-06 | -1.5462930E-05 |
| 10 | -2.9656625E-05 | 1.1965457E-04 | | |
| 11 | -8.6447582E-04 | 3.7903492E-04 | | |
| 12 | -2.4484457E-04 | 1.1064799E-04 | | |

TABLE 7

EXAMPLE 7

(A)

| Si | Ri | Di | Ndj | νdj | GLASS |
|---|---|---|---|---|---|
| 1 | -16.7519 | 1.00005 | 1.5891 | 61.1 | S-BAL35 |
| 2 | 3.1819 | 1.77402 | | | |
| 3 | 8.7837 | 3.00019 | 1.8830 | 40.8 | S-LAH58 |
| 4 | -5.5932 | 0.00002 | | | |
| 5(St) | ∞ | 0.70002 | | | |
| *6 | -4.7070 | 0.70000 | 1.6336 | 23.6 | |
| *7 | 6.9201 | 0.15000 | | | |
| *8 | 3.8976 | 2.30004 | 1.5339 | 56.0 | |
| 9 | -3.8758 | 0.20000 | | | |
| *10 | -100.0000 | 1.80007 | 1.5339 | 56.0 | |
| *11 | -13.3441 | 0.60000 | | | |
| *12 | -10.8851 | 0.70000 | 1.6336 | 23.6 | |
| 13 | ∞ | 3.00000 | | | |
| 14 | ∞ | 0.80000 | 1.5168 | 64.2 | |
| 15 | ∞ | 0.39597 | | | |
| IMAGING PLANE | | | | | |

(B)

| | |
|---|---|
| L(in Air) | 16.8 |
| Bf(in Air) | 3.9 |
| f | 4.63 |
| f1 | -4.46 |
| f2 | 4.29 |
| f3 | -4.32 |
| f4 | 4.06 |
| f5 | 28.64 |
| f6 | -17.18 |
| f12 | 6.13 |
| f34 | 11.69 |
| f56 | -44.58 |
| f3456 | 15.78 |

(C)

| SURFACE NUMBER | KA | RB3 | RB4 | RB5 | RB6 |
|---|---|---|---|---|---|
| 6 | 0.0000000E+00 | 7.3486246E-03 | -1.2947795E-03 | 3.8974350E-04 | -8.0838337E-04 |
| 7 | 0.0000000E+00 | 3.9133637E-03 | -1.2647512E-03 | -2.9540091E-03 | 6.8598801E-04 |
| 8 | -3.1504000E+00 | -3.8997767E-04 | -6.3371585E-03 | 4.6621084E-04 | -2.0095408E-04 |
| 10 | 0.0000000E+00 | 1.4355894E-03 | 4.0679846E-03 | 2.4556746E-04 | -1.8644191E-04 |
| 11 | 0.0000000E+00 | -3.9758761E-03 | 8.7522017E-03 | 1.1477768E-03 | -2.1753757E-03 |
| 12 | 0.0000000E+00 | -1.7107323E-02 | 1.5834935E-02 | -5.5191782E-03 | -1.6540216E-03 |

TABLE 7-continued

EXAMPLE 7

| SURFACE NUMBER | RB7 | RB8 | RB9 | RB10 |
|---|---|---|---|---|
| 6 | −1.4103994E−04 | 4.1209943E−05 | 1.1850244E−05 | 5.2541751E−06 |
| 7 | 3.4314811E−04 | −3.2364128E−04 | 7.7273291E−05 | −1.4400348E−05 |
| 8 | −5.3512078E−05 | 2.1737292E−05 | −2.3466717E−06 | −1.9445456E−05 |
| 10 | −5.4091890E−05 | 7.2523622E−05 | | |
| 11 | −9.1311243E−04 | 3.6284502E−04 | | |
| 12 | −2.3744740E−04 | 1.2690602E−04 | | |

TABLE 8

EXAMPLE 8

(A)

| Si | Ri | Di | Ndj | νdj | GLASS |
|---|---|---|---|---|---|
| 1 | −16.6851 | 1.00005 | 1.5891 | 61.1 | S-BAL35 |
| 2 | 3.1877 | 1.79562 | | | |
| 3 | 8.8582 | 3.00019 | 1.8830 | 40.8 | S-LAH58 |
| 4 | −5.6044 | 0.00002 | | | |
| 5(St) | ∞ | 0.70002 | | | |
| *6 | −4.7799 | 0.70000 | 1.6336 | 23.6 | |
| *7 | 6.9353 | 0.15000 | | | |
| *8 | 3.8606 | 2.30004 | 1.5339 | 56.0 | |
| 9 | −3.8664 | 0.20000 | | | |
| *10 | −50.0000 | 1.80007 | 1.5339 | 56.0 | |
| *11 | −12.5956 | 0.60000 | | | |
| *12 | −10.8953 | 0.70000 | 1.6336 | 23.6 | |
| 13 | ∞ | 3.00000 | | | |
| 14 | ∞ | 0.80000 | 1.5168 | 64.2 | |
| 15 IMAGING PLANE | ∞ | 0.39636 | | | |

(B)

| | |
|---|---|
| L(in Air) | 16.9 |
| Bf(in Air) | 3.9 |
| f | 4.63 |
| f1 | −4.46 |
| f2 | 4.31 |
| f3 | −4.36 |
| f4 | 4.04 |
| f5 | 31.02 |
| f6 | −17.20 |
| f12 | 6.14 |
| f34 | 11.28 |
| f56 | −39.19 |
| f3456 | 15.91 |

(C)

| SURFACE NUMBER | KA | RB3 | RB4 | RB5 | RB6 |
|---|---|---|---|---|---|
| 6 | 0.0000000E+00 | 7.3584099E−03 | −1.2022179E−03 | 4.0079151E−04 | −8.2307870E−04 |
| 7 | 0.0000000E+00 | 3.9563005E−03 | −1.2729845E−03 | −2.9471907E−03 | 6.8291800E−04 |
| 8 | −3.1504000E+00 | −2.7538399E−04 | −6.3373840E−03 | 4.5755584E−04 | −2.1379193E−04 |
| 10 | 0.0000000E+00 | 1.4926923E−03 | 4.0928341E−03 | 2.5325247E−04 | −1.8118490E−04 |
| 11 | 0.0000000E+00 | −3.8427540E−03 | 8.7714589E−03 | 1.1601513E−03 | −2.1679564E−03 |
| 12 | 0.0000000E+00 | −1.7054863E−02 | 1.5814036E−02 | −5.5230468E−03 | −1.6491985E−03 |

| SURFACE NUMBER | RB7 | RB8 | RB9 | RB10 |
|---|---|---|---|---|
| 6 | −1.5137045E−04 | 3.7956840E−05 | 1.2742579E−05 | 5.8945849E−06 |
| 7 | 3.1127315E−04 | −3.1093561E−04 | 7.7273291E−05 | −1.4400348E−05 |
| 8 | −6.0046989E−05 | 2.0460645E−05 | −1.1620740E−06 | −1.9212624E−05 |
| 10 | −5.2702831E−05 | 7.2273602E−05 | | |
| 11 | −9.1043567E−04 | 3.6249149E−04 | | |
| 12 | −2.3465369E−04 | 1.2790563E−04 | | |

TABLE 9

EXAMPLE 9

(A)

| Si | Ri | Di | Ndj | νdj | GLASS |
|---|---|---|---|---|---|
| 1 | −16.3898 | 1.00005 | 1.5891 | 61.1 | S-BAL35 |
| 2 | 3.2332 | 1.70769 | | | |
| 3 | 9.1787 | 3.00019 | 1.8830 | 40.8 | S-LAH58 |
| 4 | −5.5515 | 0.00002 | | | |
| 5(St) | ∞ | 0.70002 | | | |
| *6 | −4.6887 | 0.70000 | 1.6336 | 23.6 | |
| *7 | 6.9776 | 0.15000 | | | |
| *8 | 3.8181 | 2.30004 | 1.5339 | 56.0 | |
| 9 | −3.8370 | 0.20000 | | | |
| *10 | −50.0000 | 1.80007 | 1.5339 | 56.0 | |
| *11 | −11.7003 | 0.60000 | | | |
| *12 | −10.8067 | 0.70000 | 1.6336 | 23.6 | |
| 13 | ∞ | 3.00000 | | | |
| 14 | ∞ | 0.80000 | 1.5168 | 64.2 | |
| 15 IMAGING PLANE | ∞ | 0.41381 | | | |

(B)

| | |
|---|---|
| L(in Air) | 16.8 |
| Bf(in Air) | 3.9 |
| f | 4.63 |
| f1 | −4.50 |
| f2 | 4.33 |
| f3 | −4.33 |
| f4 | 4.00 |
| f5 | 28.15 |
| f6 | −17.06 |
| f12 | 6.34 |
| f34 | 11.12 |
| f56 | −44.27 |
| f3456 | 14.84 |

(C)

| SURFACE NUMBER | KA | RB3 | RB4 | RB5 | RB6 |
|---|---|---|---|---|---|
| 6 | 0.0000000E+00 | 7.0849026E−03 | −1.1161414E−03 | 4.1199411E−04 | −8.4491010E−04 |
| 7 | 0.0000000E+00 | 3.8823009E−03 | −1.3661888E−03 | −2.9746520E−03 | 6.6917489E−04 |
| 8 | −3.1504000E+00 | −1.4179684E−04 | −6.3770267E−03 | 4.2527663E−04 | −2.4507134E−04 |
| 10 | 0.0000000E+00 | 1.4843454E−03 | 4.1513434E−03 | 2.7517207E−04 | −1.6896413E−04 |
| 11 | 0.0000000E+00 | −4.0326765E−03 | 8.7927260E−03 | 1.1829809E−03 | −2.1535396E−03 |
| 12 | 0.0000000E+00 | −1.7022207E−02 | 1.5648395E−02 | −5.5649359E−03 | −1.6458331E−03 |

| SURFACE NUMBER | RB7 | RB8 | RB9 | RB10 |
|---|---|---|---|---|
| 6 | −1.6439126E−04 | 3.5292725E−05 | 1.4339604E−05 | 8.1339637E−06 |
| 7 | 2.4382636E−04 | −2.6634264E−04 | 7.7273291E−05 | −1.4400348E−05 |
| 8 | −7.2971234E−05 | 2.0150563E−05 | 2.0998427E−06 | −1.7086546E−05 |
| 10 | −4.6235487E−05 | 7.4795422E−05 | | |
| 11 | −8.9978097E−04 | 3.7021554E−04 | | |
| 12 | −2.2883928E−04 | 1.3067762E−04 | | |

TABLE 10

EXAMPLE 10

(A)

| Si | Ri | Di | Ndj | νdj | GLASS |
|---|---|---|---|---|---|
| 1 | −17.1016 | 1.00005 | 1.5891 | 61.1 | S-BAL35 |
| 2 | 3.1717 | 1.59333 | | | |
| 3 | 8.6687 | 3.70000 | 1.8830 | 40.8 | S-LAH58 |
| 4 | −5.4486 | 0.00002 | | | |
| 5(St) | ∞ | 0.70002 | | | |
| *6 | −5.2309 | 0.70000 | 1.6336 | 23.6 | |
| *7 | 7.1135 | 0.15000 | | | |

TABLE 10-continued

EXAMPLE 10

| | | | | |
|---|---|---|---|---|
| *8 | 4.0188 | 2.30004 | 1.5339 | 56.0 |
| 9 | −4.2339 | 0.20000 | | |
| *10 | −50.0000 | 1.80007 | 1.5339 | 56.0 |
| *11 | −12.0189 | 0.60000 | | |
| *12 | −12.0608 | 0.70002 | 1.6336 | 23.6 |
| 13 | ∞ | 3.00000 | | |
| 14 | ∞ | 1.00000 | 1.5168 | 64.2 |
| 15 | ∞ | 0.09153 | | |
| IMAGING PLANE | | | | |

(B)

| | |
|---|---|
| L(in Air) | 17.2 |
| Bf(in Air) | 3.8 |
| f | 4.63 |
| f1 | −4.46 |
| f2 | 4.32 |
| f3 | −4.66 |
| f4 | 4.28 |
| f5 | 29.15 |
| f6 | −19.04 |
| f12 | 6.01 |
| f34 | 12.61 |
| f56 | −56.14 |
| f3456 | 16.26 |

(C)

| SURFACE NUMBER | KA | RB3 | RB4 | RB5 | RB6 |
|---|---|---|---|---|---|
| 6 | 0.0000000E+00 | 3.6772145E−03 | −1.7394321E−03 | 5.0613802E−04 | −7.7842783E−04 |
| 7 | 0.0000000E+00 | 1.8826424E−03 | −1.6529237E−03 | −3.0513283E−03 | 6.4270281E−04 |
| 8 | −3.1504000E+00 | 1.7270468E−03 | −6.0662635E−03 | 6.3232117E−04 | −1.6781281E−04 |
| 10 | 0.0000000E+00 | 1.6111077E−03 | 3.7710753E−03 | 1.1186519E−04 | −2.3094975E−04 |
| 11 | 0.0000000E+00 | −3.2264468E−03 | 8.8080607E−03 | 1.1771203E−03 | −2.1788291E−03 |
| 12 | 0.0000000E+00 | −1.6340241E−02 | 1.5962307E−02 | −5.5481006E−03 | −1.6271278E−03 |

| SURFACE NUMBER | RB7 | RB8 | RB9 | RB10 |
|---|---|---|---|---|
| 6 | −1.3937288E−04 | 5.5792526E−05 | 7.2375511E−06 | 7.2180784E−06 |
| 7 | 2.5283385E−04 | −1.6759346E−04 | 7.7273291E−05 | −1.4400348E−05 |
| 8 | −3.5356384E−05 | 5.2235885E−05 | 1.3186518E−05 | −1.0937991E−05 |
| 10 | −7.6821948E−05 | 3.9274522E−05 | | |
| 11 | −9.1906575E−04 | 3.6106312E−04 | | |
| 12 | −2.0117402E−04 | 1.6266229E−04 | | |

TABLE 11

EXAMPLE 11

(A)

| Si | Ri | Di | Ndj | vdj | GLASS |
|---|---|---|---|---|---|
| 1 | −16.3017 | 1.00005 | 1.5891 | 61.1 | S-BAL35 |
| 2 | 3.2620 | 1.66835 | | | |
| 3 | 9.6106 | 3.00019 | 1.8830 | 40.8 | S-LAH58 |
| 4 | −5.5020 | 0.00002 | | | |
| 5(St) | ∞ | 0.70002 | | | |
| *6 | −4.6259 | 0.70000 | 1.6336 | 23.6 | |
| *7 | 7.0221 | 0.15000 | | | |
| *8 | 3.8083 | 2.30004 | 1.5339 | 56.0 | |
| 9 | −3.8264 | 0.20000 | | | |
| *10 | −50.0000 | 1.80007 | 1.5339 | 56.0 | |
| *11 | −11.0661 | 0.60000 | | | |
| *12 | −10.8159 | 0.70000 | 1.6336 | 23.6 | |
| 13 | ∞ | 3.10000 | | | |
| 14 | ∞ | 0.80000 | 1.5168 | 64.2 | |
| 15 | ∞ | 0.38183 | | | |
| IMAGING PLANE | | | | | |

TABLE 11-continued

EXAMPLE 11

(B)

| | |
|---|---|
| L(in Air) | 16.8 |
| Bf(in Air) | 4.0 |
| f | 4.63 |
| f1 | −4.53 |
| f2 | 4.37 |
| f3 | −4.30 |
| f4 | 3.99 |
| f5 | 26.20 |
| f6 | −17.07 |
| f12 | 6.49 |
| f34 | 11.12 |
| f56 | −50.50 |
| f3456 | 14.21 |

(C)

| SURFACE NUMBER | KA | RB3 | RB4 | RB5 | RB6 |
|---|---|---|---|---|---|
| 6 | 0.0000000E+00 | 6.9491169E−03 | −1.1665683E−03 | 3.8658669E−04 | −8.5694348E−04 |
| 7 | 0.0000000E+00 | 3.7977043E−03 | −1.4138100E−03 | −2.9945546E−03 | 6.6171399E−04 |
| 8 | −3.1504000E+00 | −7.5893210E−05 | −6.3761889E−03 | 4.1837970E−04 | −2.5203552E−04 |
| 10 | 0.0000000E+00 | 1.4783705E−03 | 4.1839284E−03 | 2.8847223E−04 | −1.6528467E−04 |
| 11 | 0.0000000E+00 | −4.1870275E−03 | 8.7774782E−03 | 1.1809445E−03 | −2.1519802E−03 |
| 12 | 0.0000000E+00 | −1.7090390E−02 | 1.5572234E−02 | −5.5835232E−03 | −1.6456988E−03 |

| SURFACE NUMBER | RB7 | RB8 | RB9 | RB10 |
|---|---|---|---|---|
| 6 | −1.6694382E−04 | 3.6667459E−05 | 1.5605668E−05 | 8.6704854E−06 |
| 7 | 2.2575915E−04 | −2.4805027E−04 | 7.7273291E−05 | −1.4400348E−05 |
| 8 | −7.4024389E−05 | 2.2513143E−05 | 3.6260881E−06 | −1.6287053E−05 |
| 10 | −4.7066044E−05 | 7.3698993E−05 | | |
| 11 | −8.9626218E−04 | 3.7362965E−04 | | |
| 12 | −2.2668273E−04 | 1.3207277E−04 | | |

TABLE 12

EXAMPLE 12

(A)

| Si | Ri | Di | Ndj | vdj | GLASS |
|---|---|---|---|---|---|
| 1 | −17.2921 | 1.00005 | 1.5891 | 61.1 | S-BAL35 |
| 2 | 3.3261 | 1.87115 | | | |
| 3 | 8.9580 | 3.00019 | 1.8830 | 40.8 | S-LAH58 |
| 4 | −5.9249 | 0.00002 | | | |
| 5(St) | ∞ | 0.70002 | | | |
| *6 | −4.7009 | 0.70000 | 1.6336 | 23.6 | |
| *7 | 7.2258 | 0.15000 | | | |
| *8 | 4.0101 | 2.30004 | 1.5339 | 56.0 | |
| 9 | −3.8689 | 0.20000 | | | |
| *10 | −50.0000 | 1.80007 | 1.5339 | 56.0 | |
| *11 | −10.1234 | 0.60000 | | | |
| *12 | −10.7065 | 0.85001 | 1.6336 | 23.6 | |
| 13 | ∞ | 2.60000 | | | |
| 14 | ∞ | 1.40000 | 1.5168 | 64.2 | |
| 15 | ∞ | 0.43949 | | | |
| IMAGING PLANE | | | | | |

(B)

| | |
|---|---|
| L(in Air) | 17.1 |
| Bf(in Air) | 4.0 |
| f | 4.63 |
| f1 | −4.65 |
| f2 | 4.46 |
| f3 | −4.39 |
| f4 | 4.11 |
| f5 | 23.41 |
| f6 | −16.90 |

TABLE 12-continued

EXAMPLE 12

| | |
|---|---|
| f12 | 6.44 |
| f34 | 11.69 |
| f56 | −63.77 |
| f3456 | 14.24 |

(C)

| SURFACE NUMBER | KA | RB3 | RB4 | RB5 | RB6 |
|---|---|---|---|---|---|
| 6 | 0.0000000E+00 | 6.5812237E−03 | −1.2189329E−03 | 4.8783295E−04 | −7.8831726E−04 |
| 7 | 0.0000000E+00 | 2.7020159E−03 | −1.7092048E−03 | −3.0943202E−03 | 6.5072984E−04 |
| 8 | −3.1504000E+00 | −1.4588240E−03 | −6.5566297E−03 | 4.1175512E−04 | −2.4602348E−04 |
| 10 | 0.0000000E+00 | 8.2650209E−04 | 3.7142052E−03 | 3.1747360E−05 | −2.7156520E−04 |
| 11 | 0.0000000E+00 | −4.9063869E−03 | 8.7327237E−03 | 1.3131993E−03 | −2.0782929E−03 |
| 12 | 0.0000000E+00 | −1.7451774E−02 | 1.6748156E−02 | −5.2063245E−03 | −1.5297494E−03 |

| SURFACE NUMBER | RB7 | RB8 | RB9 | RB10 |
|---|---|---|---|---|
| 6 | −1.3515414E−04 | 4.6788496E−05 | 1.1343604E−05 | 4.3658914E−06 |
| 7 | 2.7561256E−04 | −2.3633081E−04 | 7.7273291E−05 | −1.4400348E−05 |
| 8 | −6.7446332E−05 | 2.6374460E−05 | 5.1266328E−06 | −1.2959822E−05 |
| 10 | −6.0626667E−05 | 9.0595940E−05 | | |
| 11 | −8.5642581E−04 | 3.9971646E−04 | | |
| 12 | −1.6125211E−04 | 1.8935400E−04 | | |

TABLE 13

EXAMPLE 13

(A)

| Si | Ri | Di | Ndj | νdj | |
|---|---|---|---|---|---|
| 1 | −20.0340 | 1.00005 | 1.5168 | 64.2 | BSC7 |
| 2 | 3.1433 | 1.74010 | | | |
| 3 | 8.7797 | 3.70000 | 1.8040 | 46.6 | S-LAH65 |
| 4 | −5.3977 | 0.00002 | | | |
| 5(St) | ∞ | 0.70002 | | | |
| *6 | −5.1254 | 0.70000 | 1.6140 | 25.5 | |
| *7 | 6.3925 | 0.15000 | | | |
| *8 | 3.9735 | 2.48985 | 1.5110 | 55.2 | |
| 9 | −3.9427 | 0.20000 | | | |
| *10 | 50.4014 | 1.80007 | 1.5110 | 55.2 | |
| *11 | −12.8445 | 0.60000 | | | |
| *12 | −10.3810 | 0.70002 | 1.6140 | 25.5 | |
| 13 | −300.0210 | 2.90000 | | | |
| 14 | ∞ | 1.00000 | 1.5168 | 64.2 | |
| 15 | ∞ | 0.12603 | | | |
| IMAGING PLANE | | | | | |

(B)

| | |
|---|---|
| L(in Air) | 17.5 |
| Bf(in Air) | 3.7 |
| f | 4.64 |
| f1 | −5.18 |
| f2 | 4.70 |
| f3 | −4.53 |
| f4 | 4.33 |
| f5 | 20.22 |
| f6 | −17.53 |
| f12 | 6.51 |
| f34 | 13.03 |
| f56 | −189.92 |
| f3456 | 13.44 |

(C)

| SURFACE NUMBER | KA | RB3 | RB4 | RB5 | RB6 |
|---|---|---|---|---|---|
| 6 | 0.0000000E+00 | 2.8737164E−03 | −1.8135350E−03 | 6.5475083E−04 | −6.7213841E−04 |
| 7 | 0.0000000E+00 | 2.7920640E−03 | −1.7457556E−03 | −3.1385275E−03 | 6.6751302E−04 |
| 8 | −3.1504000E+00 | 2.0403883E−03 | −5.8328022E−03 | 7.2045578E−04 | −1.4488120E−04 |

TABLE 13-continued

EXAMPLE 13

| | | | | | |
|---|---|---|---|---|---|
| 10 | 0.0000000E+00 | 1.0817327E−03 | 3.3856758E−03 | −1.9121692E−05 | −2.5047474E−04 |
| 11 | 0.0000000E+00 | −2.8442848E−03 | 9.1241463E−03 | 1.3037685E−03 | −2.1372721E−03 |
| 12 | 0.0000000E+00 | −1.4577508E−02 | 1.6448269E−02 | −5.3711862E−03 | −1.5509112E−03 |

| SURFACE NUMBER | RB7 | RB8 | RB9 | RB10 |
|---|---|---|---|---|
| 6 | −1.0170421E−04 | 5.8431400E−05 | 4.3849473E−08 | 3.9526003E−06 |
| 7 | 3.8456395E−04 | −1.5544188E−04 | 7.7273291E−05 | −1.4400348E−05 |
| 8 | −3.1035930E−05 | 5.1926396E−05 | 1.8758081E−05 | −6.8379671E−06 |
| 10 | −6.4197725E−05 | 3.5909333E−05 | | |
| 11 | −9.1333892E−04 | 3.6108992E−04 | | |
| 12 | −1.6848553E−04 | 1.7698934E−04 | | |

TABLE 14

EXAMPLE 14

(A)

| Si | Ri | Di | Ndj | νdj | |
|---|---|---|---|---|---|
| 1 | −16.4294 | 1.00005 | 1.6228 | 57.1 | S-BSM10 |
| 2 | 3.0668 | 1.73473 | | | |
| 3 | 6.3805 | 3.70000 | 1.7550 | 52.3 | S-YGH51 |
| 4 | −5.6095 | 0.00002 | | | |
| 5(St) | ∞ | 0.70002 | | | |
| *6 | −10.3583 | 0.70000 | 1.6518 | 21.0 | |
| *7 | 8.7374 | 0.15000 | | | |
| *8 | 4.2311 | 2.30004 | 1.5339 | 56.0 | |
| 9 | −5.2195 | 0.20000 | | | |
| *10 | −50.0000 | 1.80007 | 1.5339 | 56.0 | |
| *11 | −22.1857 | 0.60000 | | | |
| *12 | −9.9921 | 0.70002 | 1.6518 | 21.0 | |
| 13 | ∞ | 2.60000 | | | |
| 14 | ∞ | 1.00000 | 1.5168 | 64.2 | |
| 15 | ∞ | 0.05292 | | | |
| IMAGING PLANE | | | | | |

(B)

| | |
|---|---|
| L(in Air) | 16.9 |
| Bf(in Air) | 3.3 |
| f | 4.63 |
| f1 | −4.07 |
| f2 | 4.56 |
| f3 | −7.17 |
| f4 | 4.78 |
| f5 | 73.05 |
| f6 | −15.33 |
| f12 | 7.04 |
| f34 | 9.91 |
| f56 | −19.30 |
| f3456 | 17.90 |

(C)

| SURFACE NUMBER | KA | RB3 | RB4 | RB5 | RB6 |
|---|---|---|---|---|---|
| 6 | 0.0000000E+00 | 1.1807208E−03 | −2.2664654E−03 | 5.8505295E−04 | −6.8157326E−04 |
| 7 | 0.0000000E+00 | −1.6710377E−03 | −2.4163653E−03 | −3.2115980E−03 | 6.0945995E−04 |
| 8 | −3.1504000E+00 | 4.3131541E−04 | −6.3534613E−03 | 5.2154368E−04 | −1.8542540E−04 |
| 10 | 0.0000000E+00 | 1.1404314E−03 | 4.2902452E−03 | 1.9214242E−04 | −2.2733727E−04 |
| 11 | 0.0000000E+00 | −3.4548071E−03 | 8.5786281E−03 | 1.1273543E−03 | −2.2078295E−03 |
| 12 | 0.0000000E+00 | −1.8193550E−02 | 1.5554870E−02 | −5.6688848E−03 | −1.6491960E−03 |

| SURFACE NUMBER | RB7 | RB8 | RB9 | RB10 |
|---|---|---|---|---|
| 6 | −1.0460876E−04 | 5.4869859E−05 | 4.1855720E−07 | −6.8002540E−07 |
| 7 | 2.6274261E−04 | −1.6331070E−04 | 7.7273291E−05 | −1.4400348E−05 |
| 8 | −3.0253078E−05 | 5.7547534E−05 | 1.7405484E−05 | −9.3018294E−06 |
| 10 | −8.4713120E−05 | 3.6190757E−05 | | |

TABLE 14-continued

| | EXAMPLE 14 | |
|---|---|---|
| 11 | −9.3682461E−04 | 3.5757439E−04 |
| 12 | −1.9661625E−04 | 1.7440672E−04 |

TABLE 15

EXAMPLE 15

(A)

| Si | Ri | Di | Ndj | vdj | |
|---|---|---|---|---|---|
| 1 | −40.0278 | 1.00005 | 1.7550 | 52.3 | S-YGH51 |
| 2 | 3.3804 | 1.49671 | | | |
| 3 | 8.2877 | 3.70000 | 1.8348 | 42.7 | S-LAH55 |
| 4 | −5.4766 | 0.00002 | | | |
| 5(St) | ∞ | 0.70002 | | | |
| *6 | −5.6053 | 0.70000 | 1.6336 | 23.6 | |
| *7 | 7.3258 | 0.15000 | | | |
| *8 | 3.8947 | 2.30004 | 1.5339 | 56.0 | |
| 9 | −4.1784 | 0.20000 | | | |
| *10 | −50.0000 | 1.80007 | 1.5339 | 56.0 | |
| *11 | −12.0111 | 0.60000 | | | |
| *12 | −13.6641 | 0.70002 | 1.6336 | 23.6 | |
| 13 | ∞ | 3.00000 | | | |
| 14 | ∞ | 1.00000 | 1.5168 | 64.2 | |
| 15 IMAGING PLANE | ∞ | 0.35443 | | | |

(B)

| | |
|---|---|
| L(in Air) | 17.4 |
| Bf(in Air) | 4.0 |
| f | 4.46 |
| f1 | −4.09 |
| f2 | 4.50 |
| f3 | −4.91 |
| f4 | 4.19 |
| f5 | 29.13 |
| f6 | −21.57 |
| f12 | 7.33 |
| f34 | 10.78 |
| f56 | −85.71 |
| f3456 | 12.19 |

(C)

| SURFACE NUMBER | KA | RB3 | RB4 | RB5 | RB6 |
|---|---|---|---|---|---|
| 6 | 0.0000000E+00 | 3.8444001E−03 | −1.6880696E−03 | 4.9899074E−04 | −7.9641989E−04 |
| 7 | 0.0000000E+00 | 1.7341693E−03 | −1.6781710E−03 | −3.0495442E−03 | 6.4564541E−04 |
| 8 | −3.1504000E+00 | 1.9672471E−03 | −6.0058823E−03 | 6.4641903E−04 | −1.6514924E−04 |
| 10 | 0.0000000E+00 | 1.6253022E−03 | 3.7470140E−03 | 1.0399510E−04 | −2.3240832E−04 |
| 11 | 0.0000000E+00 | −3.1467182E−03 | 8.8404977E−03 | 1.1857220E−03 | −2.1783468E−03 |
| 12 | 0.0000000E+00 | −1.6224325E−02 | 1.5873470E−02 | −5.5682903E−03 | −1.6239146E−03 |

| SURFACE NUMBER | RB7 | RB8 | RB9 | RB10 |
|---|---|---|---|---|
| 6 | −1.5393923E−04 | 4.6680872E−05 | 4.2993358E−06 | 7.4751279E−06 |
| 7 | 2.6349095E−04 | −1.7523183E−04 | 7.7273291E−05 | −1.4400348E−05 |
| 8 | −3.5178468E−05 | 5.1998701E−05 | 1.3371904E−05 | −1.0188984E−05 |
| 10 | −7.5074868E−05 | 3.8040097E−05 | | |
| 11 | −9.1765037E−04 | 3.6108998E−04 | | |
| 12 | −1.9936153E−04 | 1.6151910E−04 | | |

TABLE 16

CONDITIONAL FORMULAS

| EXAMPLES | (1) f5/f | (2) R1/f | (3) f4/f5 | (4) f56/f | (5) f34/f56 | (6) f34/f | (7) f3456/f | (8) vd2/vd3 | (9) f3/f | (10) f3/f4 |
|---|---|---|---|---|---|---|---|---|---|---|
| 1 | 3.76 | −3.42 | 0.25 | −18.02 | −0.17 | 3.10 | 3.59 | 1.73 | −1.04 | −1.09 |
| 2 | 3.46 | −3.37 | 0.27 | −21.99 | −0.14 | 3.15 | 3.48 | 1.73 | −0.99 | −1.06 |
| 3 | 4.79 | −3.24 | 0.19 | −10.05 | −0.27 | 2.73 | 3.72 | 1.73 | −0.95 | −1.05 |

TABLE 16-continued

| | CONDITIONAL FORMULAS | | | | | | | | | |
|---|---|---|---|---|---|---|---|---|---|---|
| EXAMPLES | (1) f5/f | (2) R1/f | (3) f4/f5 | (4) f56/f | (5) f34/f56 | (6) f34/f | (7) f3456/f | (8) vd2/vd3 | (9) f3/f | (10) f3/f4 |
| 4 | 6.42 | −3.21 | 0.14 | −8.22 | −0.30 | 2.44 | 3.46 | 1.73 | −0.96 | −1.08 |
| 5 | 5.05 | −3.54 | 0.18 | −7.87 | −0.30 | 2.40 | 3.39 | 1.73 | −1.00 | −1.11 |
| 6 | 5.46 | −3.55 | 0.16 | −7.60 | −0.32 | 2.42 | 3.49 | 1.73 | −0.96 | −1.10 |
| 7 | 6.19 | −3.62 | 0.14 | −9.63 | −0.26 | 2.52 | 3.41 | 1.73 | −0.93 | −1.06 |
| 8 | 6.70 | −3.60 | 0.13 | −8.46 | −0.29 | 2.44 | 3.44 | 1.73 | −0.94 | −1.08 |
| 9 | 6.08 | −3.54 | 0.14 | −9.56 | −0.25 | 2.40 | 3.20 | 1.73 | −0.93 | −1.08 |
| 10 | 6.30 | −3.70 | 0.15 | −12.14 | −0.22 | 2.73 | 3.51 | 1.73 | −1.01 | −1.09 |
| 11 | 5.66 | −3.52 | 0.15 | −10.91 | −0.22 | 2.40 | 3.07 | 1.73 | −0.93 | −1.08 |
| 12 | 5.05 | −3.73 | 0.18 | −13.77 | −0.18 | 2.53 | 3.07 | 1.73 | −0.95 | −1.07 |
| 13 | 4.36 | −4.32 | 0.21 | −40.91 | −0.07 | 2.81 | 2.90 | 1.82 | −0.98 | −1.04 |
| 14 | 15.79 | −3.55 | 0.07 | −4.17 | −0.51 | 2.14 | 3.87 | 2.49 | −1.55 | −1.50 |
| 15 | 6.53 | −8.98 | 0.14 | −19.22 | −0.13 | 2.42 | 2.73 | 1.81 | −1.10 | −1.17 |

TABLE 17

| | CONDITIONAL FORMULAS | | | | |
|---|---|---|---|---|---|
| EXAMPLES | (11) f12/f | (12) (Nd1 + Nd2 + Nd3 + Nd4 + Nd5 + Nd6)/6 | (13) L/f | (14) Bf/f | (15) (vd2 + vd4 + vd5)/3 |
| 1 | 1.38 | 1.63 | 3.58 | 0.87 | 50.93 |
| 2 | 1.38 | 1.63 | 3.53 | 0.86 | 50.93 |
| 3 | 1.27 | 1.63 | 3.60 | 0.85 | 50.93 |
| 4 | 1.29 | 1.63 | 3.49 | 0.80 | 50.93 |
| 5 | 1.35 | 1.63 | 3.54 | 0.80 | 50.93 |
| 6 | 1.33 | 1.63 | 3.55 | 0.80 | 50.93 |
| 7 | 1.32 | 1.63 | 3.64 | 0.85 | 50.93 |
| 8 | 1.33 | 1.63 | 3.64 | 0.85 | 50.93 |
| 9 | 1.37 | 1.63 | 3.63 | 0.85 | 50.93 |
| 10 | 1.30 | 1.63 | 3.72 | 0.81 | 50.93 |
| 11 | 1.40 | 1.63 | 3.64 | 0.87 | 50.93 |
| 12 | 1.39 | 1.63 | 3.70 | 0.86 | 50.93 |
| 13 | 1.40 | 1.60 | 3.76 | 0.79 | 52.32 |
| 14 | 1.52 | 1.62 | 3.65 | 0.72 | 54.77 |
| 15 | 1.64 | 1.65 | 3.89 | 0.90 | 51.57 |

In the imaging lenses of Example 1 through 15 above, the first lens L1 and the second lens L2 are glass spherical lenses, and the third lens L3 through the sixth lens L6 are plastic aspherical lenses. Note that basic lens data indicates the names of the materials of the first lens L1 and the second lens L2. For example, S-BAL35 by Ohara Corp. is indicated as the material of the first lens L1 of Examples 1 through 12 in the basic lens data. However, glass materials by other companies having the same characteristics may be employed instead. For example, BACD5 by HOYA Co., Ltd., K-SK5 by Sumita, H-ZK3 by Chengdu Guangming Co., and the like may be employed instead of S-BAL35 by Ohara Co. Further, S-LAH 58 by Ohara Co. is indicated as the material of the second lens L2 of each of Examples 1 through 12. However, TAFD30 by HOYA Co., Ltd., K-LASFN17 by Sumita and H-ZLAF68 by Chengdu Guangming Co. may be employed instead of S-LAH 58 by Ohara Co.

Further, BSC7 by HOYA Co., Ltd. is indicated as the material of the first lens L1 of Example 13. However, S-BSL7 by Ohara Corp., K-BK7 by Sumita, H-K9L by Chengdu Guangming Co., and N-BK7 by Schott may be employed instead of BSC7 by HOYA Co., Ltd. Further, S-LAH65 by Ohara Corp. is indicated as the material of the second lens L2 of Example 13. However, TAF3 by HOYA Co., Ltd., K-LASFN6 by Sumita, H-ZLAF50B by Chengdu Guangming Co., and the like may be employed instead of S-LAH65 by Ohara Corp.

Further, Ohara Corp. S-BSM10 is indicated as the material of the first lens L1 of Example 14. However, E-BACD10 by HOYA Co., Ltd. and H-ZK10 by Chengdu Guangming Co. may be employed instead of S-BSM10 by Ohara Corp. Further, S-YGH51 by Ohara Corp. is indicated as the material of the second lens L2 of Example 14 and the first lens L1 of Example 15. However, TACE by HOYA Co., Ltd., K-LASKN1 by Sumita, H-LAK53A by Chengdu Guangming Co., and the like may be employed instead of S-YGH51 by Ohara Corp. Further, S-LAH55 by Ohara Corp. is indicated as the material of the second lens L2 of Example 15. However, TAFD5F by HOYA Co., Ltd., K-LASKN8 by Sumita, H-ZLAF55A by Chengdu Guangming Co., and the like may be employed instead of S-LAH55 by Ohara Corp.

[Aberration Performance]

The respective aberration diagrams of the imaging lenses according to Examples 1 through 15 above are shown in A through D of FIG. 18, A through D of FIG. 19, A through D of FIG. 20, A through D of FIG. 21, A through D of FIG. 22, A through D of FIG. 23, A through D of FIG. 24, A through D of FIG. 25, A through D of FIG. 26, A through D of FIG. 27, A through D of FIG. 28, A through D of FIG. 29, A through D of FIG. 30, A through D of FIG. 31 and A through D of FIG. 32.

Here, the aberration diagram of Example 1 will be described as an example. The same applies to the aberration diagrams of the other Examples. A, B, C and D of FIG. 18 respectively show the aberration diagrams of spherical aberration, astigmatism, distortion, and lateral chromatic aberration of the imaging lens according to Example 1. F in each of spherical aberrations refers to a F value, ω in each of the other aberration diagrams refers to a half angle of view. Distortion diagrams show the amount of displacement from an ideal image height which is f×tan (φ) by using the focal length f of the entire system and an angle of view φ (which is a variable, $0 \leq \phi < \omega$). Each aberration diagram shows aberration with respect to the d-line (wavelength: 587.56 nm) as the reference wavelength. The spherical aberration diagram also shows aberrations with respect to the F-line (wavelength: 486.13), the C-line (wavelength: 656.27 nm), the s-line (wavelength: 852.11 nm) and aberration with respect to the offense against the sine condition (denoted as SNC). The lateral chromatic aberration diagram also shows aberrations with respect to the F-line, the C-line, and the s-line. The types of lines in the lateral chromatic aberration diagram are the same as those in the spherical aberration diagram. Accordingly, redundant descriptions thereof will be omitted.

As can be found from the data described above, each of the imaging lenses of Examples 1 through 15 is constituted by the small number of lenses, i.e., six lenses; and can be produced in a small size and at low cost. The respective imaging lenses further have F numbers of between 1.8 and 2.0 which are small, and have high optical performance with each aberration corrected favorably. These imaging lenses can be suitably used for surveillance cameras, vehicle mounted cameras for photographing images in the front, side, and back of an automobile, and the like.

[Embodiment of the Imaging Apparatus]

FIG. 33 shows the aspect of an automobile 100 on which the imaging apparatus provided with the imaging lens of the present embodiment is mounted, as a usage example. In FIG. 33, the automobile 100 is provided with an outside-vehicle camera 101 for photographing a blind angle range on the side surface of the passenger's side thereof, an outside-vehicle camera 102 for photographing a blind angle range behind the automobile 100, and an in-vehicle camera 103, which is provided on the back of a room mirror, for photographing the same visual field range as the driver's. The outside-vehicle cameras 101, 102 and the in-vehicle camera 103 correspond to the imaging apparatus according to the embodiment of the present invention, and are provided with the imaging lens according to the present embodiment of the present invention and an imaging element which converts an optical image formed by the imaging lens into an electric signal.

All the imaging lenses according to the Examples of the present invention have the advantageous points described above. Accordingly, the outside-vehicle cameras 101, 102 and the in-vehicle camera 103 can be also configured in a small size and at low costs, have wider angles of view, and enables fine images to be obtained through the peripheral portions of the imaging area.

The present invention has been described with reference to the Embodiments and Examples. The present invention is not limited to the embodiments and the examples described above, and various modifications are possible. For example, values, such as the radius of curvature, the distances between surfaces, the refractive indices, the Abbe numbers of each lens element, and the like are not limited to the values in the numerical examples shown in the Tables, but may be other values.

Note that all of the lenses of the Examples above are constituted by homogeneous materials. However, gradient index lenses may be used as the lenses. Further, in some of the Examples above, the second lens L2 through the sixth lens L6 are constituted by diffractive lenses in which surfaces are made aspherical. A diffractive optical element may be formed in one surface or a plurality of surfaces.

The embodiment of the imaging apparatus was described with reference to the Figure of an example, in which the present invention is applied to a vehicle mounted camera. The present invention is not limited to this application and can be applied to portable terminal cameras, surveillance cameras, and the like, for example.

What is claimed is:

1. An imaging lens consisting essentially of a first lens having a negative power, a second lens having a positive power, a third lens having a negative power, a fourth lens having a positive power, a fifth lens having a positive power, and a sixth lens having a negative power in this order from the object side, wherein
the Abbe number of the material of the third lens with respect to the d-line is less than or equal to 35,
the Abbe number of the material of the sixth lens with respect to the d-line is less than or equal to 32, and
the imaging lens satisfies conditional formula (1) below:

$$2.38 < f5/f \quad (1),$$ where f: the focal length of the entire system, and
f5: the focal length of the fifth lens.

2. The imaging lens of claim 1, wherein materials of the third lens, the fourth lens, the fifth lens, and the sixth lens are plastics.

3. The imaging lens of claim 2 that satisfies conditional formula (7) below:

$$2.0 < f3456/f \quad (7),$$ where f3456: the combined focal length of the third lens, the fourth lens, the fifth lens, and the sixth lens.

4. The imaging lens of claim 1 that satisfies conditional formula (8) below:

$$0.9 < vd2/vd3 \quad (8),$$ where vd2: the Abbe number of the material of the second lens with respect to the d-line, and
vd3: the Abbe number of the material of the third lens with respect to the d-line.

5. The imaging lens of claim 1 that satisfies conditional formula (9) below:

$$-2.5 < f3/f < -0.5 \quad (9),$$ where f: the focal length of the entire system, and
f3: the focal length of the third lens.

6. The imaging lens of claim 1, wherein the aperture stop is provided between the object-side surface of the second lens and the image-side surface of the fourth lens.

7. The imaging lens of claim 1 that satisfies conditional formula (10) below:

$$-3.0 < f3/f4 < -0.2 \quad (10),$$ where f3: the focal length of the third lens, and
f4: the focal length of the fourth lens.

8. The imaging lens of claim 1 that satisfies conditional formula (11) below:

$$0.2 < f12/f < 5.0 \quad (11),$$ where f: the focal length of the entire system, and
f12: the combined focal length of the first lens and the second lens.

9. The imaging lens of claim 1 that satisfies conditional formula (12) below:

$$(Nd1+Nd2+Nd3+Nd4+Nd5+Nd6)/6 < 1.70 \quad (12),$$ where

Nd1 through Nd6: the refractive indices of the materials of the first lens through the sixth lens with respect to the d-line.

10. The imaging lens of claim 1, wherein the object-side surface of the fourth lens is an aspherical surface, both of the center and the edge of the effective diameter have positive powers, and the positive power at the edge of the effective diameter is weaker than that of the center.

11. The imaging lens of claim 1, wherein the Abbe number of the material of the first lens with respect to the d-line is greater than or equal to 40.

12. The imaging lens of claim 1, wherein the Abbe number of the material of the second lens with respect to the d-line is greater than or equal to 25.

13. The imaging lens of claim 1, wherein the Abbe number of the material of the fourth lens with respect to the d-line is greater than or equal to 40.

14. The imaging lens of claim 1, wherein the Abbe number of the material of the fifth lens with respect to the d-line is greater than or equal to 40.

15. The imaging lens of claim 1 that satisfies conditional formula (1-1) below:

$$2.5 < f5/f < 20.0 \quad (1-1),$$ where f: the focal length of the entire system, and
f5: the focal length of the fifth lens.

16. The imaging lens of claim 1 that satisfies conditional formula (1-2) below:

$$3.0 < f5/f < 17.0 \quad (1\text{-}2),$$ where f: the focal length of the entire system, and
f5: the focal length of the fifth lens.

17. The imaging lens of claim 1 that satisfies conditional formula (1-3) below:

$$3.2 < f5/f < 17.0 \quad (1\text{-}3),$$ where f: the focal length of the entire system, and
f5: the focal length of the fifth lens.

18. An imaging apparatus comprising:
an imaging lens of claim 1.

19. An imaging lens consisting essentially of a first lens having a negative power, a second lens having a positive power, a third lens having a negative power, a fourth lens having a positive power, a fifth lens having a positive power, and a sixth lens having a negative power in this order from the object side, wherein
  an aperture stop is disposed more toward the object side than the image-side surface of the fourth lens,
  the Abbe number of the material of the third lens with respect to the d-line is less than or equal to 35,
  the Abbe number of the material of the sixth lens with respect to the d-line is less than or equal to 32, and
  the imaging lens satisfies conditional formula (2) below:

$$-4.1 < R1/f < 0.0 \quad (2),$$ where f: the focal length of the entire system, and
R1: the radius of curvature of the object-side surface of the first lens.

20. An imaging lens consisting essentially of a first lens having a negative power, a second lens having a positive power, a third lens having a negative power, a fourth lens having a positive power, a fifth lens having a positive power, and a sixth lens having a negative power in this order from the object side, wherein
  an aperture stop is disposed more toward the object side than the image-side surface of the fourth lens,
  the Abbe number of the material of the third lens with respect to the d-line is less than or equal to 35,
  the Abbe number of the material of the sixth lens with respect to the d-line is less than or equal to 32, and
  the imaging lens satisfies conditional formula (3) below:

$$0 < f4/f5 < 0.45 \quad (3),$$ where f4: the focal length of the fourth lens, and
f5: the focal length of the fifth lens.

* * * * *